(12) United States Patent
Kuwata et al.

(10) Patent No.: US 6,404,509 B1
(45) Date of Patent: Jun. 11, 2002

(54) COLOR CORRECTION DEVICE

(75) Inventors: Naoki Kuwata; Takashi Maruyama; Michinao Osawa, all of Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/052,151

(22) Filed: Mar. 31, 1998

(30) Foreign Application Priority Data

| Apr. 2, 1997 | (JP) | 9-084225 |
| Apr. 2, 1997 | (JP) | 9-084227 |
| Apr. 2, 1997 | (JP) | 9-084228 |

(51) Int. Cl.$^7$ .......... G06F 13/00; G06F 3/12; G06K 15/02
(52) U.S. Cl. .......... 358/1.9; 382/167
(58) Field of Search .......... 358/1.9, 1.15; 382/167

(56) References Cited

U.S. PATENT DOCUMENTS

| 5,121,196 A | 6/1992 | Hung | 358/75 |
| 5,189,521 A | 2/1993 | Ohtsubo et al. | 358/296 |
| 5,416,613 A | 5/1995 | Rolleston et al. | 358/518 |
| 5,467,434 A | * 11/1995 | Hower, Jr. et al. | 395/114 |
| 5,809,366 A | * 9/1998 | Yamakawa | 399/39 |
| 6,043,909 A | * 3/2000 | Holub | 358/504 |

FOREIGN PATENT DOCUMENTS

| EP | 0 420 259 | 4/1991 | H04N/1/46 |
| EP | 0 687 103 | 12/1995 | H04N/1/06 |
| EP | 0 741 491 | 11/1996 | H04N/1/06 |
| JP | 6-79853 | 10/1994 | B41J/2/205 |
| JP | 7-67807 | 7/1995 | B41J/2/205 |

\* cited by examiner

Primary Examiner—Joseph Mancuso
Assistant Examiner—Douglas Tran
(74) Attorney, Agent, or Firm—Sughrue Mion, PLLC

(57) ABSTRACT

A method and system for correcting a deviation in color balance in an image output device, without the need for performing a direct adjustment to the hardware. Image output devices may include printers, displays, or other image output devices. Deviation data may be derived from the output characteristics of every element color of an image output device, and stored at the image output device. A color correction device is provided which has the ability to receive the deviation data, and produce image data having a color correction based on this deviation data. The system can then communicate the color corrected image data to the image output device. The color correction system also may be configured to discriminate among a plurality of image output devices, with each image output device having the ability to store their own inherent output characteristics at the image output device.

13 Claims, 47 Drawing Sheets

Fig. 10

|  | C | M | Y | K |
|---|---|---|---|---|
| Reference (ng) | 4 0 | 4 0 | 4 0 | 4 0 |
| Sample (ng) | 4 2 | 3 8 | 3 8 | 4 0 |

Corresponding to    K    K    C    X    M    Y

Fig. 12

|  | C | M | Y | K |
|---|---|---|---|---|
| Reference (%) | 25 | 25 | 25 | 25 |
| Sample (%) | 27 | 23 | 23 | 25 |

Fig. 15

| Ink weight (ng) | cyanID | mgtID | ylwID |
|---|---|---|---|
| 15.0~15.5 | 21 | 21 | 21 |
| 15.5~16.0 | 20 | 20 | 20 |
| 16.0~16.5 | 19 | 19 | 19 |
| 16.5~17.0 | 18 | 18 | 18 |
| 17.0~17.5 | 17 | 17 | 17 |
| 17.5~18.0 | 16 | 16 | 16 |
| 18.0~18.5 | 15 | 15 | 15 |
| 18.5~19.0 | 14 | 14 | 14 |
| 19.0~19.5 | 13 | 13 | 13 |
| 19.5~20.0 | 12 | 12 | 12 |
| Reference value → 20.0~20.5 | 11 | 11 | 11 |
| 20.5~21.0 | 10 | 10 | 10 |
| 21.0~21.5 | 9 | 9 | 9 |
| 21.5~22.0 | 8 | 8 | 8 |
| 22.0~22.5 | 7 | 7 | 7 |
| 22.5~23.0 | 6 | 6 | 6 |
| 23.0~23.5 | 5 | 5 | 5 |
| 23.5~24.0 | 4 | 4 | 4 |
| 24.0~24.5 | 3 | 3 | 3 |
| 24.5~25.0 | 2 | 2 | 2 |
| 25.0~25.5 | 1 | 1 | 1 |

Fig. 19

|   | (1) | (2) | (3) | (4) | (5) |
|---|-----|-----|-----|-----|-----|
| R | 48  | 56  | 64  | 72  | 80  |
| G | 64  | 64  | 64  | 64  | 64  |
| B | 64  | 64  | 64  | 64  | 64  |

Showing data of red, green, blue in this order from the top

Print only black ink (black=128)

Print only black ink (black=60%)

Showing data of cyan, magenta and yellow in this order from the top
black=0
unit: %

| Pattern No. | CMY data | | | RGB data | | |
|---|---|---|---|---|---|---|
| | cyan (%) | mgt(%) | ylw (%) | red | green | blue |
| A1 | 50 | 50 | 50 | 128 | 128 | 128 |
| B1 | 44 | 53 | 53 | 134 | 125 | 125 |
| B2 | 47 | 56 | 47 | 131 | 122 | 131 |
| B3 | 53 | 53 | 44 | 125 | 125 | 134 |
| B4 | 56 | 47 | 47 | 122 | 131 | 131 |
| B5 | 53 | 44 | 53 | 125 | 134 | 125 |
| B6 | 47 | 47 | 56 | 131 | 131 | 122 |
| C1 | 38 | 56 | 56 | 140 | 122 | 122 |
| C2 | 41 | 59 | 50 | 137 | 119 | 128 |
| C3 | 44 | 62 | 44 | 134 | 116 | 134 |
| C4 | 50 | 59 | 41 | 128 | 119 | 137 |
| C5 | 56 | 56 | 38 | 122 | 122 | 140 |
| C6 | 59 | 50 | 41 | 119 | 128 | 137 |
| C7 | 62 | 44 | 44 | 116 | 134 | 134 |
| C8 | 59 | 41 | 50 | 119 | 137 | 129 |
| C9 | 56 | 38 | 56 | 122 | 140 | 122 |
| C10 | 50 | 41 | 59 | 128 | 137 | 119 |
| C11 | 44 | 44 | 62 | 134 | 134 | 116 |
| C12 | 41 | 50 | 59 | 137 | 128 | 119 |
| D1 | 32 | 59 | 59 | 146 | 119 | 119 |
| D2 | 35 | 62 | 53 | 143 | 116 | 125 |
| D3 | 38 | 65 | 47 | 140 | 113 | 131 |
| D4 | 41 | 68 | 41 | 137 | 110 | 137 |
| D5 | 47 | 65 | 38 | 131 | 113 | 140 |
| D6 | 53 | 62 | 35 | 125 | 116 | 143 |
| D7 | 59 | 59 | 32 | 119 | 119 | 146 |
| D8 | 62 | 53 | 35 | 116 | 125 | 143 |
| D9 | 65 | 47 | 38 | 113 | 131 | 140 |
| D10 | 68 | 41 | 41 | 110 | 137 | 137 |
| D11 | 65 | 38 | 47 | 113 | 140 | 131 |
| D12 | 62 | 35 | 53 | 116 | 143 | 125 |
| D13 | 59 | 32 | 59 | 119 | 146 | 119 |
| D14 | 53 | 35 | 62 | 125 | 143 | 116 |
| D15 | 47 | 38 | 65 | 131 | 140 | 113 |
| D16 | 41 | 41 | 68 | 137 | 137 | 110 |
| D17 | 38 | 47 | 65 | 140 | 131 | 113 |
| D18 | 35 | 53 | 62 | 143 | 125 | 116 |

FIG. 29

| Pattern No. | Setting ID | | |
|---|---|---|---|
| | cyan | magenta | yellow |
| A1 | 11 | 11 | 11 |
| B1 | 9 | 12 | 12 |
| B2 | 10 | 13 | 10 |
| B3 | 12 | 12 | 9 |
| B4 | 13 | 10 | 10 |
| B5 | 12 | 9 | 12 |
| B6 | 10 | 10 | 13 |
| C1 | 6 | 13 | 13 |
| C2 | 7 | 15 | 11 |
| C3 | 9 | 16 | 9 |
| C4 | 11 | 15 | 7 |
| C5 | 13 | 13 | 6 |
| C6 | 15 | 11 | 7 |
| C7 | 16 | 9 | 9 |
| C8 | 15 | 7 | 11 |
| C9 | 13 | 6 | 13 |
| C10 | 11 | 7 | 15 |
| C11 | 9 | 9 | 16 |
| C12 | 7 | 11 | 15 |
| D1 | 4 | 15 | 15 |
| D2 | 5 | 16 | 12 |
| D3 | 6 | 17 | 10 |
| D4 | 7 | 18 | 7 |
| D5 | 10 | 17 | 6 |
| D6 | 12 | 16 | 5 |
| D7 | 15 | 15 | 4 |
| D8 | 16 | 12 | 5 |
| D9 | 17 | 10 | 6 |
| D10 | 18 | 7 | 7 |
| D11 | 17 | 6 | 10 |
| D12 | 16 | 5 | 12 |
| D13 | 15 | 4 | 15 |
| D14 | 12 | 5 | 16 |
| D15 | 10 | 6 | 17 |
| D16 | 7 | 7 | 18 |
| D17 | 6 | 10 | 17 |
| D18 | 5 | 12 | 16 |

FIG. 30

| Pattern No. | cyan | magenta | yellow |
|---|---|---|---|
| No. 1 | 10 | 10 | 10 |
| No. 2 | 11 | 10 | 10 |
| No. 3 | 12 | 10 | 10 |
| No. 4 | 10 | 11 | 10 |
| No. 5 | 11 | 11 | 10 |
| No. 6 | 12 | 11 | 10 |
| No. 7 | 10 | 12 | 10 |
| No. 8 | 11 | 12 | 10 |
| No. 9 | 12 | 12 | 10 |
| No. 10 | 10 | 10 | 11 |
| No. 11 | 11 | 10 | 11 |
| No. 12 | 12 | 10 | 11 |
| No. 13 | 10 | 11 | 11 |
| No. 14 | 11 | 11 | 11 |
| No. 15 | 12 | 11 | 11 |
| No. 16 | 10 | 12 | 11 |
| No. 17 | 11 | 12 | 11 |
| No. 18 | 12 | 12 | 11 |
| No. 19 | 10 | 10 | 12 |
| No. 20 | 11 | 10 | 12 |
| No. 21 | 12 | 10 | 12 |
| No. 22 | 10 | 11 | 12 |
| No. 23 | 11 | 11 | 12 |
| No. 24 | 12 | 11 | 12 |
| No. 25 | 10 | 12 | 12 |
| No. 26 | 11 | 12 | 12 |
| No. 27 | 12 | 12 | 12 |

FIG. 32

| Pattern No. | cyan | magenta | yellow |
|---|---|---|---|
| No. 1 | 10 | 14 | 6 |
| No. 2 | 11 | 14 | 6 |
| No. 3 | 12 | 14 | 6 |
| No. 4 | 10 | 15 | 6 |
| No. 5 | 11 | 15 | 6 |
| No. 6 | 12 | 15 | 6 |
| No. 7 | 10 | 16 | 6 |
| No. 8 | 11 | 16 | 6 |
| No. 9 | 12 | 16 | 6 |
| No. 10 | 10 | 14 | 7 |
| No. 11 | 11 | 14 | 7 |
| No. 12 | 12 | 14 | 7 |
| No. 13 | 10 | 15 | 7 |
| No. 14 | 11 | 15 | 7 |
| No. 15 | 12 | 15 | 7 |
| No. 16 | 10 | 16 | 7 |
| No. 17 | 11 | 16 | 7 |
| No. 18 | 12 | 16 | 7 |
| No. 19 | 10 | 14 | 8 |
| No. 20 | 11 | 14 | 8 |
| No. 21 | 12 | 14 | 8 |
| No. 22 | 10 | 15 | 8 |
| No. 23 | 11 | 15 | 8 |
| No. 24 | 12 | 15 | 8 |
| No. 25 | 10 | 16 | 8 |
| No. 26 | 11 | 16 | 8 |
| No. 27 | 12 | 16 | 8 |

| R | G | B | C | c | M | m | Y | K |
|---|---|---|---|---|---|---|---|---|
| 0 | 0 | 0 | 0 | 0 | 0 | 0 | 0 | 255 |
| ¦ | ¦ | ¦ | ¦ | ¦ | ¦ | ¦ | ¦ | ¦ |
| r1 | g1 | b1 | C1 | c1 | M1 | m1 | Y1 | K1 |
| ¦ | ¦ | ¦ | ¦ | ¦ | ¦ | ¦ | ¦ | ¦ |
| 255 | 255 | 255 | 0 | 0 | 0 | 0 | 0 | 0 |

(b)

C1 : c1 ⇒ C1' : c1'

M1 : m1 ⇒ M1' : m1'

(c)

C1 ⇒ C1''

M1 ⇒ M1''

| Class | n g | % | Binary System |
|---|---|---|---|
| 15 | 54~56 | 39~41 | 1111 |
| 14 | 52~54 | 37~39 | 1110 |
| 13 | 50~52 | 35~37 | 1101 |
| 12 | 48~50 | 33~35 | 1100 |
| 11 | 46~48 | 31~33 | 1011 |
| 10 | 44~46 | 29~31 | 1010 |
| 9 | 42~44 | 27~29 | 1001 |
| 8 | 40~42 | 25~27 | 1000 |
| 7 | 38~40 | 23~25 | 0111 |
| 6 | 36~38 | 21~23 | 0110 |
| 5 | 34~36 | 19~21 | 0101 |
| 4 | 32~34 | 17~19 | 0100 |
| 3 | 30~32 | 15~17 | 0011 |
| 2 | 28~30 | 13~15 | 0010 |
| 1 | 26~28 | 11~13 | 0001 |
| 0 | 24~26 | 9~11 | 0000 |

FIG. 44

COLOR CORRECTION DEVICE

BACKGROUND OF THE INVENTION

1. Field of the Invention

The present invention relates to a technique for a color correction suitably used for correcting a color balance, and further to a technique for discriminating a printing device in an image printing system comprising the printing device and an image processing device.

2. Description of the Prior Art

In a color printing device such as an ink jet printer, a color image is printed by using inks of three colors such as cyan (C), magenta (M) and yellow (Y) or inks of four colors in which black (K) is added to these three colors. It is possible that a print head from which these color inks are ejected is formed integral for ejecting all color inks. However, a yield factor is deteriorated, so that a plurality of print heads are frequently used for each color. In a print head of integral form, a balance of a color ink ejecting amount can be maintained among respective color ink, although there is a difference such that the color ink ejecting amount is increased or decreased in general. However, a balance among respective color ink is lost due to unevenness in every print head in case of using a plurality of print heads.

Accordingly, a conventional color printing device proposed in Japanese Examined Patent Application No. HEI 6-79853 has a construction such that a driving signal is adjustable to every driving circuit driving a print head, whereby a balance among respective color ink can be kept by setting this driving signal at a factory or the like.

Such a conventional color printing device has a problem that the device cannot deal with a case where deviation occurs in a color ink ejecting amount due to age softening of a print head. Further, it also has a problem that an adjustment at a factory is required every device to increase manufacturing process, thereby being troublesome.

SUMMARY OF THE INVENTION

An object of the present invention is to provide a color correction device and color correction method capable of correcting a deviation in a color balance dependent on a hardware in an image outputting device including a color printing device without performing a direct adjustment to the hardware.

A color correction device provided by the present invention is the one for an image output device which outputs the color image by performing an image output every element color based upon color image data in which a color image is separated into every predetermined elemernt color at the same time the strength and weakness thereof is shown, having a construction of comprising deviation receiving means for receiving a deviation of output characteristics every element color in the image output device and color correction means for correcting the color image data by performing a color conversion so as to eliminate the deviation of output characteristics received by the deviation receiving means.

In the present invention having such a construction, on the assumption of the image output device which outputs the color image by performing an image output every element color based upon color image data in which a color image is separated into every predetermined elemernt color at the same time the strength and weakness thereof is shown, the deviation receiving means receives the deviation of output characteristics every element color in the image output device and color correction means corrects the color image data by performing a color conversion so as to eliminate the deviation of output characteristics received by the deviation receiving means.

Therefore, when a color image is outputted by the image output device based upon the color image data which is subject to the color conversion by the color correction means, the outputted color image is reproduced with a color faithful to the original color image since the color originally outputted deviationally due to characteristics of the image output device is corrected in advance by foreseeing the deviation. Specifically, it is admitted that the color deviation occurs in the image output device, and from the viewpoint of this, color image data with respect to the image output device is corrected by foreseeing the color deviation.

According to the present invention, a color correction device can be provided which is capable of correcting without performing a direct adjustment to a hardware by performing the color conversion so as to eliminate the deviation in output characteristics of every element color. Further, the deviation in the hardware is admitted, thereby capable of adjusting by a user. As a result, an adjustment at a factory is not required as well as it can easily deal with the age softening. Moreover, the influence given to the printing result by a paper color of a print paper is substantially the same as the deviation in output characteristics in the hardware, so that the original color can be reproduced without being influenced with the paper color.

The technique for performing the color conversion so as to eliminate the deviation after receiving the deviation as described above is not limited to a substantial apparatus. It can easily be understood that it is functioned as a method. Accordingly, a color correction method provided by the present invention is the method for an image output device which outputs the color image by performing an image output every element color based upon color image data in which a color image is separated into every predetermined elemernt color at the same time the strength and weakness thereof is shown, having a construction of receiving deviation of output characteristics every element color in the image output device and correcting the color image data by performing a color conversion so as to eliminate the received deviation of output characteristics.

Specifically, it is sure that the technique is not limited to a substantial apparatus but is effective as a method. According to the present invention, a color conversion method can be provided which is capable of correcting without performing a direct adjustment to a hardware by performing the color conversion so as to eliminate the deviation in output characteristics of every element color.

The deviation receiving means is the one for receiving the deviation in output characteristics of every element color of the aforesaid image output device, so that the receiving technique is not specifically limited. Briefly, the deviation may be an accurate value in accordance with a measurement or may be a value selected among compared subjects.

Accordingly, another object of the present invention is to provide one example of receiving a deviation in output characteristics. The deviation receiving means provided by the present invention has a construction of receiving data of the deviation possessed by the image output device.

In the present invention having such a construction, the deviation receiving means receives the data of the deviation from the image output device in case where the image output device itself possesses the data of the deviation in output characteristics of every element color. For example, in case where the color correction device is constituted by a computer or the like, the color correction device communicates with an image output device connected thereto such as a printer for receiving data of the deviation possessed by the image output device. In this case, it goes without saying that the data of the deviation possessed by the image output device maybe received, and further, an indirect technique may be used wherein ID such as a serial number specifying the image output device is received for receiving the data of the deviation by accessing another data base at the ID.

In this way, high reliability can be obtained by using the data of the deviation possessed by the image output device, affording an effect of eliminating unclearness.

Further, the receiving of the deviation is not limited to an automatic receiving between devices. A further object of the present invention is to provide a color correction device according to more specific example for receiving the deviation.

The color correction device provided by the present invention has a construction such that the deviation receiving means is provided with input means from which a user inputs the deviation.

In the present invention having such a construction, the deviation inputted by the user by using the input means is received by the deviation receiving means.

According to the present invention as described above, the user inputs to perform the adjustment, thereby performing the adjustment unfixedly corresponding to his or her favor or easily performing the adjustment in the future with respect to the age softening.

The deviation received by the input means may be the data directly showing the deviation or may be the data indirectly showing the deviation. For example, if the printing device is the image output device provided with a print head to every element color, the data showing the deviation is written to the print head in order that the user sees this data to input. It is to be noted that the data may be shown by a relative unit or the data may be the one showing a relative difference among the print heads.

On the other hand, the inputted data is not necessarily such a direct deviation. The inputted data may the one indirectly showing the deviation. A further object of the present invention is to provide a color correction device using data indirectly showing the deviation.

The color correction device provided by the present invention has a construction such that the deviation receiving means is provided with adjusting pattern outputting means for performing an image output at the image output device to output an adjusting pattern in which an image is changed corresponding to the deviation, and that the input means indirectly inputs the deviation by selecting this adjusting pattern.

In the present invention having such a construction, the adjusting pattern outputting means outputs the adjusting pattern at the image output device, whereby a user selects a predetermined adjusting pattern to input by the input means. This adjusting pattern is the one in which an image is changed corresponding to the deviation. For example, when a plurality of grays in which a color component is slightly different from the original gray are outputted by an image output, the one deviated from the original gray is happened to seem to be gray due to the deviation in output characteristics of every element color at the side of the image output device. In this case, it is understood that the data deviated from the original gray is outputted as gray by the image output if the user selects the one closest to gray from the image output result, to thereby indirectly obtain the deviation. It is possible to execute not only to a gray balance but also to an individual color.

According to the present invention as described above, the deviation can easily be judged by the user by utilizing the adjusting pattern.

Such an adjusting pattern can be varied because it indirectly shows the deviation. A further object of the present invention is to provide a color correction device showing one example of the adjusting pattern.

The color correction device provided by the present invention has a construction such that the adjusting pattern outputting means outputs a first output pattern for executing a judgement of strength and weakness in which a balance of strength and weakness is changed every element color and a second output pattern in which an emphasized correcting manner is changed after the judgement of strength and weakness.

In the present invention having such a construction, the adjusting pattern outputting means selects any pattern among the first output pattern in which the balance of strength and weakness is changed every element color, whereby the user judges the deviation in the balance of strength and weakness among respective element colors. However, the first output pattern selected in this way only judges which element is strong and which element is weak. Accordingly, the adjusting pattern outputting means selects any pattern among the second output pattern in which an emphasized correcting manner is changed, whereby the user founds the manner to be corrected, i.e., to what degree the weak element is corrected.

According to the present invention as described above, the balance of strength and weakness and the emphasized manner are selected in two stages, to thereby simply perform a difficult adjustment.

Further, it is effective to receive the data as the deviation based upon an actual image output result. A further object of the present invention is to provide a color correction device in which data as the deviation is received based upon an actual image output result.

The color correction device provided by the present invention has a construction such that the deviation receiving means is provided with image capture means for inputting the image output by the image output device.

In the present invention having such a construction, the image capture means provided in the deviation receiving means image-captures the image output by the image output device, whereby the deviation is inputted from the image output condition.

If the image output device is a display, the image capture may be performed as the display is caused to output a predetermined test pattern by an image output, or if the image output device is a printing device, a printing result of a predetermined test pattern may be image-captured. Moreover, the image capture operation is not specifically limited. The image capture operation may be performed with a device separated from the image output device, or may be performed with a union of the image output device.

According to the present invention as described above, an actual image output condition is measured, thereby being accurate. Further, the present invention can deal with the case where the age softening occurs or color ink is changed.

On the other hand, the color correction means performs a color conversion for executing a correction with respect to the color image data so as to eliminate the deviation in output characteristics received by various manners in this way. Various manners are possible to the color conversion manner. It is logically possible to obtain a correction value with respect to all colors, but it is actually impossible. Specifically, it is effective to collectively process to convert based upon some tendency. A further object of the present invention is to provide a color correction device which is not required to obtain a correction value of all colors.

The color correction device provided by the present invention has a construction such that the color correction means corrects by utilizing a tone curve which converts characteristics of strength and weakness between input and output so as to eliminate the deviation in output characteristics.

In the present invention having such a construction, the tone serving as an emphasizing degree is determined for converting the characteristics of strength and weakness between input and output when the output with respect to any one of the element colors is weaker than the others, whereby a collective conversion can be performed without individually setting the emphasizing degree with respect to the individual color. Various types are adoptable for this tone curve. For example, a tone curve of $\gamma$ conversion or a tone curve of spline interpolation or Newtonian interpolation can be adopted. Which one is adopted is suitable determined considering characteristics of the respective tone curve or a limit of a hardware resource.

According to the present invention in this way, it is unnecessary to determine the correcting condition with respect to the individual color by utilizing one-to-one tone curve, thereby easily performing the correction.

There are various specific techniques for eliminating the received deviation in output characteristics. Therefore, a further object of the present invention is to provide more specific example of the color correction means for eliminating the deviation in output characteristics.

The color correction device provided by the present invention has a construction such that the color correction means performs a color conversion to the color image data based upon predetermined color correction data so as to eliminate the deviation in output characteristics of every element color in the image output device.

In the present invention having such a construction, the color correction means performs a color conversion to the color image data based upon predetermined color correction data so as to eliminate the deviation in output characteristics of every element color in the image output device. For example, if an image output element for outputting some element color by image output is weaker in output than an image output element for outputting the other element color by image output, the color conversion is performed based upon color correction data for causing the color conversion so as to emphasize the element color by foreseeing the deviation.

According to the present invention as described above, the color conversion is performed based upon the color correction data, so that the color correction data corresponding to the deviation in output characteristics is used. Therefore, a color correction device capable of dealing with various deviations can be provided.

Upon utilizing such color correction data, a timing is a question for receiving the color correction data. Therefore, a further object of the present invention is to provide a color correction device for realizing most suitable receiving timing in order to effectively utilize the color correction data.

The color correction device provided by the present invention has a construction such that the color correction device is provided with color correction data producing means for producing the color correction data before a first image output by the image output device.

In the present invention having such a construction, the color correction data producing means produces the color correction data required by the color correction means for the color conversion before a first image output by the image output device. Accordingly, the color correction data is always produced upon using the image output device, thereby maintaining color reproducibility.

According to the present invention as described above, the color correction data itself required for the color conversion is produced before a first image output by the image output device, preventing the image output with color reproducibility in the image output device deteriorated. Further, in the case of constituting a software such as a printer driver, the color correction data once produced can also be utilized upon activating the printing operation in the future, thereby eliminating troublesome operation for producing the color correction data every activation.

On the other hand, the color correction data producing means may produce the color correction data before a first image output by the image output device, but it is enough, in the first implication, to satisfactorily perform the image output with the color correction data present before the image output by the image output device. Therefore, more specific various changes are possible. Accordingly, a further object of the present invention is to provide a specific example of the timing for receiving the color correction data.

The color correction device provided by the present invention has a construction such that the color correction producing means is executed when the color correction data is judged to be absent by the color correction means.

In the present invention having such a construction, the color correction is possible if the color correction data is present when the color correction means performs the color correction, while the color correction is impossible if the data is absent. In case where the color correction data is absent, the color correction data producing means is executed to produce the color correction data through a predetermined procedure, thereby capable of performing the color correction.

According to the present invention as described above, it can be judged whether it is before the first image output or not by the presence of the color correction data, so that the first image output can easily be found, thereby capable of producing the color correction data without inconvenience.

The timing for receiving the color correction data is not limited to this example. A further object of the present invention is to provide another specific example of receiving timing.

The color correction device provided by the present invention has a construction such that the color correction device is provided with setting means for setting to a system to be used, this setting means executing the color correction data producing means upon causing a first image output.

The present invention having such a construction is provided with setting means for setting to a system to be used such as an installer in a software, whereby the setting means sets the color correction device and executes the color correction data producing means after the setting while causing the first image output.

According to the present invention as described above, the color correction data is produced simultaneous with the setting, so that the color correction data can be utilized upon the image output after this.

On the other hand, the color correction data should suitably be reproduced in order to deal with an age softening. In such a case, it is considered to be a first image output considering that the image output can be newly performed. A further object of the present invention is to provide a color correction device capable of effectively executing the color correction data producing means in such a case.

The color correction device provided by the present invention has a construction such that the color correction device is provided with clear means for clearing the existing color correction data, this clear means executing the color correction producing means when the color correction data is cleared.

In the present invention having such a construction, the existing color correction data can be cleared by the clear means. When the clear means clears the color correction data, the color correction data producing means is executed to reproduce the color correction data.

According to the present invention as described above, the color correction data can be cleared as the need arises as well as the color correction data is newly reproduced after clearing, thereby capable of easily dealing with the age softening.

Further, the image output device as a premise outputs the color image by performing an image output every element color based upon color image data in which a color image is separated into every predetermined elemernt color at the same time the strength and weakness thereof is shown. In the case of a printing device, a corresponding one to the image output device is provided with a nozzle from which color inks such as CMY are ejected for outputting a color image by ejecting the color ink from the nozzle based upon print data which is subject to a color separation to every element color.

A further object of the present invention is to provide a color correction device wherein one example of the image output device more suitably using the color correction is specified.

The color correction device provided by the present invention has a construction such that the image output device outputs a color image by adhering a recording material provided every element color onto a medium.

In the present invention having such a construction, the printing device outputs a color image by adhering a recording material provided every element color onto a medium. In this case, a deviation in output characteristics occurs due to the difference among every color in the used amount of the recording material. This deviation is received by the deviation receiving means and the color correction means performs the color conversion so as to eliminate the deviation.

According to the present invention as described above, faithfulness to the original color can be enhanced when the image output device which outputs the final result is a color printing device.

Various techniques can be adopted corresponding to the hardware of the image output device upon performing the color conversion since the deviation in output characteristics occurs by the used amount of the recording material of every color. Accordingly, a further object of the present invention is to provide a color correction device corresponding to the hardware of the image output device.

The color correction device provided by the present invention has a construction such that the image output device is provided with recording material of a dark color and light color, and the color correction means changes a mixing ratio of the dark color and light color in order to correct the deviation.

In the present invention having such a construction, the hardware of the image output device is provided with recording material of a dark color and a light color, whereby, upon printing with a predetermined balance, the emphasizing degree is increased when the ratio of the dark color is increased while the emphasizing degree is decreased when the ratio of the light color is increased. Accordingly, the color correction means can perform the color conversion for correcting the deviation only by changing the mixing balance of these recording materials.

According to the present invention as described above, the correction can be performed only by changing the mixing balance of the dark color and the light color.

A further object of the present invention is to provide a color correction device adapted to a printing device using both of a dark color and a light color.

The color correction device provided by the present invention has a construction such that the printing device ejects color ink as the recording material for outputting the color image.

The present invention having such a construction uses color ink as the recording material and the printing device ejects the color ink to output the color image.

According to the present invention, the present invention can be adapted to a printing device which ejects color ink to output a color image.

The image output device is not limited to such a printing device. The image output device may be a cathode ray display such as CRT or may be a liquid crystal display such as TFT. More specifically, it can be adapted to various apparatuses such as a color copying machine, color facsimile device or projection display.

The concept of the invention is not limited to this but includes various modifications, i.e., the color correction device exists independently or is incorporated into some apparatus to be used. Therefore, it can suitably be changed to such as a software and a hardware.

As one example, in a printer driver for converting to color image data corresponding to printing ink based upon the inputted color image data to cause a predetermined color printer to print, the deviation in output characteristics of every printing ink in the color printer is received, the color conversion is performed with respect to the color image data so as to eliminate the received deviation in output characteristics for making the correction and causes the printer to print based upon the color image data after the correction.

Specifically, the printer driver converts the color image data inputted corresponding to the printing ink. At this time, the printer driver performs the color conversion so as to eliminate the deviation in output characteristics to cause the printing operation.

In case where the invention is a software for the color correction device as a specific example of a concept of the present invention, the invention is surely present on a recording medium having recorded thereon such a software to be utilized.

A further object of the present invention is to provide a recording medium having recorded thereon such a software.

A medium having recorded thereon a color correction program provided by the present invention is the one having recorded thereon a program for performing a color correction by a computer for an image output device which outputs the color image by performing an image output every element color based upon color image data in which a color image is separated into every predetermined elemernt color at the same time the strength and weakness thereof is shown, this medium receiving deviation of output characteristics every element color in the image output device and correcting the color image data by performing a color conversion so as to eliminate the received deviation of output characteristics.

The recording medium may be a magnetic recording medium or optical magnetic recording medium. Further, the same idea is adapted to any recording medium which is to be developed in the future. Moreover, it goes without saying that the same idea is adapted to a reproducing stage such as a primary reproduced product or secondary reproduced product. Besides, the present invention is also used in case where the communication line is utilized as a supplying method.

Moreover, there is no difference in the concept of the invention in case where the invention is realized by partly a software and partly a hardware. Briefly, it may be a type wherein a portion is stored on the recording medium to be suitably read as the need arises. Further, it goes without saying that the invention can be adapted to a color facsimile device or color copying machine.

As described above, the present invention can provide a medium having recorded thereon a color correction program.

Further, a color printing device serving as the color correction device as a premise is required to have a predetermined construction for effectively utilizing the color correction device. Accordingly, a further object of the present invention is to provide a color printing device having such a construction.

A color printing device provided by the present invention is the one which outputs a color image by adhering recording material of every element color onto a medium based upon color image data in which a color image is separated into a predetermined element color at the same time the strength and weakness thereof is shown, this color printing device having a construction of possessing data corresponding to a deviation in used amount of the recording material of every element color.

In the present invention having such a construction, the deviation receiving means can receive the data of the deviation in the aforesaid color correction device from the color printing device by possessing data corresponding to the deviation in used amount of the recording material of every element color. On the other hand, it is apparent that the invention is effectively used in other image output device only by causing the printing device to possess not only the deviation but also the direct or indirect data related to inherent characteristics.

As described above, the present invention can provide a color printing device capable of assuredly performing the color correction.

Moreover, a further object of the present invention is to provide more specific example of such a color printing device.

The color printing device provided by the present invention has a construction such that color ink is used as said recording material, the printing device is provided with a print head for ejecting the color ink every element color, and the data corresponding to said deviation in used amount is the data corresponding to the ejecting amount of the color ink at the print head.

In the present invention having such a construction, the ejecting amount of color ink is actually measured in judging the quality of the print head, so that such operation is not made useless. Further, the ejecting amount may effectively be used as the data of the deviation.

As described above, the color printing device according to the present invention possesses the actual ejecting amount of color ink, thereby obtaining accurate corrected result.

Further, the above-mentioned color correction means can be incorporated in the color printing device possessing such deviation. A further object of the present invention is to provide a color printing device to which color correction means is incorporated.

The color printing device provided by the present invention has a construction of performing a color conversion to the color image data to correct so as to eliminate the deviation in used amount of every recording material.

In the present invention having such a construction, the color printing device performs the printing operation by executing the color conversion so as to eliminate the deviation based upon the data showing the deviation possessed by itself. Accordingly, the original color is naturally reproduced without externally executing any color conversion procedure.

According to the present invention as described above, the original color can be naturally reproduced without externally executing any color conversion procedure by correcting the deviation in the hardware by oneself.

Paying attention to the data corresponding to the deviation provided at the color printing device for admitting the deviation inherent to the hardware as described above, it can be said that the data is inherent to each color printing device. On the other hand, it may happen that a plurality of color printers are possessed in common under the environment of network. In this case, if a slight change in color dependent on the hardware is present every color printer, the printed matter outputted by individual printer has an individual coloring. Therefore, it arises the need to discriminate the color printer connected to the network.

A further object of the present invention based upon the above-mentioned assumption is to discriminate a printing device in an image printing system comprising a printing device and an image processing device which outputs to this printing device print data which is subject to a predetermined image processing in accordance with inherent characteristics of said printing device.

The image printing system provided by the present invention has a construction such that the printing device is provided with performance data possessing means which possesses performance data showing performance relating to the inherent characteristics of its own and is capable of outputting to the image processing device, and the image processing device is provided with discriminating means which can receive the performance data and can discriminate the printing device based upon the performance data.

In the present invention having such a construction, the printing device is connected to the image processing device and the image processing device outputs to this printing device print data which is subject to a predetermined image processing in accordance with inherent characteristics of the printing device. At this time, the performance data possessing means of the printing device possesses performance data showing performance relating to the inherent characteristics of its own and is capable of outputting to the image processing device, and the discriminating means of the image processing device receives the performance data and discriminates the printing device based upon the performance data.

According to the present invention as described above, the printing device is discriminated by the performance data which is sufficient to be managed only during the manufacturing process, whereby managing operation including a packing process is unnecessary to be capable of providing an image printing system which is actually realizable. Further, the data is the performance data relating to the inherent characteristics, so that the adjustment corresponding to the inherent characteristics can be performed without depending on the hardware by receiving the data at the image processing device.

The technique wherein the image processing device discriminates a plurality of printing devices by utilizing the performance data possessed by the printing device as described above is not necessarily limited to a subject apparatus. It is easily understood that the technique functions as the method.

Therefore, the discriminating method provided by the present invention is the one for a printing device wherein the printing device is connected to an image processing device from which print data that is subject to a predetermined image processing based upon inherent characteristics of the printing device is outputted to the printing device, this method being composed of outputting from the printing device to the image processing device performance data showing performance related to the inherent characteristics of the printing device, of discriminating by the image processing device the printing device based upon the performance data received by the image processing device, and of outputting print data which is subject to an image processing corresponding to the performance data.

Specifically, the technique for discrimination is not necessarily limited to a subject apparatus but must be effective as the method.

The performance data relating to the inherent characteristics is not directly required by the user. In other words, it is unnecessary for the data to be attached to the outer surface of the device such as a serial number or to be marked on a registration postcard. Accordingly, the performance data may be marked only by the management during solely the manufacturing process to be outputted.

The print data which is subject to a predetermined image processing may be outputted from the image processing device. In this case, the predetermined image processing is not limited to a particular procedure, but can be widely adapted. From the viewpoint of the relationship in which the printing device is discriminated based upon the performance data, the printing devices having the same performance data cannot be discriminated. However, there is no problem since the same printed matter can be obtained even when the same performance data is outputted on the assumption that there is no difference among the printing devices.

Therefore, such a discrimination is effective from the viewpoint of the meaning of obtaining the same printed matter. A further object of the present invention is to provide an image printing system including the image processing device utilizing the performance data.

The image printing system provided by the present invention has a construction such that the printing device prints by using a recording material of every predetermined element color obtained by performing a color separation for separating a color image, the performance data possessing means possesses as the performance data a used amount of the recording material of every element color in the printing device as the inherent characteristics, and the image processing means comprises color correction means for performing a color conversion to the color image data so as to eliminate the inherent characteristics of the used amount of the recording material at every printing device discriminated by the discriminating means. It is to be noted that the used amount herein means the used amount of the recording material per one pixel of every element color.

In the present invention having such a construction, the performance data possessing means outputs as the performance data a used amount of the recording material of every element color in the printing device as the inherent characteristics, and in the image processing device, the discriminating means discriminates the printing device based upon the performance data as well as the color correction means performs the color conversion to the color image data so as to eliminate the inherent characteristics of the used amount of the recording material.

Therefore, color is generally changed by the deviation in the used amount of the recording material in the case of a device having the deviation compared to standard performance data. However, the color correction means performs the color conversion so as to eliminate the inherent characteristics upon outputting the print data. Specifically, the color correction is performed by foreseeing the deviation even when the printed matter is obtained wherein a color deviation for the inherent characteristics occurs from print data in the printing device, with the result that the printed matter is obtained which is faithful to the original color. Further, even when the discrimination is impossible in a plurality of printing devices having the same performance data, the reason for discriminating is color adjusting, so that color reproducibiliy is maintained.

According to the present invention as described above, the correction can be performed without executing a direct adjustment to the hardware by performing the color conversion so as to eliminate the deviation relating to the used amount of the recording material. Specifically, the deviation in the used amount of the recording material in the hardware is admitted, whereby the adjustment can be performed by the user to make the adjustment at a factory unnecessary. It is to be noted that the same color correction is performed to the printing devices having the same performance data, thereby maintaining color reproducibility in case that the printing device cannot be discriminated.

A place where the inherent characteristics of the used amount of the recording material is maintained as the performance data is not specifically limited, but this place influences workability.

Therefore, a further object of the present invention is to provide an image printing system capable of enhancing workability.

The image printing system according to the present invention has a construction such that the performance data possessing means is provided at a print head which consumes the recording material in the printing device.

In the present invention having such a construction, the performance data is maintained at the print head where the recording material is consumed. There may be a condition in which only print head is assembled under the condition of measuring the used amount of the recording material. Therefore, the performance data is possessed by the print head itself, not by the other constructing parts, to thereby enhance the actual workability.

According to the present invention as described above, the print head which is a direct cause for producing the deviation in used amount of the recording material possesses the performance data, resulting in that the recording operation is facilitated since the subject to be recorded becomes the subject to be measured upon measuring the used amount of the recording material, as well as that the minimum unit of the assembly required for the measurement is sufficient.

The technique for possessing the performance data at the print head is not specifically limited. A further object of the present invention is to provide an image printing system capable of showing more specific possessing technique.

The image printing system provided by the present invention has a construction such that the performance possessing means records the used amount of the recording material with electrical signal.

In the present invention having such a construction, the performance data possessing means records the used amount of the recording material with electrical signal. For example, a non-volatile PROM or other memory is provided for recording the used amount. In this case, the technique for outputting the recorded used amount can be suitably changed. In other words, it may be an output with a serial communication or may be an output with a parallel communication. Further, other data than the performance data may be recorded. Moreover, the used amount usable as the performance data in the image processing device is sufficient. Specifically, the used amount is not necessarily an absolute value, but may be a relative value or may be data in which the used amount is classified stepwise.

According to the present invention as described above, the performance data is recorded with electrical signal, thereby facilitating both writing and reading.

Other technique for recording to the print head is possible than the technique with electrical signal. A further object of the present invention is to provide an image printing system utilizing a technique other than that with electrical signal.

The image printing system provided by the present invention has a construction such that the performance data possessing means mechanically records the used amount of the recording material.

In the present invention having such a construction, a following construction, for example, may be possible in which pins which can easily be removed are provided at a portion of the head, and the corresponding pins are removed in accordance with the measured used amount of the recording material while the removal of pin is detected by an other sensor provided at the printing device. Further, formed at the portion from which the pin is removed is a print pattern which renders non-conductive at the portion from which the pin has been removed, whereby it is possible to electrically read, although it is the mechanical recording.

According to the present invention as described above, the performance data is mechanically recorded, thereby facilitating the recording method and obtaining cheap cost.

On the other hand, although the present invention can be realized by a construction in which both of the printing device and the image processing device have a predetermined construction, it is apparent that each element of the construction can be established as the invention.

Therefore, the printing device provided by the present invention is the one connected to an image processing device for receiving print data from the image processing device to print, this printing device comprising performance possessing data which possesses performance related to inherent characteristics of its own and can output to the image processing device.

Further, the image processing device provided by the present invention is the one for outputting to a printing device connected thereto print data which is subject to a predetermined image processing corresponding to inherent characteristics of the printing device, this image processing device comprising discriminating means which is capable of receiving from the printing device performance data showing performance related to the inherent characteristics of the printing device and which discriminates the printing device based upon the performance data.

In this case, the invention is not limited to this from the viewpoint of the concept of the invention. Specifically, the invention includes various modifications, for example, the invention can be realized as a software.

As one example, the invention can be constructed such that, in a printer driver which converts into color image data corresponding to printing ink or the like based upon the inputted color image data for causing a predetermined color printer to print, the printer driver receives performance data relating to inherent characteristics from the color printer connected thereto for discriminating the color printer in accordance with the performance data while executing an image processing based upon the performance data as the need arises to output to the discriminated color printer.

Specifically, the printer driver converts the color image data inputted corresponding to the printing ink. At this time, the printer driver discriminates the color printer by receiving the performance data and can perform the original conversion procedure since the conversion procedure corresponds to the performance data, so that the printer driver can cause the predetermined color printer to print. It is also possible to select a desired one among a plurality of color printers based upon the received performance data.

If the invention is a software in the image processing device as an embodied example of the concept of the invention, it cannot help saying that the invention naturally exists on a recording medium on which the software is recorded to be utilized.

A further object of the present invention is to provide a recording medium having recorded thereon such software.

The medium having recorded thereon a discriminating program of the printing device provided by the present invention is the one for a printing device in an image processing device wherein the printing device is connected to the image processing device from which print data that is subject to a predetermined image processing based upon inherent characteristics of the printing device is outputted to the printing device, this medium discriminating the printing device based upon performance data upon receiving the performance data showing performance related to inherent characteristics of the printing device outputted from the printing device for outputting print data which is subject to an image processing corresponding to the performance data.

In this way, the present invention can provide a medium having recorded thereon a program for discriminating a printing device.

BRIEF DESCRIPTION OF THE DRAWINGS

FIG. 10 is a view showing a state of a color ink ejecting amount of a print head unit;

FIG. 12 is a view showing a result of the measurement with a densitometer;

FIG. 15 is a view showing a correspondence of an ink weight of color ink ejected from a printer to its classification;

FIG. 19 is a view showing data for printing the color-deviated patch;

FIG. 29 is a view showing a corresponding relationship of component data of the custom A pattern;

FIG. 30 is a view showing ID corresponding to a gray patch selected from the custom A pattern;

FIG. 32 is a view showing a combination of a color correction look-up table in case where a gray patch of A1 is selected from the custom A pattern;

FIG. 33 is a view showing a combination of a color correction look-up table in case where a gray patch of C4 is selected from the custom A pattern;

FIG. 34 is a view showing a corresponding relationship in case where a color correction is performed in a color printing apparatus using dark color and light color;

FIG. 44 is a view showing a result of measurement with a densitometer;

DESCRIPTION OF THE PREFERRED EMBODIMENT

An embodiment of the present invention will be explained with reference to the drawings.

Figure 1:
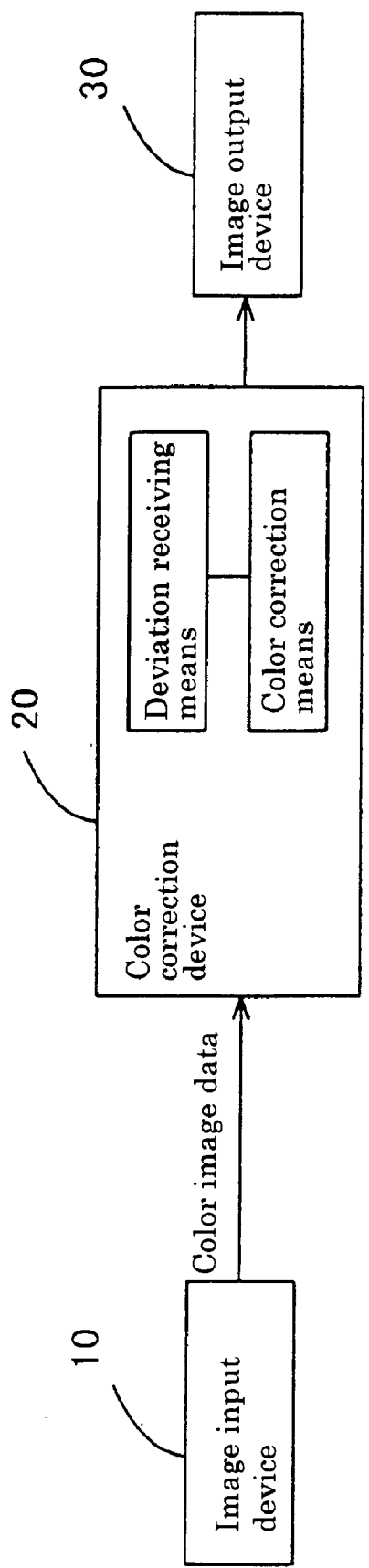
FIG. 1 is a block diagram of a color correction system according to one embodiment of the invention.
Figure 2:
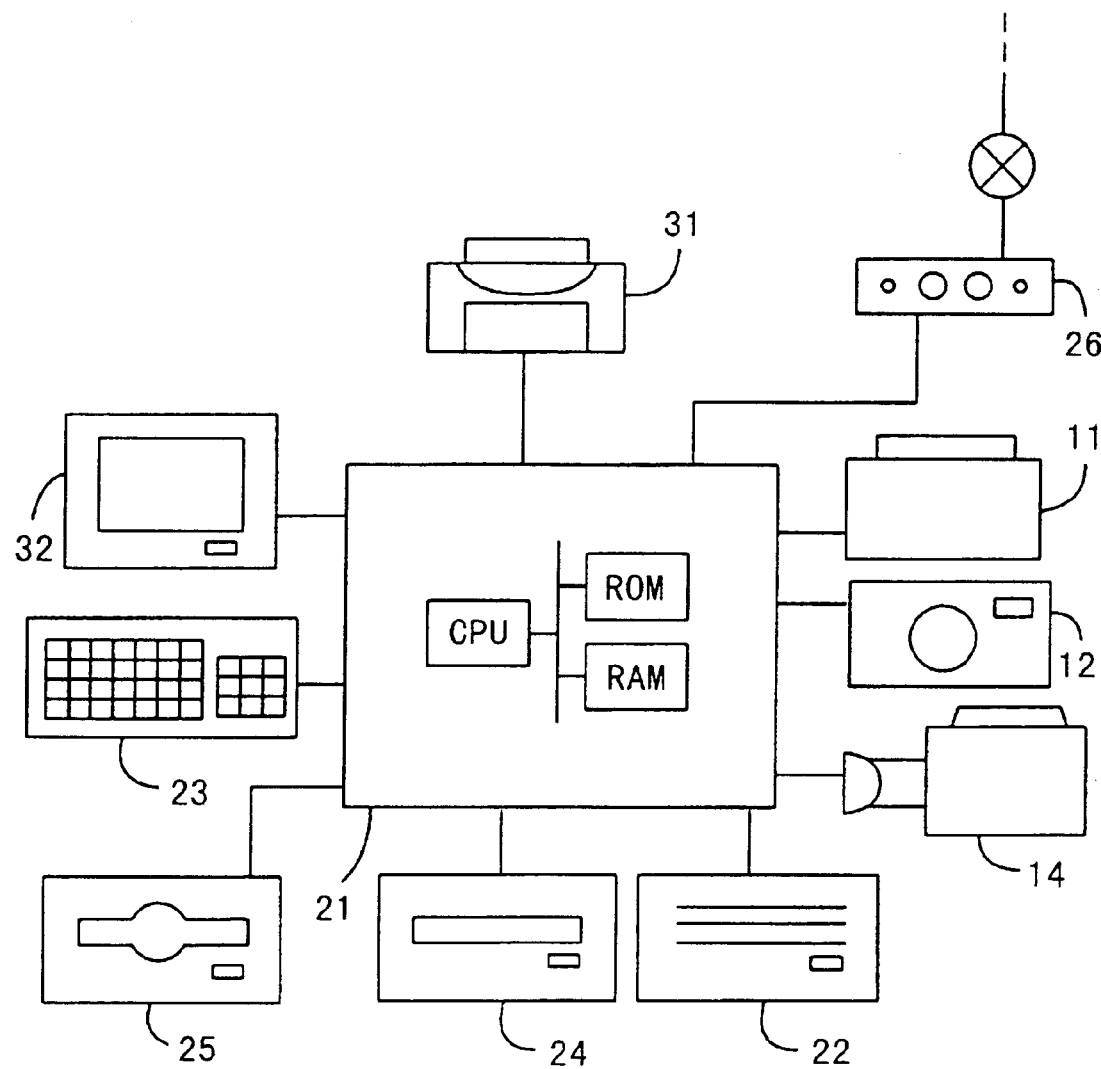
FIG. 2 is a block diagram showing a specific example of a hardware construction of a color correction device.

FIG. 1 is a block diagram showing a color correction system according to one embodiment of the present invention, while FIG. 2 is a block diagram showing an example of a specific construction of a hardware.

In the same figure, an image input device 10 inputs color image data with respect to a color image to a color correction device 20 which outputs color-corrected data with respect to the color image data to an image output device 30. The data herein outputted by the color correction device 20 is the one corrected so as to be faithful to an original color when outputted at the image output device 30, so that the color correction device is provided with deviation receiving means and color correction means.

Specific examples of the image input device 10 include a scanner 11, digital still camera 12 or video camera 14. Specific examples of the image processing device 20 include a computer system comprising a computer 21, hard disc 22, keyboard 23, CD-ROM drive 24, floppy disc drive 25 and modem 26. Specific examples of the image output device 30 include a printer 31, display 32 or the like. It is to be noted that the printer 31 among these image output devices 30 will particularly be explained in detail in this embodiment. The modem 26 is connected to a public communication line so as to connect to an external network via the public communication line, whereby a software or data can be get by downloading.

Figure 3:
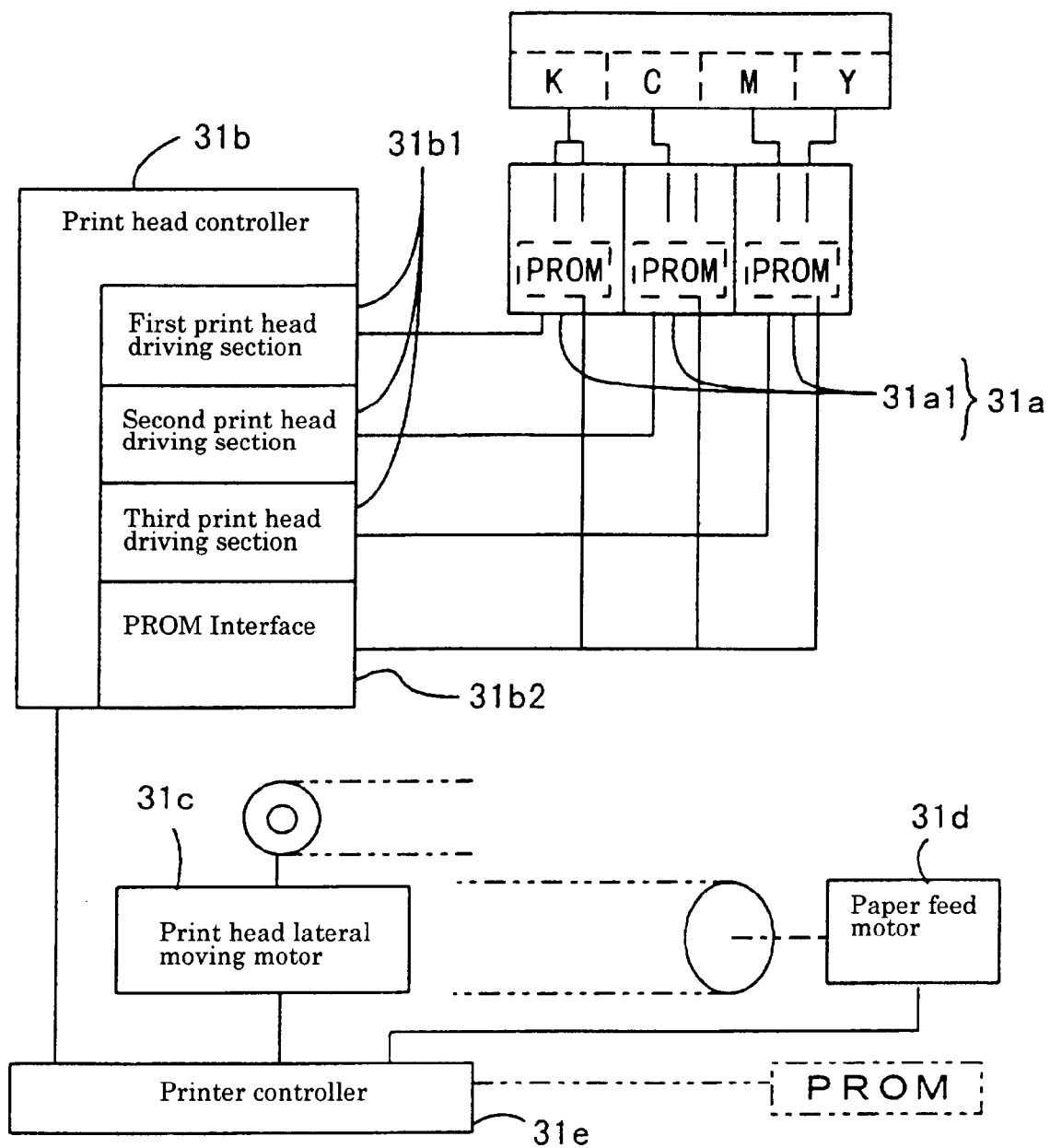
FIG. 3 is a schematic block diagram of a color printing apparatus as an image output device for eliminating a deviation in the color correction device.

FIG. 3 shows a schematic construction of the printer 31 comprising a print head 31a provided with three print head units 31a, a print head controller 31b for controlling this print head 31a, a print head lateral moving motor 31c for laterally moving the print head 31a, a paper feed motor 31d for feeding a print paper in the longitudinal direction and a printer controller 31e serving as an interface with an external apparatus in the print head controller 31b, print head lateral moving motor 31c and paper feed motor 31d.

This printer 31 uses four color inks as print ink. Provided at each print head unit 31a1 are two print nozzle lines which are independent with each other. The supplied color ink can be changed per unit of print nozzle line. In this case, both of two nozzle lines of the lefthand print head unit 31a1 in the figure are supplied with black ink (K), the left line of the righthand print head unit 31a1 is supplied with magenta ink (M) while the right line thereof with yellow ink (Y) and the left line of the central print head unit 31a1 is supplied with cyan ink (C) while the right line thereof is unused. A manufacturing error of each print head unit 31a1 is relatively small to thereby negligible.

However, a difference is liable to occur in ink ejecting amount among every print head unit 31a1, so that a PROM area is provided so as to keep data obtained by measuring the color ink ejecting amount every print head unit 31a1 measured as described later. It is to be noted that a deviation in this ejecting amount corresponds to a deviation referred to in the present invention. The above-mentioned print head controller 31b is provided with a print head driving section 31b1 for ejecting color ink by driving each nozzle in the print head unit 31a1 and a PROM interface 31b2 for referring the PROM area, whereby the print head controller 31b causes the print head driving section 31b1 to print based upon print data inputted via the printer controller 31e as well as is capable of outputting data of color ink ejecting amount stored in the PROM area as the needs arise.

Further, this PROM area is not always necessarily provided at the print head unit 31a1. It may be mounted at least in the printer 31. Specifically, it maybe provided separately from the print head 31a as shown by a two-dot chain line in FIG. 3. However, in case where the PROM area is provided in the print head unit 31a1, there is at least a merit that data obtained by measuring an ejecting amount with the print head unit 31a1 assembled can be stored. In particular, in a type wherein a print head and color ink tank are integrally formed, data may be recorded in every cartridge.

Further, considering that this data is recorded, a dip switch may be provided to be connected to the printer controller 31e, whereby an operator may set this dip switch upon measurement. By this, the setting content of the dip switch can be read via the printer controller 31e, resulting in that the data is inputted as a deviation. Alternatively, the measured result is simply printed on a seal paper or the like which is attached to the print head 31a, whereby it is possible that the user inputs the data printed on the seal paper.

Figure 4:
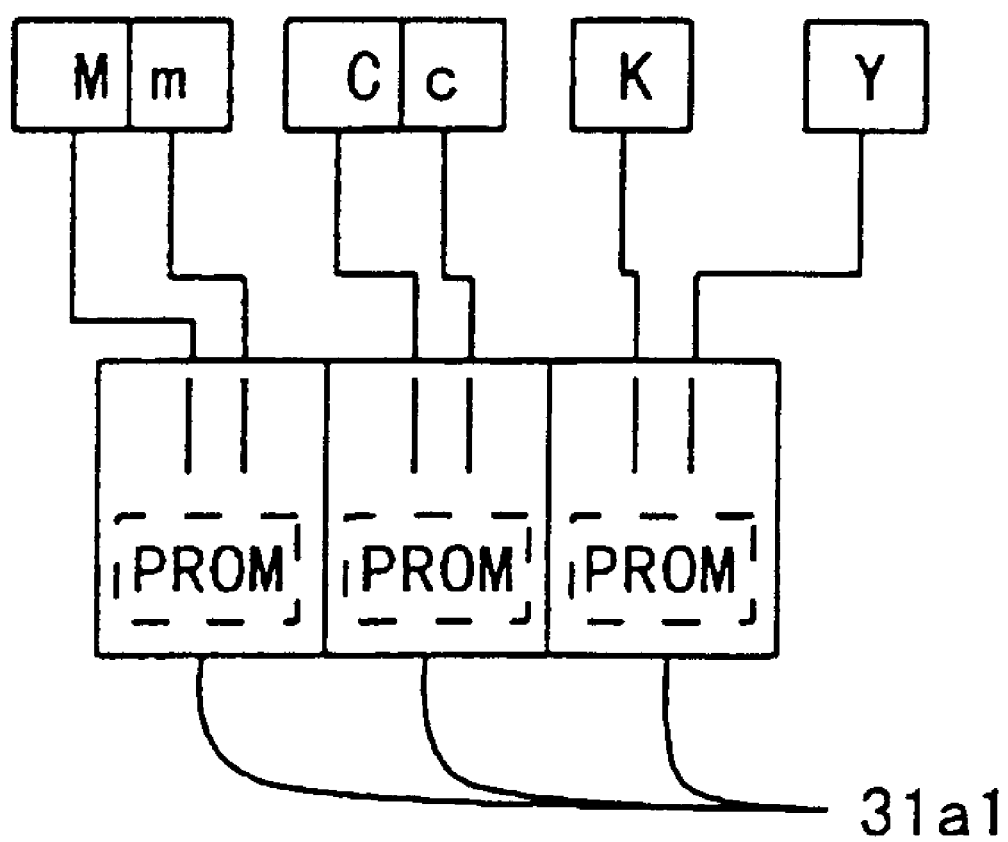
FIG. 4 is a schematic block diagram showing another constructional example of the color printing apparatus.

Although four color inks are used in the present embodiment, it is possible to use six color inks by using to the full two print nozzle lines in three print head units 31a1 like the print head 31a in the printer 30 shown in FIG. 4. In this case, dark color and light color are respectively used with respect to cyan and magenta and further, yellow and black are used to make the total of six colors.

Figure 5:
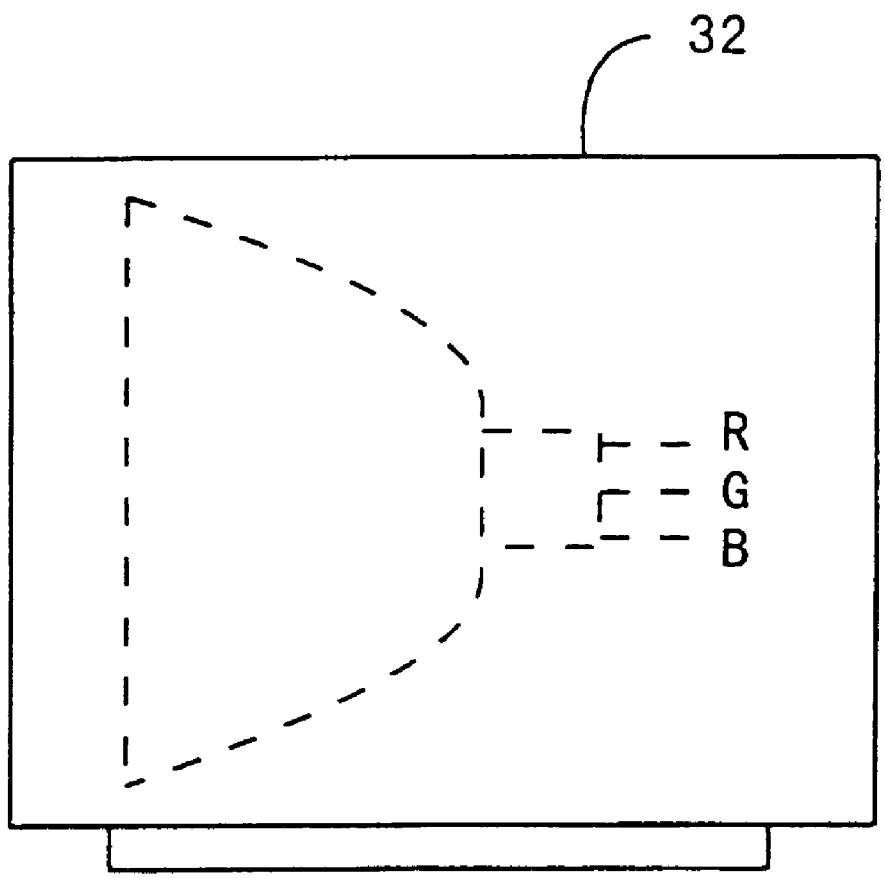
FIG. 5 is a view showing a display as another image output device.
Figure 6:
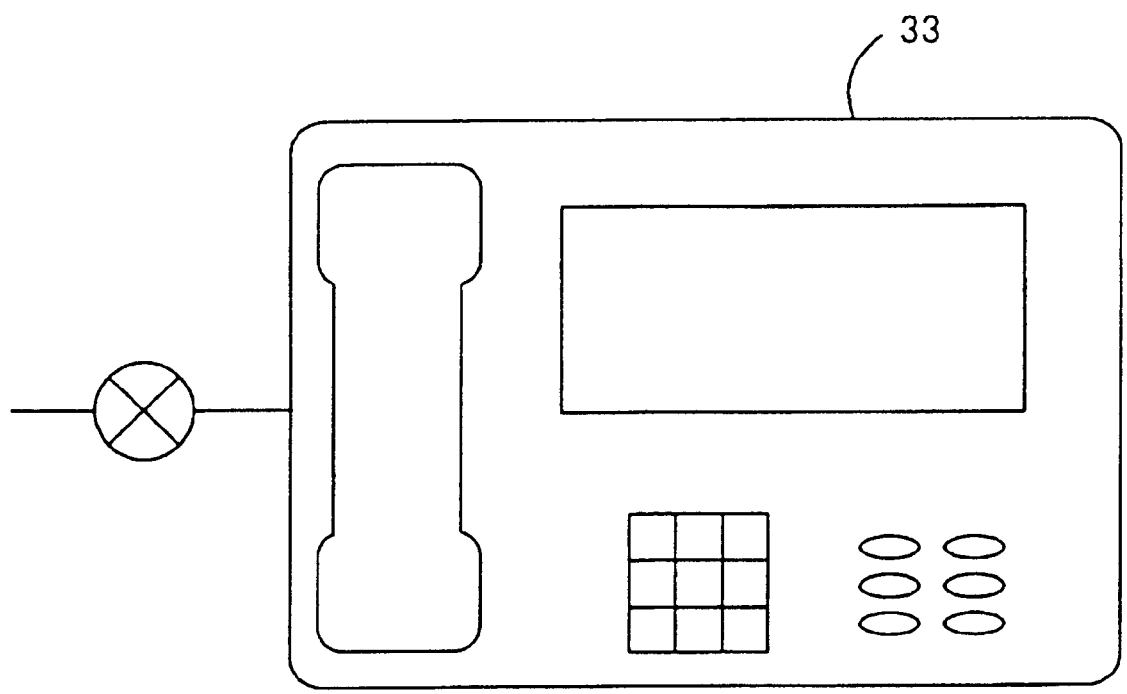
FIG. 6 is a view showing a facsimile as another image output device.
Figure 7:
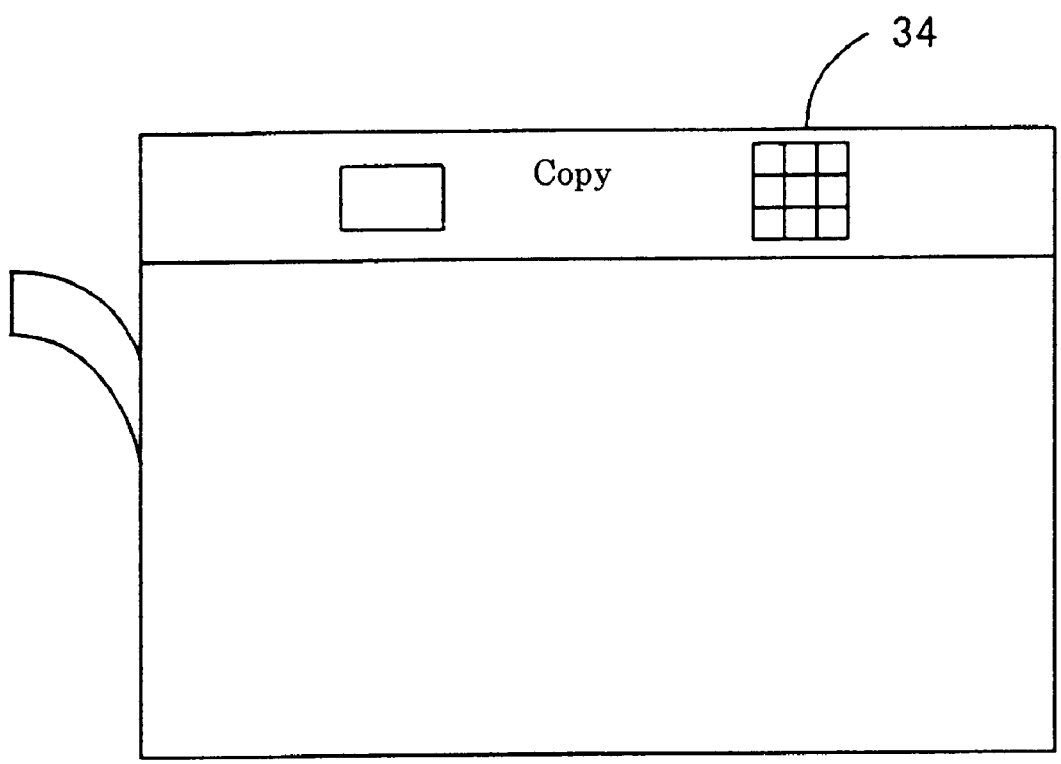
FIG. 7 is a view showing a color copying machine as another image output device.

Although the printer 31 capable of performing a color printing is used as the image output device 30 in the present embodiment, the present invention is adaptable to the display 32 shown in FIG. 5, a color facsimile device 33 shown in FIG. 6 or a color copying machine 34 shown in FIG. 7. In this case, a deviation happens to occur in output characteristics of each cathode ray of RGB in the display 32, and a deviation happens to occur in used color ink amount in the color facsimile device 33 or color copying machine 34 as in the same manner in the printer 31. Moreover, although the computer system correcting the color image data to the printer 31 is used in the present embodiment, it is possible to incorporate the color correction system in the color printer 35 to directly input the color image data supplied from the network for printing.

The computer 21 realizing the color correcting device 20 functionally constructs the deviation receiving means and the color correction means. However, it is possible to possess another functions. Briefly, the computer 21 can also serve as both of color converting means for converting a color space and tone converting means for converting a tone by rendering the printer 31 as the output device.

Figure 9:
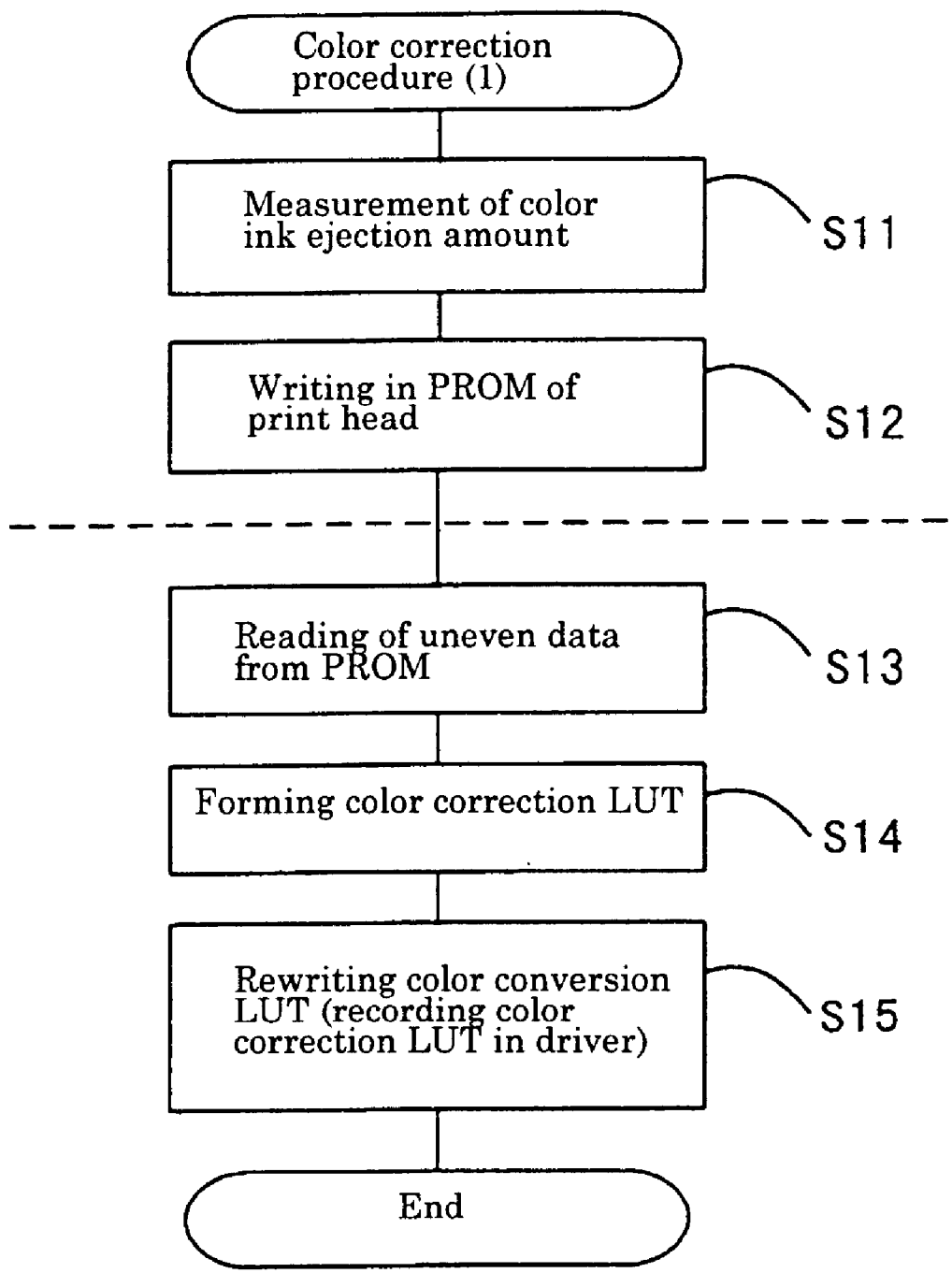
FIG. 9 is a view showing a first color correction procedure.

Firstly, the deviation receiving means is explained. A specific example is greatly changed in relation to this technique for receiving a deviation. FIG. 9 shows a procedure in case where the printer 31 itself keeps the deviation in color ink ejecting amount as described above. The data showing the deviation is recorded to the printer 31 at the first half steps S11 and S12, while a preparation for color correction is performed at the second half steps S13 to S15.

FIG. 10 shows a color ink ejecting amount in the print head 31a. The printer driver performs a color conversion from RGB data into CMYK data upon printing as well as performs a halftone processing. This operation is based upon a corresponding relationship considering the color ink of the print head 31a. Further, this corresponding relationship naturally relates to the color ink ejecting amount. Specifically, although the printer driver performs a color conversion on the assumption that the color ink amount to be ejected corresponding to some print data is 40 ng as shown in the upper column (reference) in FIG. 10, the actual color ink amount is deviated as shown in the lower column (sample). It is of course possible to make this deviation small, but the manufacturing yield factor of the print head unit 31a1 is deteriorated.

Figure 11:
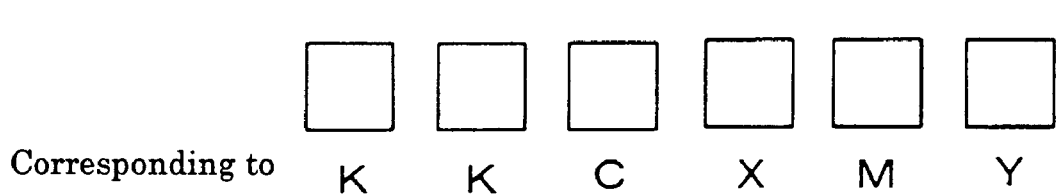
FIG. 11 is a view showing a patch measured with a densitometer.

The color ink ejecting amount is measured (step S11) such that cyan ink is supplied to all of the print head units 31a1 with the print head 31a assembled and then a solid patch is printed on a predetermined paper with a suitable density of 25% as shown in FIG. 11 to be measured with a densitometer. Six patches shown in FIG. 11 are printed only by respective six print nozzle lines. Since all print nozzles eject the same cyan ink, the measured density is approximately proportion to the ejecting amount of every print nozzle.

As a result, although each nozzle is set to print with a reference density 25% as shown in FIG. 12, there is an unevenness in the sampled result. In this example, the ejecting amount of the print nozzles to be used for magenta and yellow printed with the same print head unit 31a1 is slightly small (23%), the ejecting amount to be used for cyan is slightly great (27%) and the ejecting amount to be used for black agrees with the reference value (25%). Then, these measured results are written in the PROM area of the print head 31a (step S12) after the measurement. Accordingly, the ejecting amount of every print head unit 31a1 can be read via the print head controller 31b when the print head is assembled in the printer 31 as described above. It is to be noted that cyan is not always necessarily used.

Figure 13:
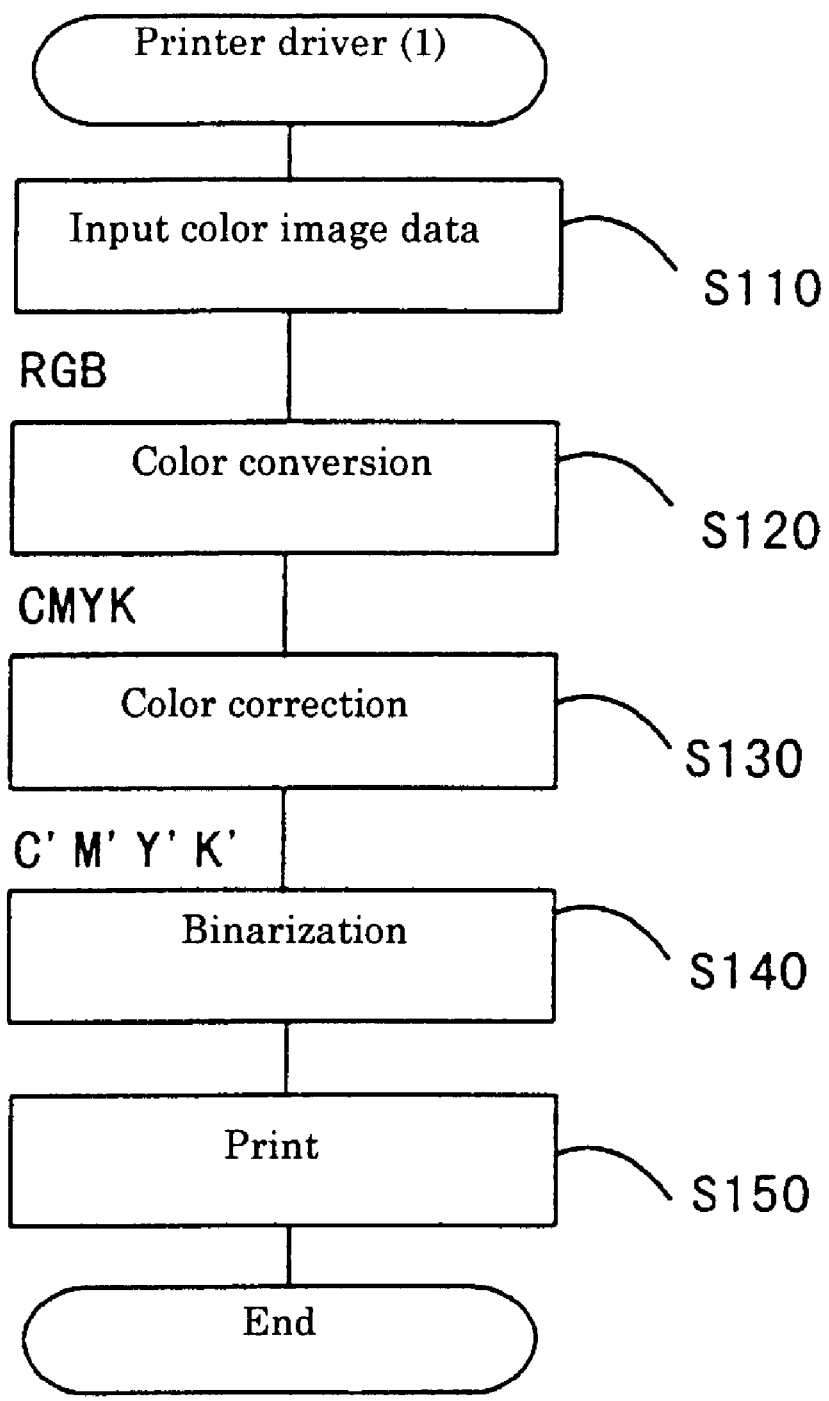
FIG. 13 is a flowchart of a printer driver according to a first example.

In the computer 21, the printer driver executes the aforesaid steps S13 to S15. FIG. 13 shows an ordinary printing procedure of the printer driver. When color image data comprising RGB data (indicating tone displaying data with respect to element colors of red, green and blue) is inputted at step S110, it is firstly converted into CMYK data (indicating tone displaying data with respect to element colors of cyan, magenta, yellow and black) at step S120. The color conversion in the different color space is performed by a known method, thereby omitting the detailed explanation. The CMYK data subject to the color conversion can express the same color as RGB data only after the color ink in the reference amount is ejected. However, color reproducibility is deteriorated in case where there is an unevenness in the color ink ejecting amount as described above. Therefore, it is necessary to correct the CMYK data to C'M'Y'K' data foreseeing the deviation in the color ink ejecting amount as shown in step S130. For example, it can be said that the CMYK data with respect to a color having less color ink ejecting amount is set to slightly greater than the reference so as to be suitable by subtraction, while that the CMYK data with respect to a color having more color ink ejecting amount is set to slightly smaller than the reference so as to be suitable by subtraction. A binarization is performed at step S140 by using the C'M'Y'K' data obtained in this way to be printed at step S150, whereby color reproducibility is enhanced.

The color correction at step S130 is substantially performed by such operation of the printer driver as forming a color correction look-up table upon its activation as well as incorporating the color correction look-up table into a color conversion look-up table. Specifically, the printer driver executes at first a reading of the uneven data from the PROM area shown in step S13. The main body of the execution here is a CPU of the computer 21, such procedure itself is a printer driver program recorded in the hard disc 22 and the CPU suitably reads a necessary program to develop it on the RAM for execution.

The reading of the uneven data is performed by executing a bidirectional communication with a peripheral apparatus by CPU. The bidirectional communication with the peripheral apparatus is performed by also utilizing a basic program or the like recorded on ROM or the like. Specifically, the CPU communicates with the printer 31 to read the data of the ejecting amount stored in the PROM area of the print head 31a via the printer controller 31e and the print head controller 31b. Briefly, the procedure for reading the ejecting amount data in this way and the hardware environment are just the things to construct the deviation receiving means.

A fact that the deviation from the reference can be obtained is given as a merit in case that the ejecting amount data is kept in the print head 31a. In case where a relative strength and weakness among the print nozzles are judged by printing a patch as described later, it cannot be judged with respect to a relatively weak one whether it is because the weak one is weaker than the reference or it is because the other one is too strong. However, a deviation in the absolute meaning can be obtained if the result measured at the factory is kept.

Figure 14:
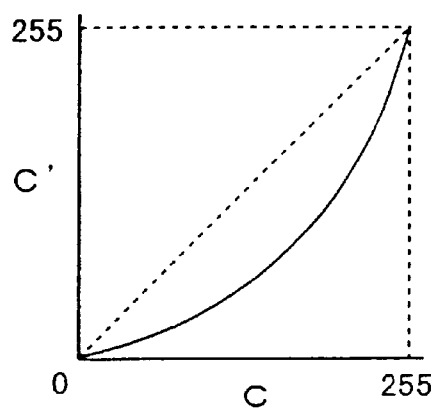
FIG. 14 is a view showing a corresponding relationship in which input/output characteristics is converted based upon the measured result shown in FIG. 12.
Figure 14:
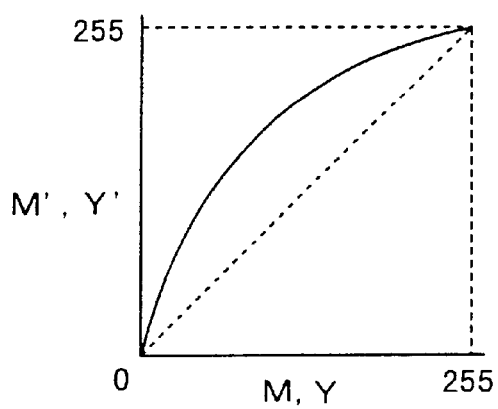
Figure 14:
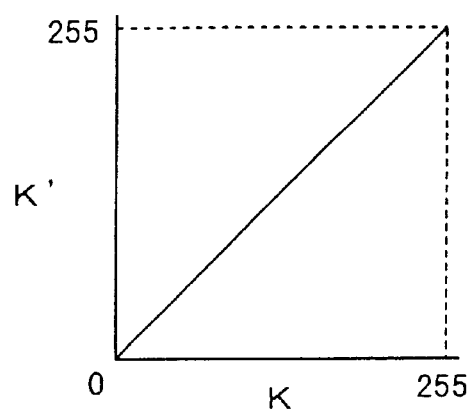

After the deviation is obtained, a look-up table for color correction is formed at step S14. As shown in FIG. 12, cyan is stronger than the reference while magenta and yellow are weaker than the reference, so that a corresponding relationship in which the data of cyan C' corrected with respect to the original data of cyan is generally made slightly weaker while the data of magenta M' and yellow Y' corrected with respect to the original data of magenta M and yellow Y are generally made slightly stronger is formed in the look-up table as shown in FIG. 14. Moreover, the data of black agrees with the reference, thereby not changing its characteristics between input and output. The conversion characteristics between input and output. here will be explained later in detail.

At the subsequent step S15, values of the color conversion look-up table are rewritten by using the color correction look-up table. Accordingly, the correction into C'M'Y'K' data foreseeing the deviation of output characteristics of the printer 31 is performed simultaneous with the conversion of the color space to CMYK by referring to the color conversion look-up table based upon the RGB data. Briefly, it can be said that the operation in which the printer driver performs the color conversion by using the look-up table prepared in advance at steps S14 and S15 as well as its hardware construction construct the color correction means.

Although the color ink ejecting amount is indirectly measured via a density in the aforesaid example, the ink ejecting amount may directly be measured. It is of course difficult to measure a color ink weight ejected per one dot (shot). Therefore, it is possible to measure a color ink weight used by several million shots and to divide the obtained weight by the number of shots for measuring a color ink ejecting amount per one shot.

FIG. 15 shows a corresponding table of an ink weight of color ink used per one shot in each print head unit 31a1 and its classification. In this example, a classification of "1" to "21" is performed with a color ink amount of 20.5 to 21.0 ng per one shot as a reference "1", each class being called as ID. As apparent from the figure, the smaller the ID is, the heavier the ink weight becomes, so that plenty of color ink is used. Conversely, a small amount of color ink is used as the ID becomes great. Therefore, in the case of great ID, the deviation can be eliminated by densifying the density shown by the data. Conversely, in the case of small ID, the deviation can be eliminated by lightening the density.

Figure 16:
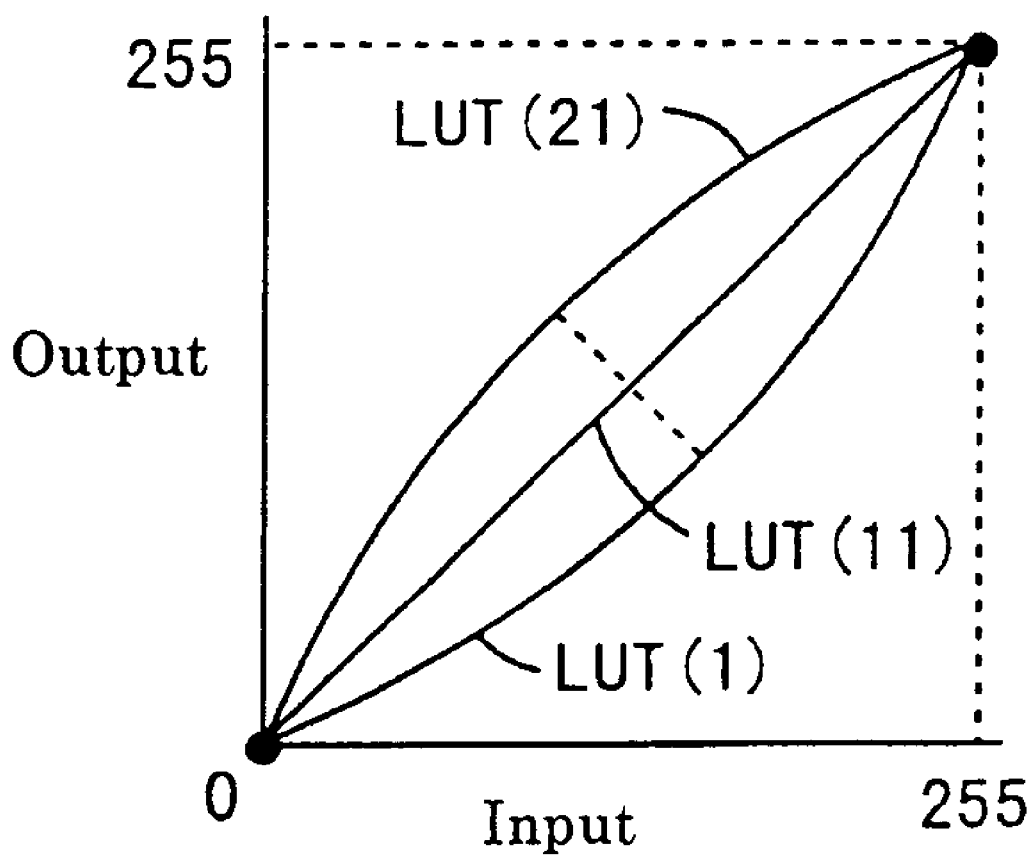
FIG. 16 is a view showing a corresponding relationship between input and output at a color correction look-up table corresponding to the classification.

Therefore, the color correction look-up tables LUT1 to LUT21 converted between input data and output data are prepared in advance as shown in FIG. 16 corresponding to ID, whereby the deviation can be eliminated by performing the conversion of data in accordance with the color correction look-up tables LUT1 to LUT21. The function shown in FIG. 16 is a well-known tone curve of γ compensation. On the assumption of RGB data of 256 tones, γ curve means an input/output relationship where Y=255×(X/255)**γ. In the case of γ=1, an emphasize is not performed between input and output. In the case of γ>1, the output is weaker than the input. In the case of γ<1, the output is stronger than the input. In the present embodiment, γ of the tone curve in which the printing result becomes most linear corresponding to ID is obtained in advance by an experiment for forming look-up tables LUT1 to LUT21 corresponding to each ID.

The deviation receiving means is realized so far on the assumption that the data showing the deviation is recorded in the printer 31. However, the technique in which the deviation is recorded in the printer 31 can enhance color reproducibility without performing adjustment to the hardware but cannot deal with age softening by itself.

It is necessary that the user can easily adjust the printer for dealing with the age softening without performing an adjustment at a factory. By this, the age softening can be dealt with and further, can be dealt with in case where the printer 31 does not possess the data showing a deviation.

Figure 17:
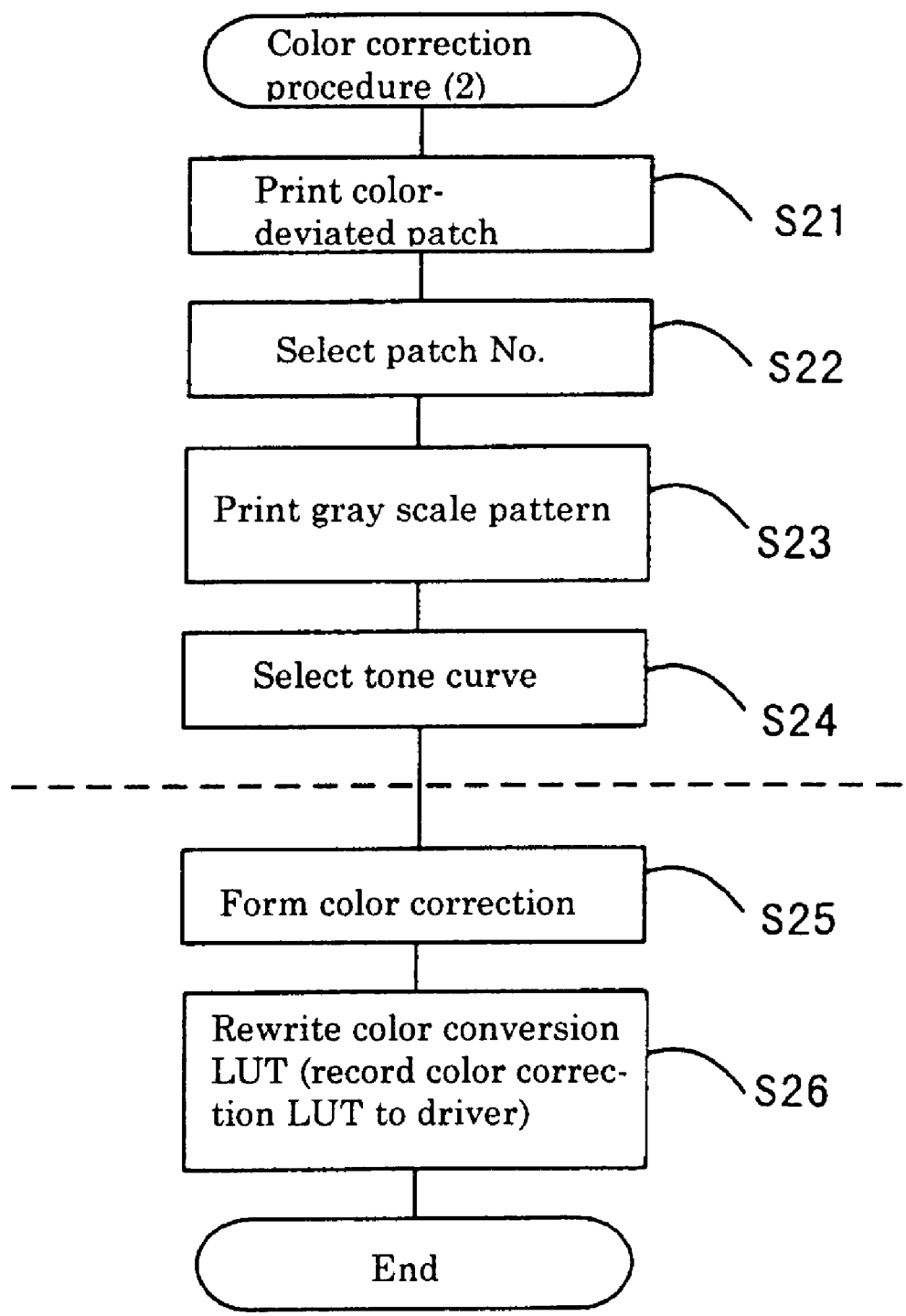
FIG. 17 is a view showing a second color correction procedure.

FIG. 17 shows a procedure of this case. In reality, the printer driver executes the following steps upon being activated. Printing of patches and input by the user are executed at steps S21 to S24, whereby the computer 21 receives the deviation. Firstly explained is this deviation receiving method.

Figure 18:
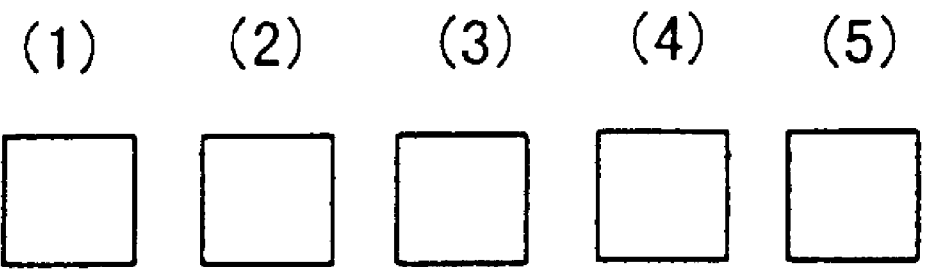
FIG. 18 is a view showing a color-deviated patch for judging strength and weakness among element colors.

FIGS. 18 and 19 show patches which the computer 21 causes the printer 31 to print and their data. At step S21, five color-deviated patches marked with (1) to (5) are printed on a paper. The color data in the printing is the one obtained by subtly changing red component. As shown in FIG. 19, tone values of green component and blue component are fixed to "64", while tone values of only red component are changed within the range of "48" to "80" at an interval of "8". This interval is required to review the overall tendency, so that it is not necessarily made too small. There is a tendency that cyanish gray is printed when the red component is weak as in the patch (1), while reddish gray is printed when the red component is strong as in the patch (5).

As apparent from the color data, the patch (3) should be outputted as gray because each component of red, green and blue agrees with one another in the patch (3). However, the patch (3) is not always outputted as gray due to the deviation in the color ink ejecting amount in case where the printer 31 prints the patch based upon the color data as described above.

At step S22, the user looks at these patches to select the patch number closest to gray and inputs this selected number from the key board 23. When the patch (3) is selected as closest to gray, the correction is unnecessary. However, when the patch (4) or (5) is judged to be closest to gray, this judgement proves that the cyan is strong. On the other hand, when the patch (1) or (2) is judged to be closest to gray, this judgement proves that the cyan is weak. Specifically, this selection corresponds to the judgement of the balance of strength and weakness of every element color in the printer 31.

Figure 20:
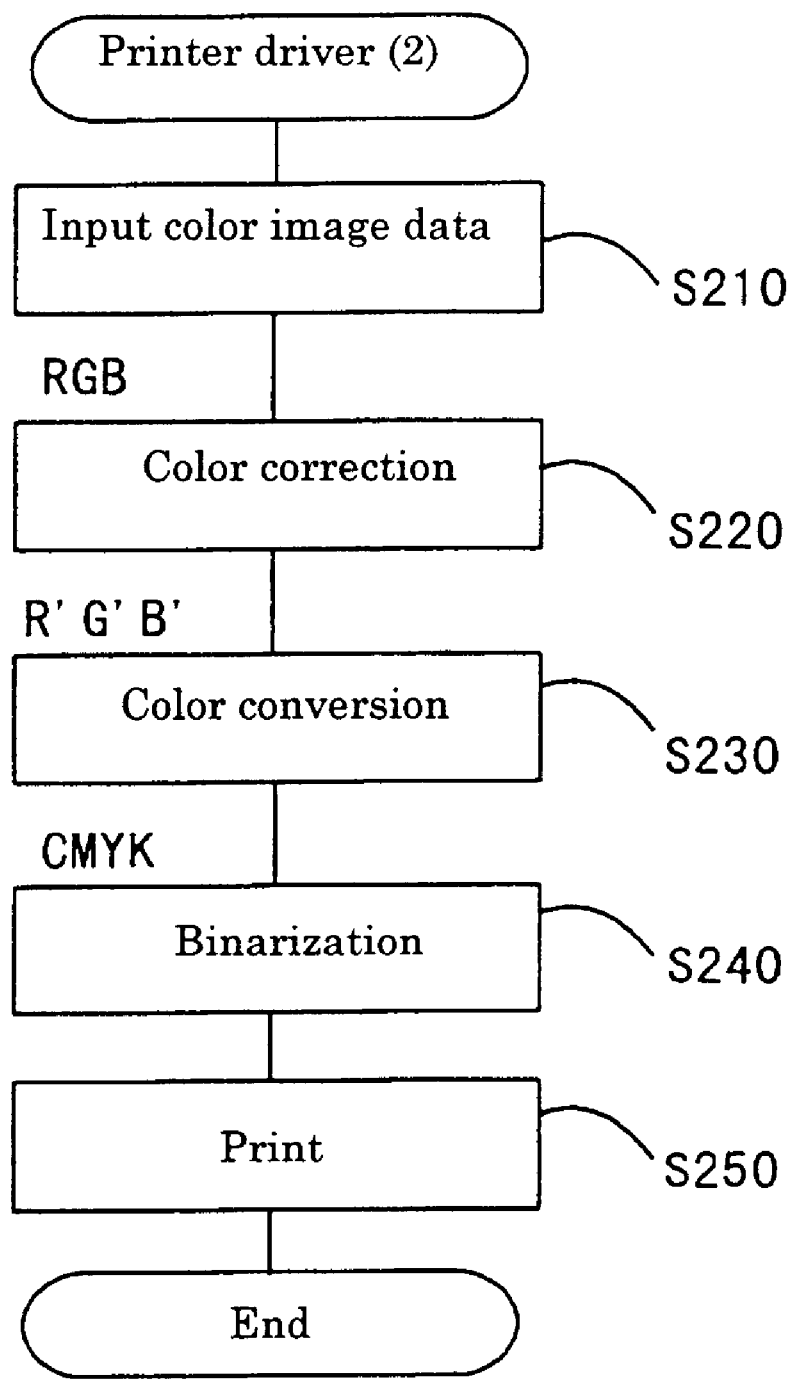
FIG. 20 is a flowchart of a printer driver according to a second example.

If there is an assumption that the color conversion from the RGB data to the CMYK data is executed as shown in FIG. 13, it is possible to give an influence to the printing result by the printer 31 even after or before this color conversion in case where cyan is strong. The aforesaid example shows the correction of the CMYK data, so that the example of correcting the RGB data will be explained here as shown in FIG. 20.

Figure 21:
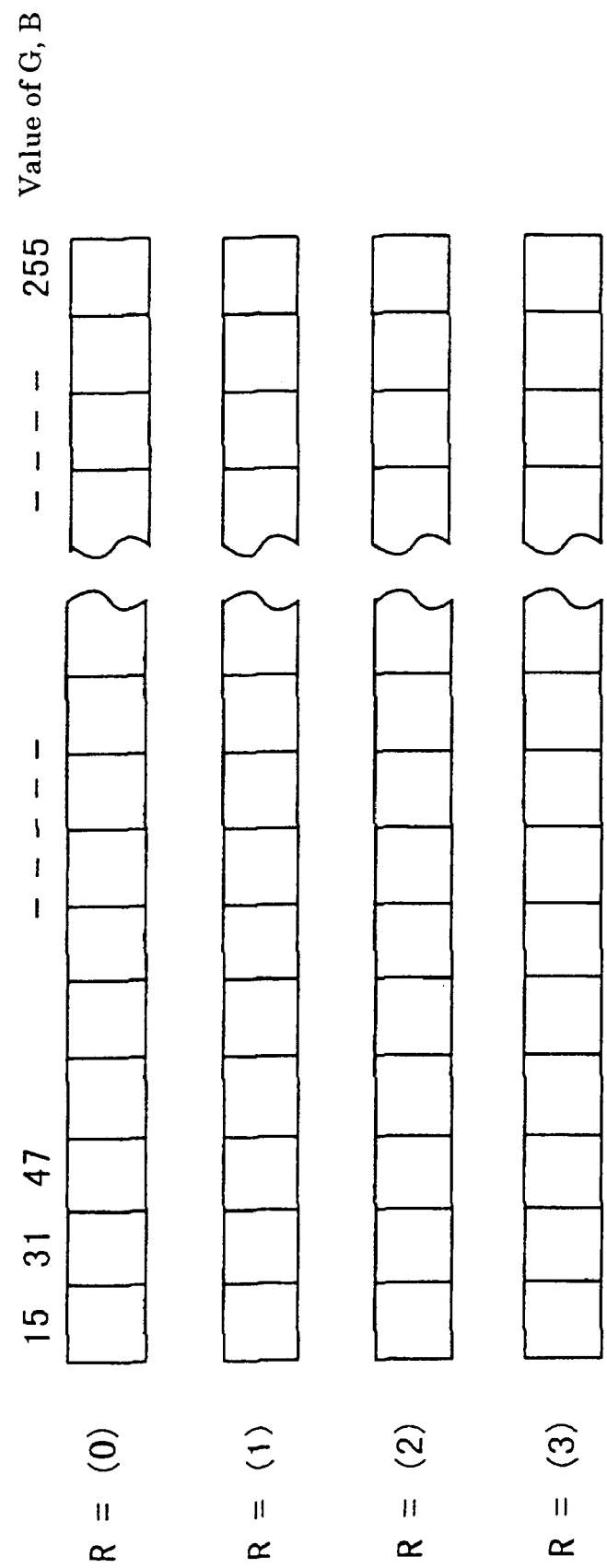
FIG. 21 is a view showing a gray scale pattern for selecting a correction manner.
Figure 22:
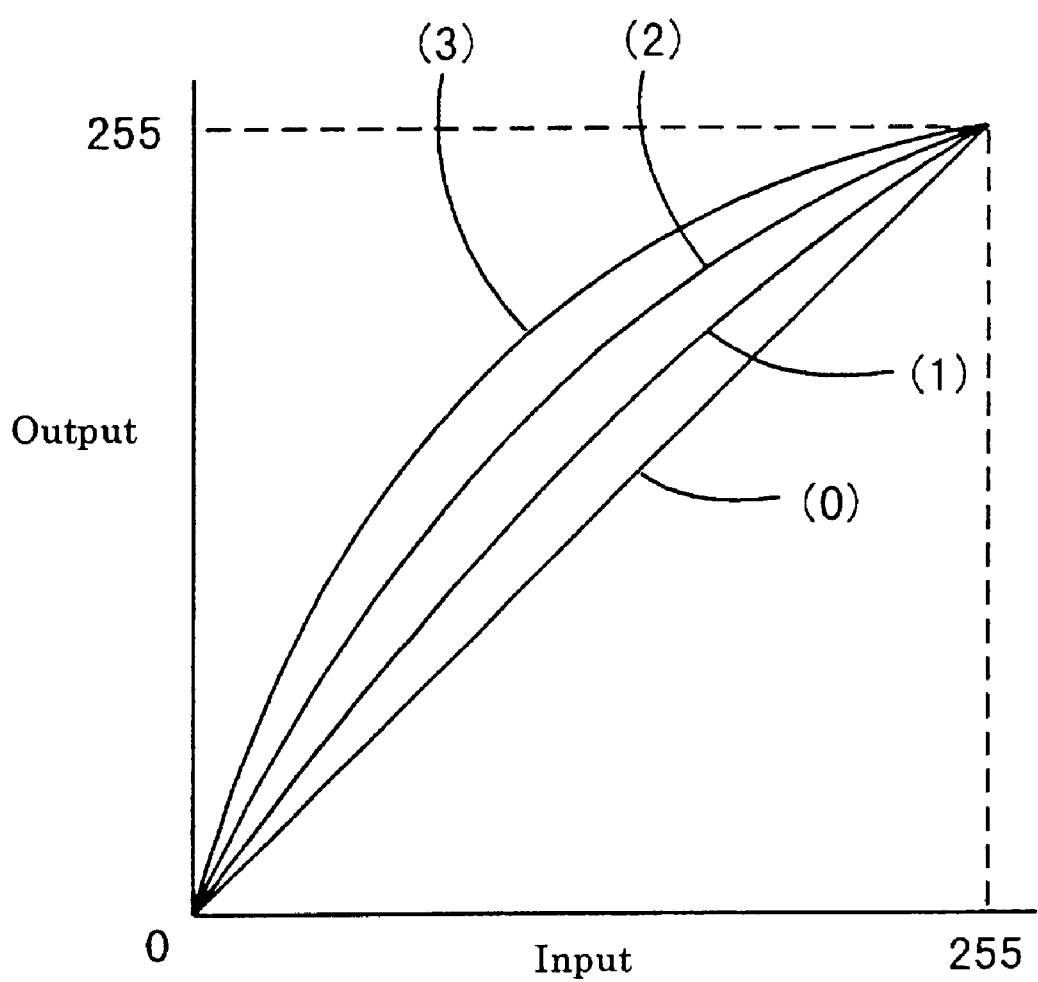
FIG. 22 is a view showing a corresponding relationship between input/output and the correction manner for utilizing γ curve.
Figure 23:
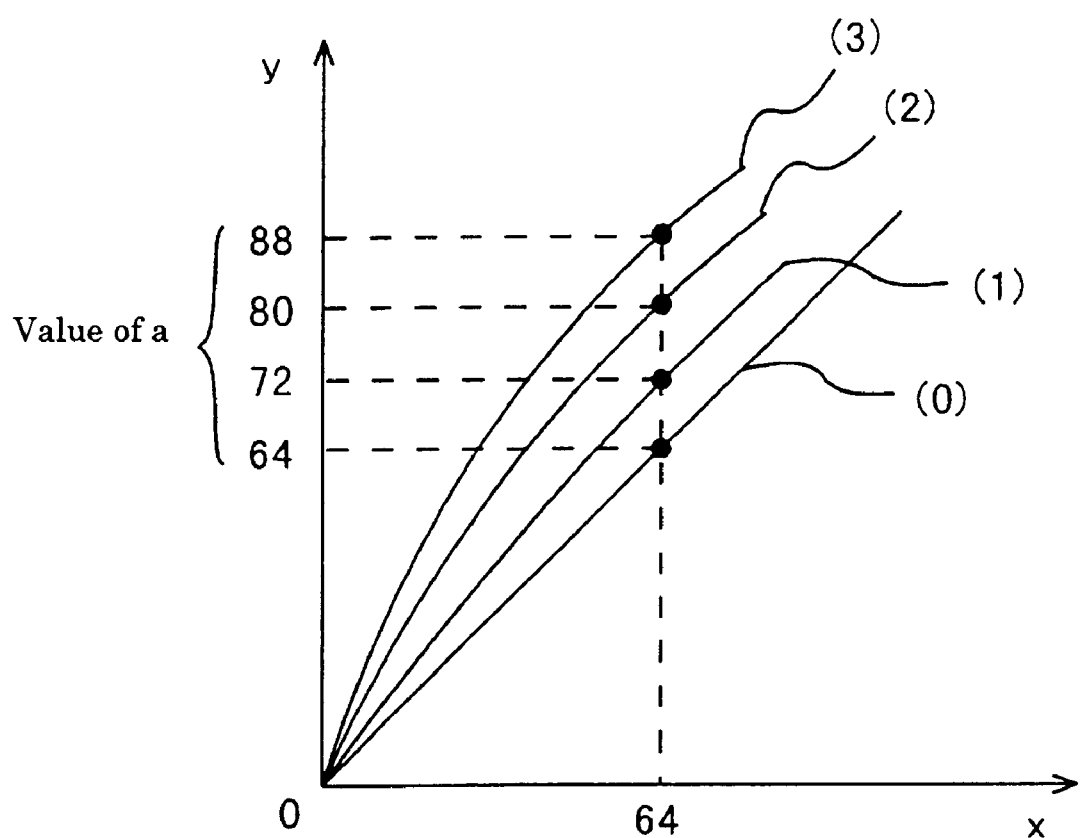
FIG. 23 is a view showing a corresponding relationship between input/output and the correction manner for utilizing spline curve.

FIGS. 21 to 23 show that the patch selected by the user is (4) or (5), i.e., the color correction performed in case where cyan is tend to be strong.

The printer driver judges the color correction for emphasizing a red component if the patch (4) or (5) is selected at step S22, and then, prints a gray scale pattern at step S23 for judging to what degree the emphasizing correction should be made. The gray scale pattern used herein means the one in which consecutive patch-like grays having different tone value are printed by changing its emphasizing degree when the emphasizing correction utilizing tone curve with respect to a red component is performed. In FIG. 21, the gray scale is printed with the mark of its tone curve. FIG. 22 shows a corresponding relationship between input and output in each tone curve. As shown in the figure, it can be understood that the emphasizing degree is great as the mark of the tone curve becomes large.

In the present embodiment, γ compensation is adopted as the tone curve and the gray scale is printed by changing the γ at an interval of "0.05", thereby obtaining a satisfactory result.

It is not always limited to γ compensation as the tone curve. A spline curve shown in FIG. 23 is frequently used as the tone curve. In this example, the degree for emphasizing the data of tone value "64" with respect to a red component can be selected within the range of "64" to "88" at an interval of "8" on the assumption of the RGB data of 256 tones. Specifically, the correction is made such that the tone curve is gently drawn by passing through the points of input/output (0,0), (64,a) and (255,255) at the tone values of "0", "64" and "255". The correction in the vicinity of the tone value "64" is used here because there is a tendency that human sense feels the range of about a fourth to a third of all the tone ranges as a medium. Further, if this tone curve is not utilized, the degree for the correction every tone value must be individually directed, thereby greatly troublesome.

The user executes the selection of the tone curve at step S24, which corresponds to the selection of emphasizing manner. Then, a look-up table for performing the color correction to the RGB data based upon the emphasizing manner selected in this way is formed at step S25 and this look-up table is incorporated into a color conversion look-up table at step S26. Accordingly, the correction into C'M'Y'K' data foreseeing the deviation of output characteristics of the printer 31 is performed simultaneous with the conversion of the color space to CMYK by referring to the color conversion look-up table based upon the RGB data.

Specifically, it can be said that steps S21 to S24 construct the deviation receiving means and that the operation in which the printer driver performs the color conversion by using the look-up table prepared in advance at steps S25 and S26 as well as its hardware construction construct the color correction means.

Figure 24:
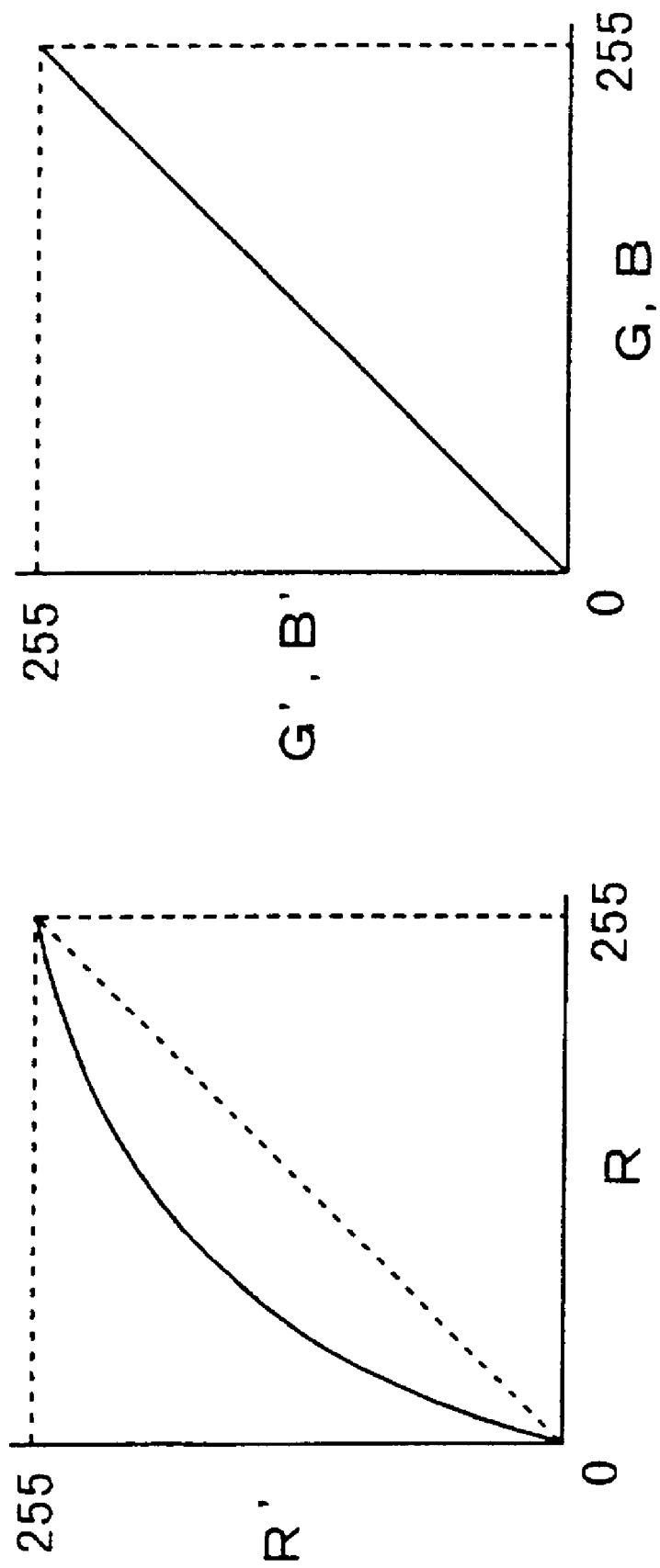
FIG. 24 is a view showing a corresponding relationship of input/output in case of emphasizing to correct only red component.
Figure 25:
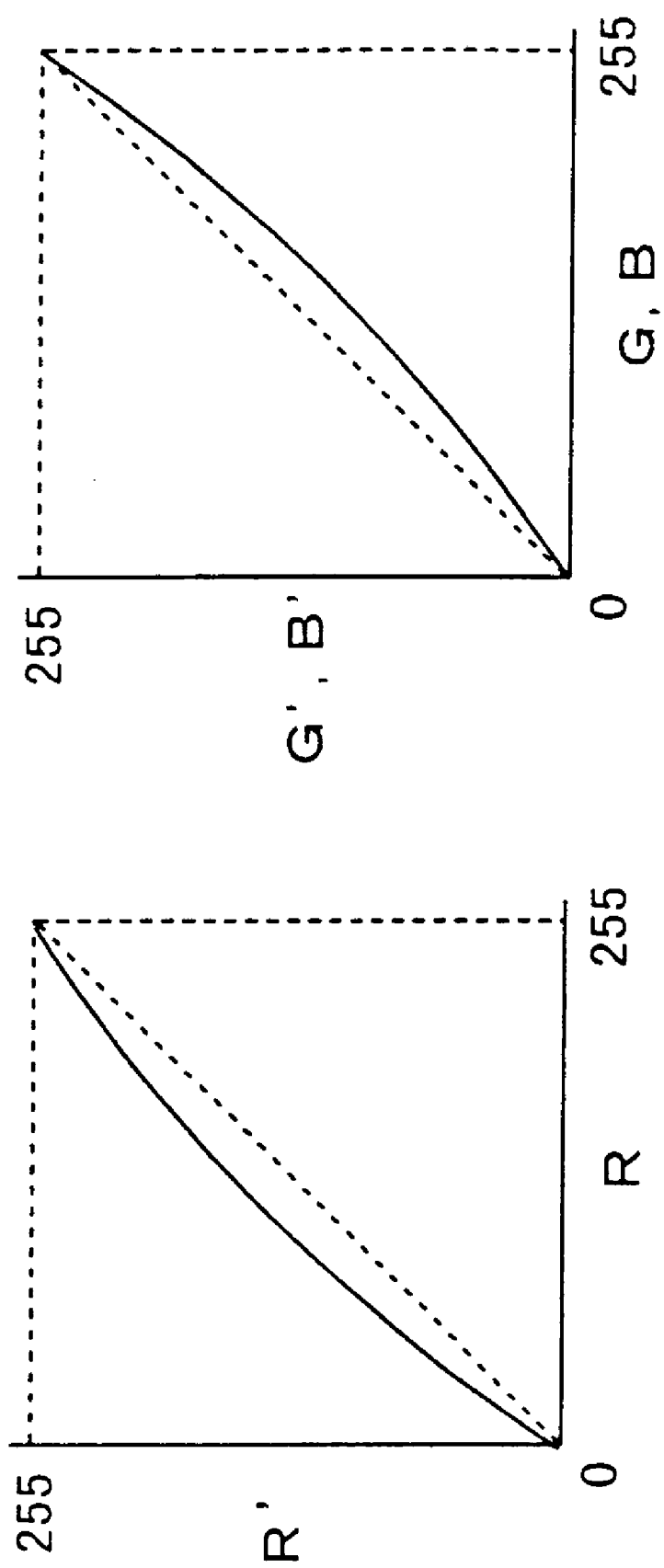
FIG. 25 is a view showing a corresponding relationship of input/output in case of relatively emphasizing to correct red component.

As explained in the case of keeping the deviation in the printer 31, a relative deviation can be obtained but the deviation from the reference cannot be obtained when the user selects among these patches the one closest to gray. Accordingly, it is possible to adopt the tone curve which emphasizes only the red component as shown in FIG. 24 or to adopt the tone curve which slightly emphasizes the red component with the green and blue components slightly weakened as shown in FIG. 25, on the assumption that the same red component is emphasized with respect also to the tone curve.

Figure 26:
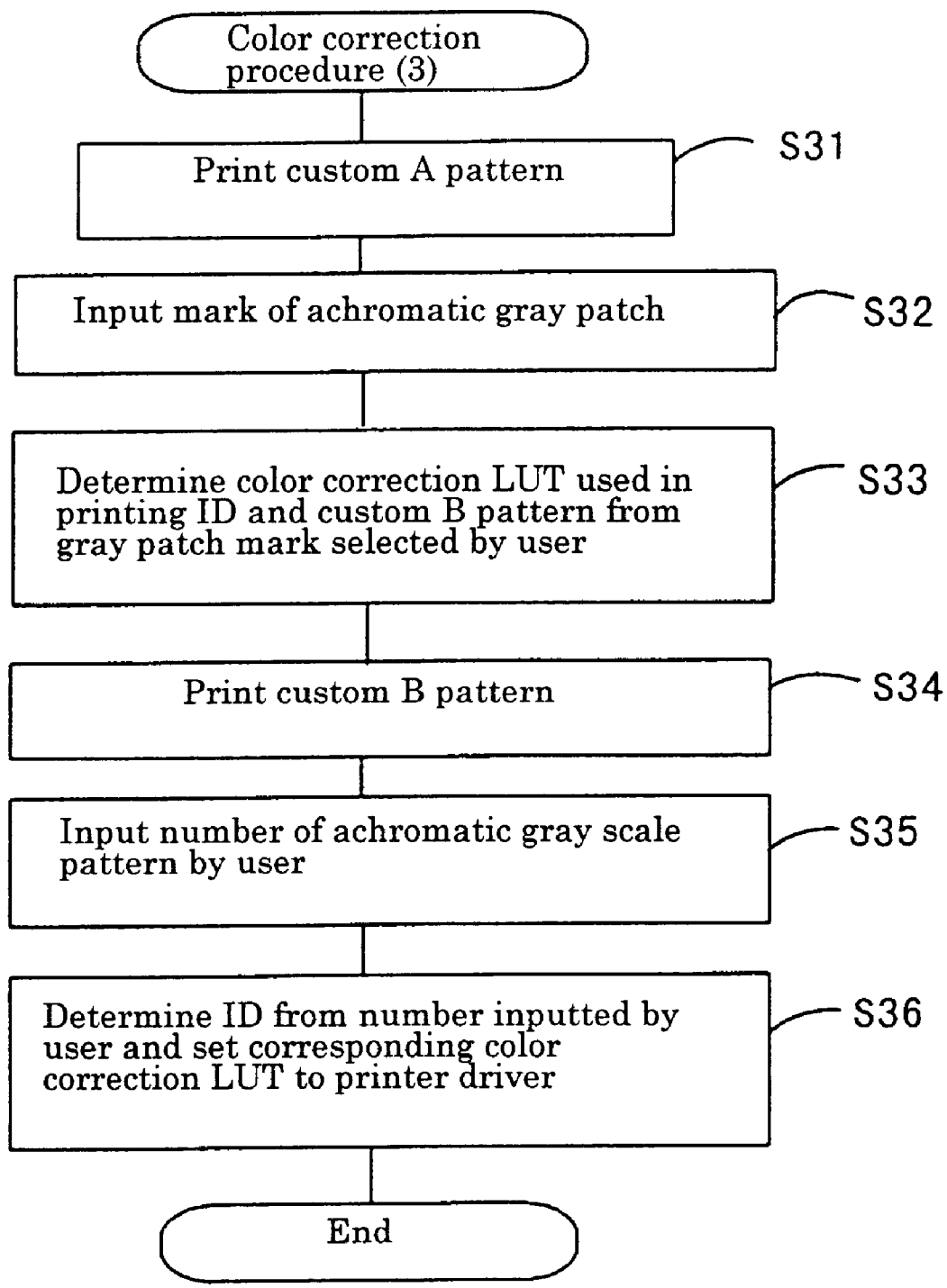
FIG. 26 is a view showing a flowchart of a color-deviation adjusting program.

The color deviation occurs due to a difference between two print head units 31a1 in the aforesaid embodiment, so that the direction has been found that the color deviation can be eliminated by changing the tone value of only the red component with the green and blue components fixed as shown in FIG. 19. However, in case of providing the print head unit in which red, green and blue components are respectively independent, gray cannot be obtained only by increasing or decreasing a single component. FIG. 26 shows a procedure of this case.

Figure 27:
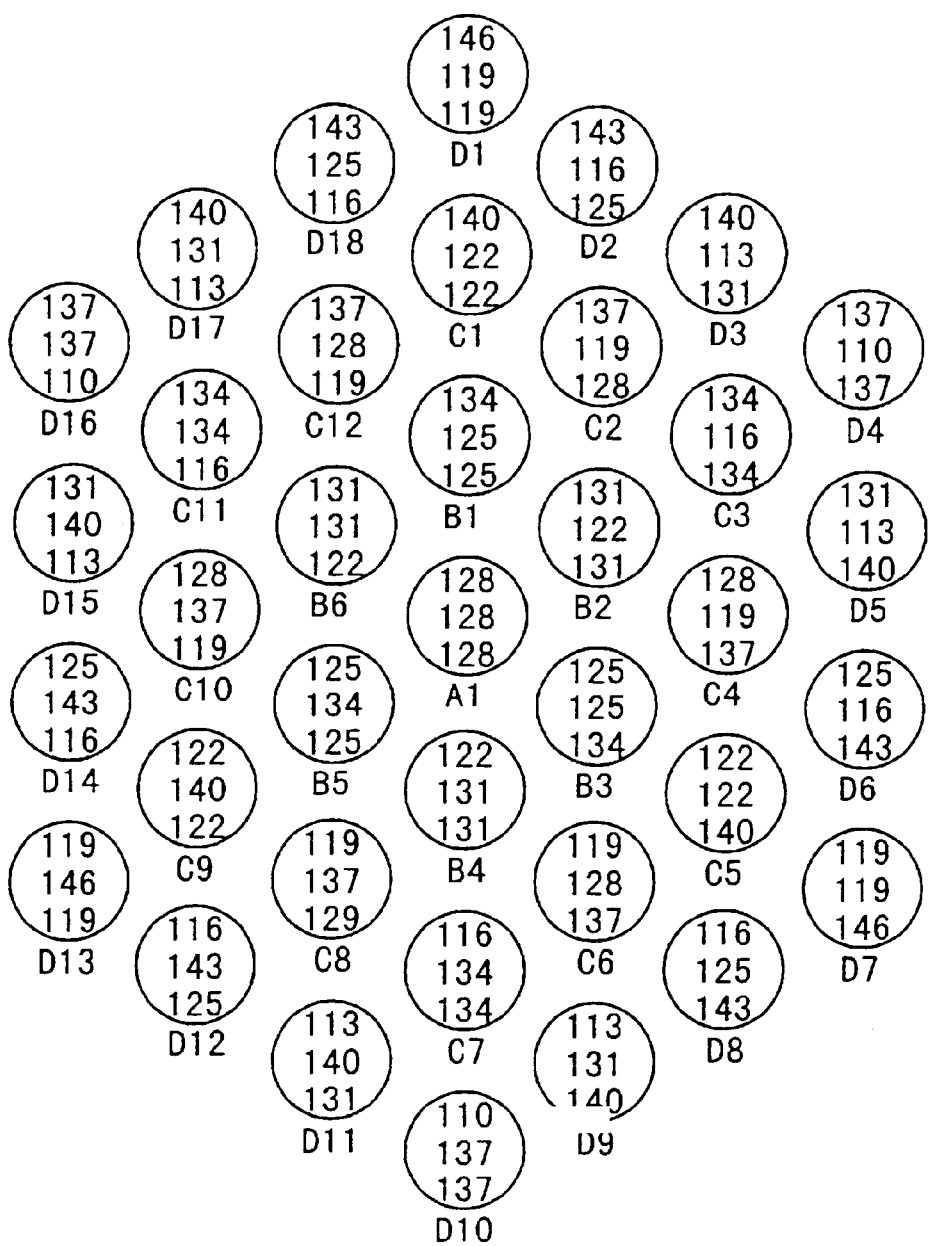
FIG. 27 is a view in which a custom A pattern is illustrated by component data of RGB data.
Figure 28:
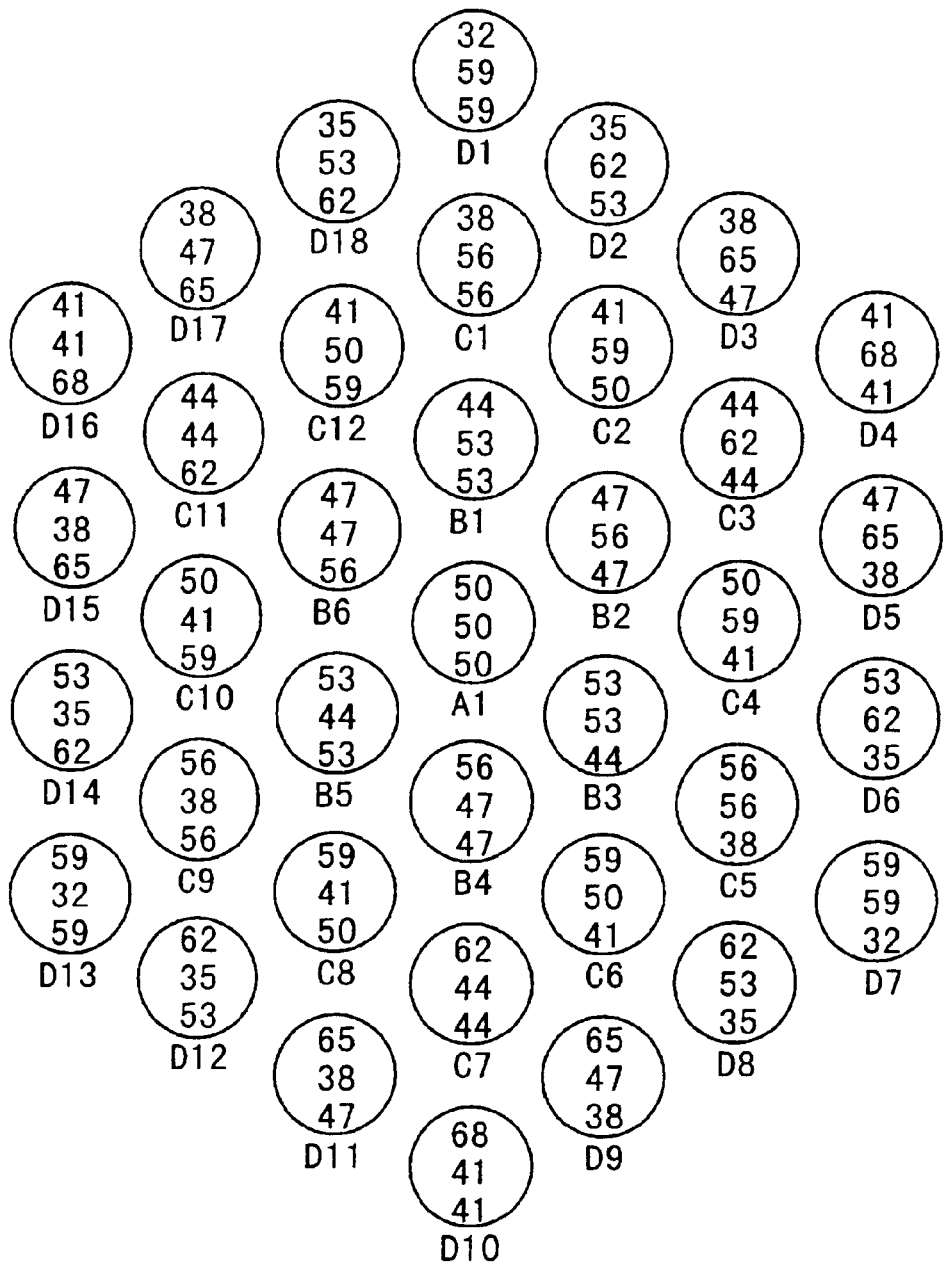
FIG. 28 is a view in which a custom A pattern is illustrated by component data of CMYK mode.
Figure 28:

This procedure is explained in detail hereinafter. A custom A pattern which is a test pattern at the first stage is printed at step S31. FIGS. 27 and 28 show the custom A pattern which is constituted by a plurality of circular gray patches each having slightly different component data. FIG. 27 shows component data with RGB data of 256 tones, FIG. 28 shows component data with a percentage of CMYK data and FIG. 29 shows a list thereof.

The component data of each gray patch is slightly changed in accordance with a predetermined regularity. Specifically, the component data of the central gray patch is equivalent, the red component (R) increases toward the upper direction of the figure while decreases toward the lower direction, the green component (G) increases toward the lower left direction of the figure while decreases toward the upper right direction, and the blue component (B) increases toward the lower right direction of the figure while decreases toward the upper left direction. Briefly, a coordinate axis of the red component which is an element color is set from the upper direction toward the lower direction, a coordinate axis of the green component which is an element color is set from the lower left direction toward the upper right direction, and a coordinate axis of the blue component which is an element color is set from the lower right direction toward the upper left direction, whereby the data of each component increases or decreases in proportion to the coordinate determined by these coordinate axes.

Accordingly, all combinations obtained by changing the balance of all the element colors within a predetermined range are illustrated in this custom A pattern. If color ink is ejected as this component data, the central gray patch A1 must be seemed to be achromatic while the patches in the vicinity thereof must be gray influenced with either one of the element colors due to the loosed balance of the element colors. Further, the deviation amount of the balance increases in the patches apart from the central patch.

However, the expected color ink amount is not ejected in case where there is a deviation in used ink amount of the print head unit, so that the balance is kept not in the gray patch of A1 but in the other gray patch. FIG. 30 shows a corresponding relationship counting backward its relationship by utilizing the classification shown in FIG. 15. For example, in case that the patch A1 seems to be achromatic, the ID of used ink amount of cyan becomes "11", the ID of used ink amount of magenta becomes "11" and the ID of used ink amount of yellow becomes "11", to thereby be equivalent. On the other hand, if the patch C4 seems to be achromatic, it is found that the ID of used ink amount of cyan becomes "11", the ID of used ink amount of magenta becomes "15" and the ID of used ink amount of yellow becomes "7". Namely, the ejecting ink weight slightly decreases in the order of yellow, cyan and magenta, with the result that the deviation in strength and weakness among each element color is obtained.

The gray patches are composed of the central patch A1 and the patches B1 to B6 at the outer peripheral of the central patch A1, the patches C1 to C12 at the outer peripheral of the patches B1 to B6 and the most outer patches D1 to D16, wherein the patch is not shifted outside from the patches C1 to C12 by the hardware check. The patches D1 to D16 are printed in spite of this so as to present gray patches at both sides considering the fact that accurate judgement can be obtained by comparing the gray patch at both sides in a plurality of gray patches in which the component data is deviated with a predetermined tendency when an achromatic is selected.

Each of the gray patches in the custom A pattern shown in FIGS. 27 and 28 are printed with each element color of CMY, while a reference patch to the tone value of "128" is printed with only a black ink at the bottom portion of the paper with a perforated line. There may be the case where it is difficult to judge a patch to be achromatic or not when a great many of gray patches are arranged. In particular, there is a possibility that it is difficult to judge a patch to be achromatic or not due to a color of paper or illumination. However, the reference of achromatic can be confirmed by comparing with the reference patch printed with only a black ink, thereby enhancing accuracy upon selecting the achromatic patch among the gray patches.

In case where the gray patch is selected among the custom A pattern, the degree of strength and weakness is felt to be understood. However, the deviation of strength and weakness judged here is only the deviation in the vicinity of "128", so that it is not always suitable to set the IDs of cyan, magenta and yellow to "11", "15" and "7" respectively.

Figure 31:
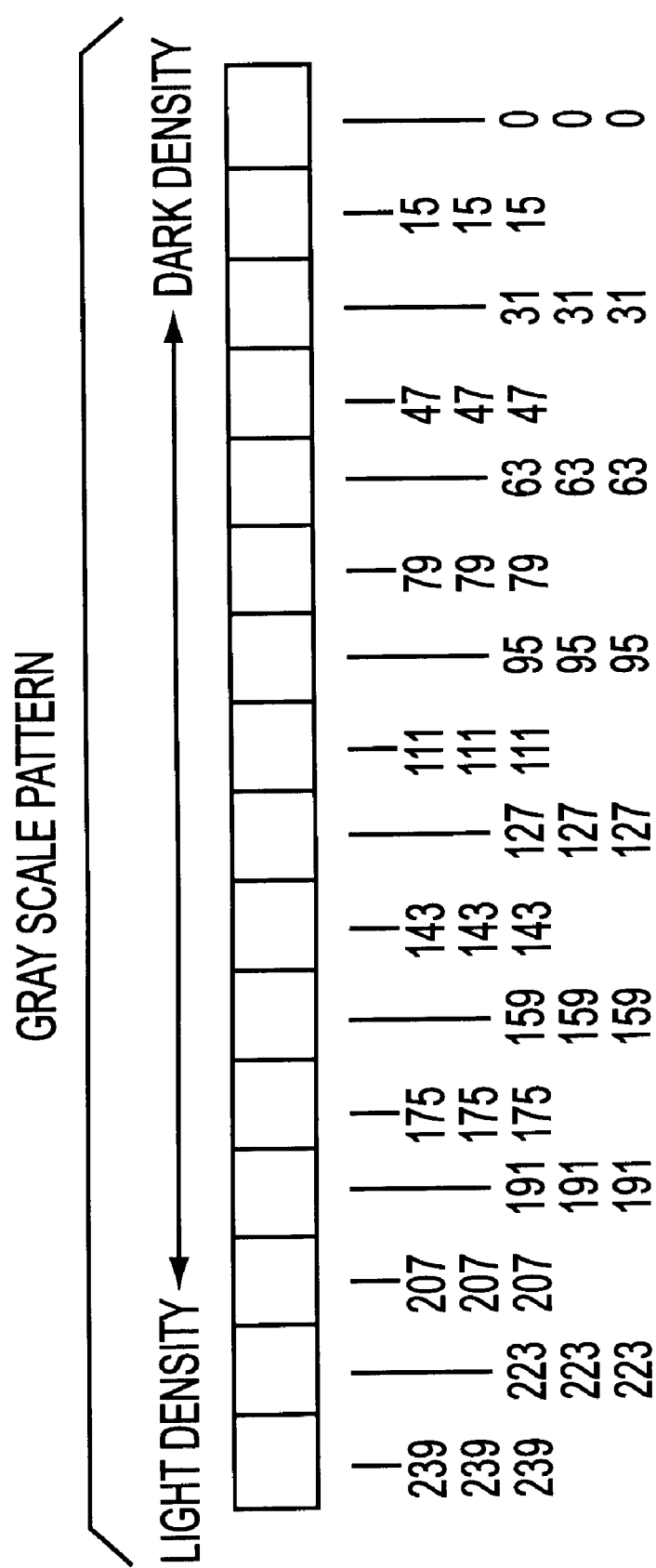
FIG. 31 is a view showing a gray scale constructing a custom B pattern.

Accordingly, after the user selects the gray patch which is seemed to be achromatic among the custom A pattern at step S32 and inputs the selected patch to the computer 21 from the key board 23, the computer 21 selects at step S33 a proposed one of the color correction look-up tables LUT1 to LUT 21 shown in FIG. 16 for printing a custom B pattern shown in FIG. 31 at step S34. The custom B pattern is constituted such that gray patches in which the component data is changed in accordance with one color correction look-up table are printed in the lateral direction of the figure while the color correction look-up tables are changed in the longitudinal direction of the figure to thereby finally print twenty-seven gradational gray scale patterns.

Even when the patch A1 is selected as achromatic among the custom A pattern, the balance is happened to be kept in the vicinity of the component data of "128", whereby it may not be linear at other tone values. Therefore, three IDs are proposed within a range of plus and minus "1" of the ID of each element color selected among the custom A pattern, whereby the component data shown in FIG. 27 is corrected by using twenty-seven color correction look-up tables in total obtained by combining each ID for printing the custom B pattern.

FIG. 32 shows the case where A1 is selected to be achromatic among the custom A pattern. If it entirely goes on with the ideal, the 14th gray scale pattern has to seem to be achromatic all over the tones. However, it may be possible that the other gray scale pattern seems wholly to be achromatic in view of the balance of other tone value. Moreover, FIG. 33 shows the case where C4 is selected to be achromatic among the custom A pattern. Namely, anyone which seems to be achromatic all over the tones among twenty-seven gray scale patterns may be selected with the pre-obtained ID rendered as the basis.

After the selected result is inputted to the computer 21 from the key board 23 at step S35, a color correction look-up table is also determined in accordance with the finally selected ID to be set to the printer driver so as to be incorporated into a color conversion look-up table used for the color conversion by the printer driver.

In the examples so far, a predetermined element color is only single, for example, using four inks or RGB data. Therefore, characteristics conversion between input and output such as changing the tone curve is effective. However, there may be the case where six inks are used in which dark color and light color are provided with respect to cyan and magenta as described above. In case that a plurality of densities can be selected in some element color in this way, conversion characteristics of input/output can be changed by changing the selection of dark color and light color as well as its mixing ratio.

For example, when the dark color is represented by C and the light color is represented by c with respect to cyan while the dark color by M and the light color by m with respect to magenta as in the same manner, the color conversion LUT is referred to for performing the color conversion into six colors of CcmMYK as shown in FIG. 34(a) at step S120 in FIG. 13 in which RGB data is subject to the color conversion to be converted to CMYK data. On the other hand, the ratio of the dark color of cyan may increase while the ratio of the light color thereof may decrease when cyan is intended to be emphasized. Conversely, the ratio of the dark color of cyan may decrease while the ratio of the light color thereof may increase when cyan in intended to be lightened. Alternatively, it is possible to increase or decrease the ratio of only the dark color considering the influence of the density.

Accordingly, the color correction is possible by uniformly changing the ratio of the dark color and light color as shown in FIG. 34(b) or by changing only the ratio of the dark color as shown in FIG. 34(c) with respect to cyan and magenta in the color conversion LUT to CcMmYK. It is also possible to perform the correction by the tone curve in case that a plurality of densities can be selected in this way.

Although the deviation written in advance in the PROM area of the print head 31a or a patch visually judged by the user among a plurality of patches is selected to be inputted in the aforesaid embodiment, the means for receiving the deviation is not limited thereto. It may be possible that the printed patch is read by image capture means such as the scanner 11 for judging.

Figure 35:
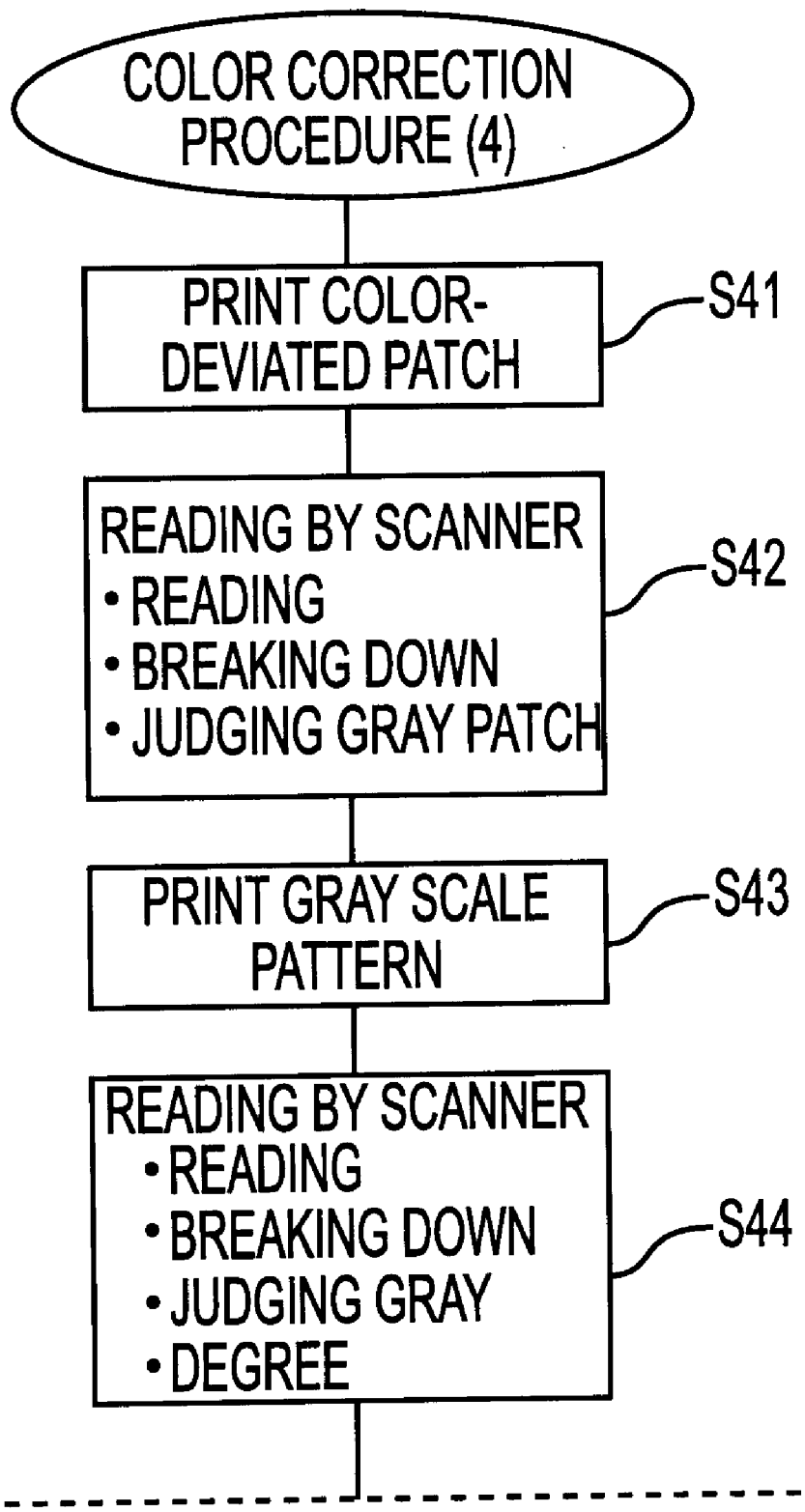
FIG. 35 is a view showing a fourth color correction procedure.

FIG. 35 shows an example wherein a portion of the deviation receiving section shown in the procedure in FIG. 17 is executed by using the scanner 11 and the computer 21. Specifically, five color-deviated patches are printed on the paper at step S41 as in the same manner of step S21 and then read by the scanner at step S42. In this reading by the scanner, the entire of the paper is firstly read by the scanner 11, and subsequently, this five color-deviated patch portions are brought down for judging the balance of RGB component in each patch section, to thereby judge the one closest to gray. In this case, the data causing the color-deviated patches to be printed corresponding to the position where the patches are brought down can be recognized, thereby judging which component is strong.

Which component should be emphasized can be found based upon this judging result, so that a gray scale pattern is printed at step S43 as in the same manner of step S23 for judging the emphasizing degree. Then, the pattern is read again by the scanner at step S44. In this case, the entire of the paper is firstly read by the scanner 11 and then a band of a gray scale pattern is brought down every emphasizing degree as well as a patch is brought down every tone in the gray scale pattern. The gray degree of the patch constructing the gray scale pattern of every emphasizing degree is judged as follows. Briefly, the deviation of red and blue components to the green component every printed patch is added up to obtain a gray degree. Therefore, when each patch is discriminated with i every tone, the following equation is established.

$$(\text{gray degree}) = \Sigma\{(R_i - G_i) + (B_i - G_i)\}$$

This gray degree is calculated every tone curve to select the minimum emphasizing degree. The following procedures are the same as in steps S25 and S26.

Figure 36:
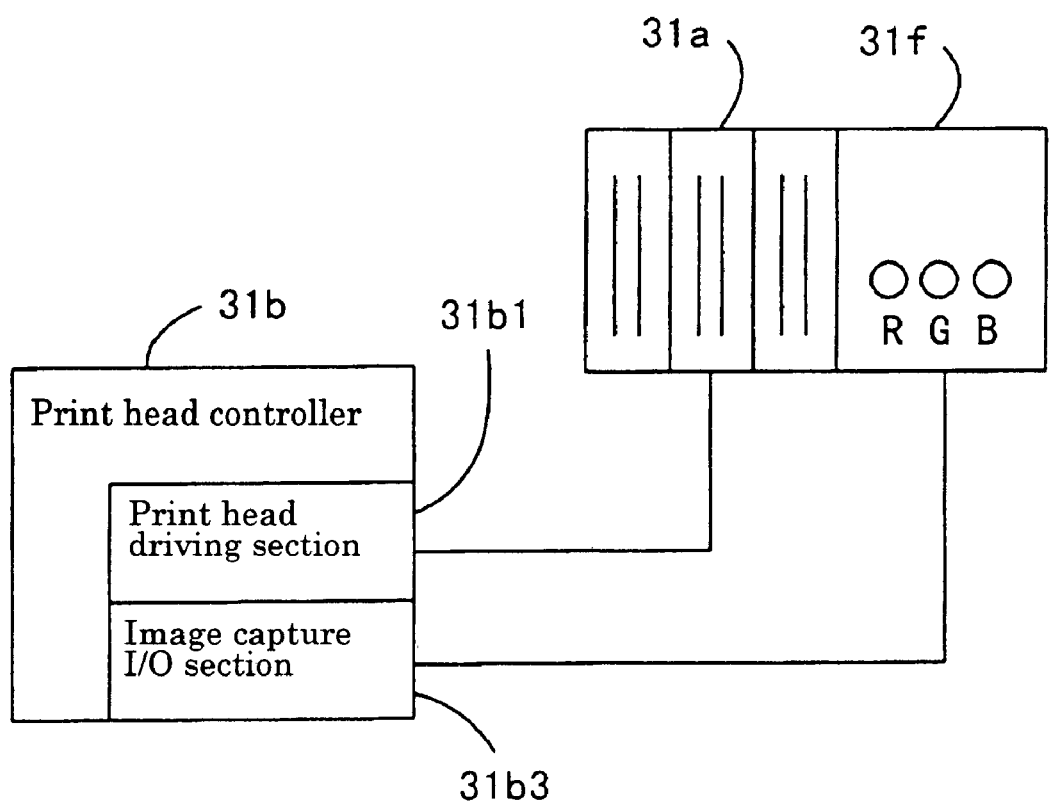
FIG. 36 is a block diagram showing an essential portion of a color printing apparatus provided with image capture means.

Further, image capture means such as the scanner 11 is not separately provided, but the image capture means capable of judging color may be incorporated in the printer 31. FIG. 36 shows an example of such a printer 31 wherein an image capture element 31f capable of reading each component of RGB is arranged with the print head 31a and an image capture I/O section 31b3 is provided in the print head controller 31b. The computer 21 can read the result of the image capture of the image capture element 31f via the printer controller 31e and the image capture I/O section 31b3 of the print head controller 31b. By this construction, when the patch is printed by the print head 31a, the image capture element 31f can image-capture the patch while laterally moving.

Figure 37:
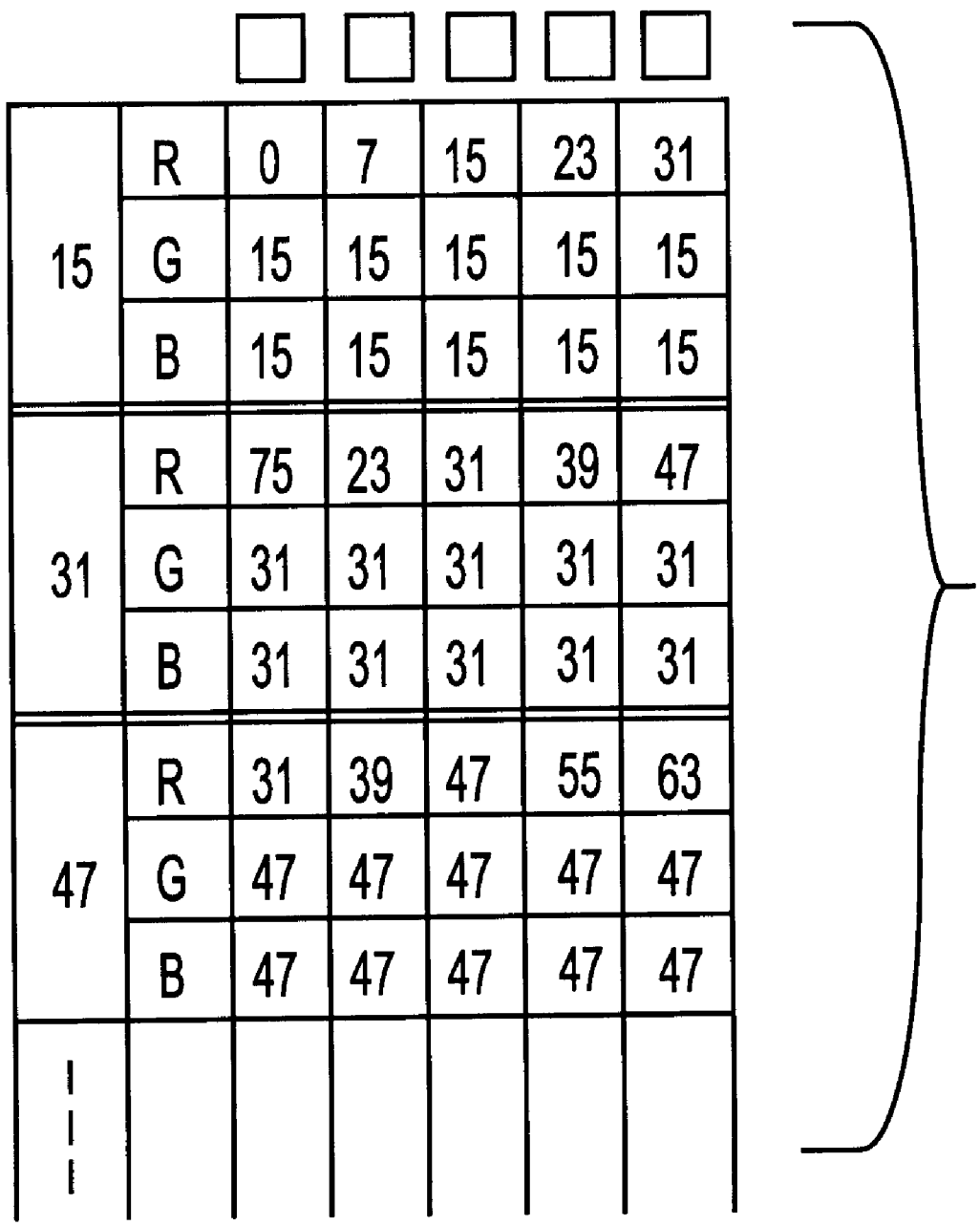
FIG. 37 is a view showing patch data upon printing a patch using a color printing apparatus.

FIG. 37 shows patch data for easily performing the same procedures as in steps S41 to S44 as described above by utilizing the printer 31. The printing and image capture of the patch are simultaneously performed, so that five patches are printed by shifting only the red component at an interval of "8" after or before the reference value while the tone values as the reference value are set to "15", "31", "47", . . . . Then, each patch is image captured to judge which patch is closest to gray based upon the read component value. By this, the deviation for keeping the gray balance, although dispersely, all over the range of 256 tones can be found. Therefore, the color conversion look-up table may be rewritten as in the same manner at steps S25 and S26 based on this deviation. When automatization can be realized in this way, a perfect deviation can be obtained by executing with the interval of the patch data made smaller. Further, an absolute color component can be judged in this case, whereby it becomes possible to obtain the deviation of every component for the adjustment.

Subsequently, an operation of the present embodiment having the aforesaid construction will be explained.

In a manufacturing process, three print head units 31a1 are assembled as one set in the print head 31a. If the print head 31a is provided with the PROM area to which the color ink ejecting amount can be written, cyan ink is supplied to each print head unit 31a1 for causing to print a solid patch shown in FIG. 11 with a duty of 25% density. Next, this patch is measured with a densitometer and the data for showing the measured density is written into the PROM area. This procedure corresponds to steps S11 and S12. Thereafter, cyan ink in the print head 31a is washed away to become empty for assembling the printer 31.

On the other hand, after purchasing the printer 31, the user connects the printer with his or her computer system to install the printer driver. At this time, the color correction program is read from a medium such as a floppy disc or CD-ROM having recorded thereon the color correction program which is an adopted example of the color correction device, so as to install to the hard disc 22 of the computer system. The install is not limited to a specific medium such as a floppy disc or CD-ROM. It is possible to install via the modem 26 through the public communication line.

Upon activating the color correction program, the computer system communicates with the printer 31 to read the data recorded in the PROM area of the print head 31a via the printer controller 31e and the print head controller 31b (step S13). This data is the one showing the actually measured density as described above. If this data is above or below the reference value, a color correction look-up table is formed (step S14), and then, a value of a color conversion look-up table is rewritten by using this color correction look-up table (step S15) to terminate this program. Therefore, the printer driver is required to be installed before this operation. However, this program is terminated only after the color correction look-up table is formed, while the value of the color conversion look-up table may be rewritten by using the color correction look-up table upon activating the printer driver.

On the other hand, by rewriting the color conversion look-up table, the printer driver inputs the color image data at step S110 shown in FIG. 13 to refer the color conversion look-up table at step S120 based upon this color image data when the printer driver is activated at a time of executing the printing operation from the application. The CMYK data referred to by the color conversion look-up table has already been rewritten by foreseeing the deviation in output characteristics in the printer 31, with the result that the read CMYK data is the data in which the color correction is finished at step S130.

Accordingly, when binarization is made at the subsequent step S140 to cause the obtained data to be printed at step S150, color deviation which is expected to occur due to the deviation of the print head unit 31a1 of the printer 31 does not occur.

Figure 8:
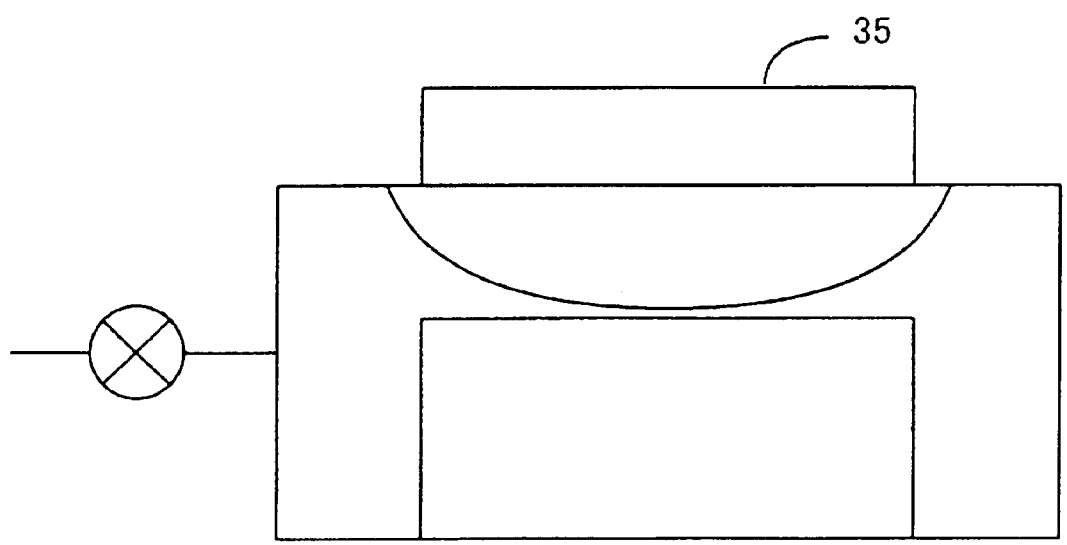
FIG. 8 is a view showing a color printing apparatus connectable with a network as another image output device.

This case is an example to use in the computer system. However, if the color correction system is, for example, accommodated in the printing device as shown in FIG. 8, the color correction look-up table shown in steps S13 and S14 is formed and the inputted color image data is subject to the color correction to be printed in spite of performing the adjustment of the hardware when the power source is turned on, thereby capable of printing with a color faithful to the original color.

On the other hand, in case where the PROM area is not present in the print head 31*a* or where the color deviation is recognized due to an age softening even if the PROM area is present, or in case where printing operation is intended to be performed on a color paper, a color conversion look-up table is formed in accordance with the procedure shown in FIG. 17.

Specifically, after purchasing the printer 31, the user connects the printer 31 with his or her computer system to execute installation of the printer driver as well as to activate the color correction program. Five color-deviated patches shown in FIG. 18 are firstly printed (S21), so that the one which is closest to gray is selected among these patches to be inputted to the computer system (S22). If the patch (3) is not selected at this time, it is judged that there is a deviation among each element color. Therefore, gray scale patterns in which correction level is different from one another are printed for correcting the element color having deviation with a predetermined tone curve (S23), to thereby select the one which seems to be closest to gray among these patterns to be inputted in the same manner (S24).

It is understood what element color should be corrected and to what extent such correction should be made by the color correction program for eliminating the deviation in output characteristics of the printer 31. Accordingly, a color correction look-up table is formed based upon this information (S25), and then, a color conversion look-up table is rewritten (S26).

If the color conversion look-up table is rewritten in this way, the printer driver inputs the color image data at step S210 shown in FIG. 20 for simultaneously performing the color correction at step S220 and color conversion at step S230 by referring to the rewritten color conversion look-up table when the printer driver is activated upon executing the printing operation from the application, as in the same manner of the former case. When binarization is made at the subsequent step S240 to cause the obtained data to be printed at step S250, color deviation which is expected to occur due to the deviation of the print head unit 31*a*1 of the printer 31 does not occur.

In this way, the deviation of output characteristics of the printer 31 is written in the PROM area of the print head unit 31*a*1 while reading the PROM area, or predetermined adjusting patterns are printed to select among the patterns the one which is closest to gray and is inputted, so that the deviation of output characteristics of the printer 31 is received. Further, the color correction look-up table for performing the color conversion in order to eliminate this deviation is formed, and the color conversion look-up table is rewritten, so that the color correction foreseeing the deviation by referring to the rewritten color conversion look-up table is performed when printing is actually executed based upon the color image data. As a result, the deviation existing in the hardware of the printer 31 does not occur on the color on the printed matter, thereby capable of faithfully reproducing color.

In the aforesaid embodiment, the timing for forming the color correction look-up table to be incorporated into the color conversion look-up table is the time when the printer driver is activated. This timing is not absolute, but it is desirable to suitably control this executing timing in order to accurately perform the color correction. Explained hereinafter is an embodiment for accomplishing this object.

In this embodiment, the above-mentioned color correction means, color correction data producing means, color conversion means and tone conversion means are constructed by the install program and printer driver.

The install program is recorded on a program storing medium such as CD-ROM or the like to be distributed. After the printer 31 is connected to the computer 21, the CD-ROM is set to CD-ROM drive 24. Thereafter, the install program is executed as the application for developing the printer driver or color conversion look-up table on the hard disc 22. It is to be noted that it may be introduced via the floppy disc drive 25 and modem 26 as described above.

Figure 38:
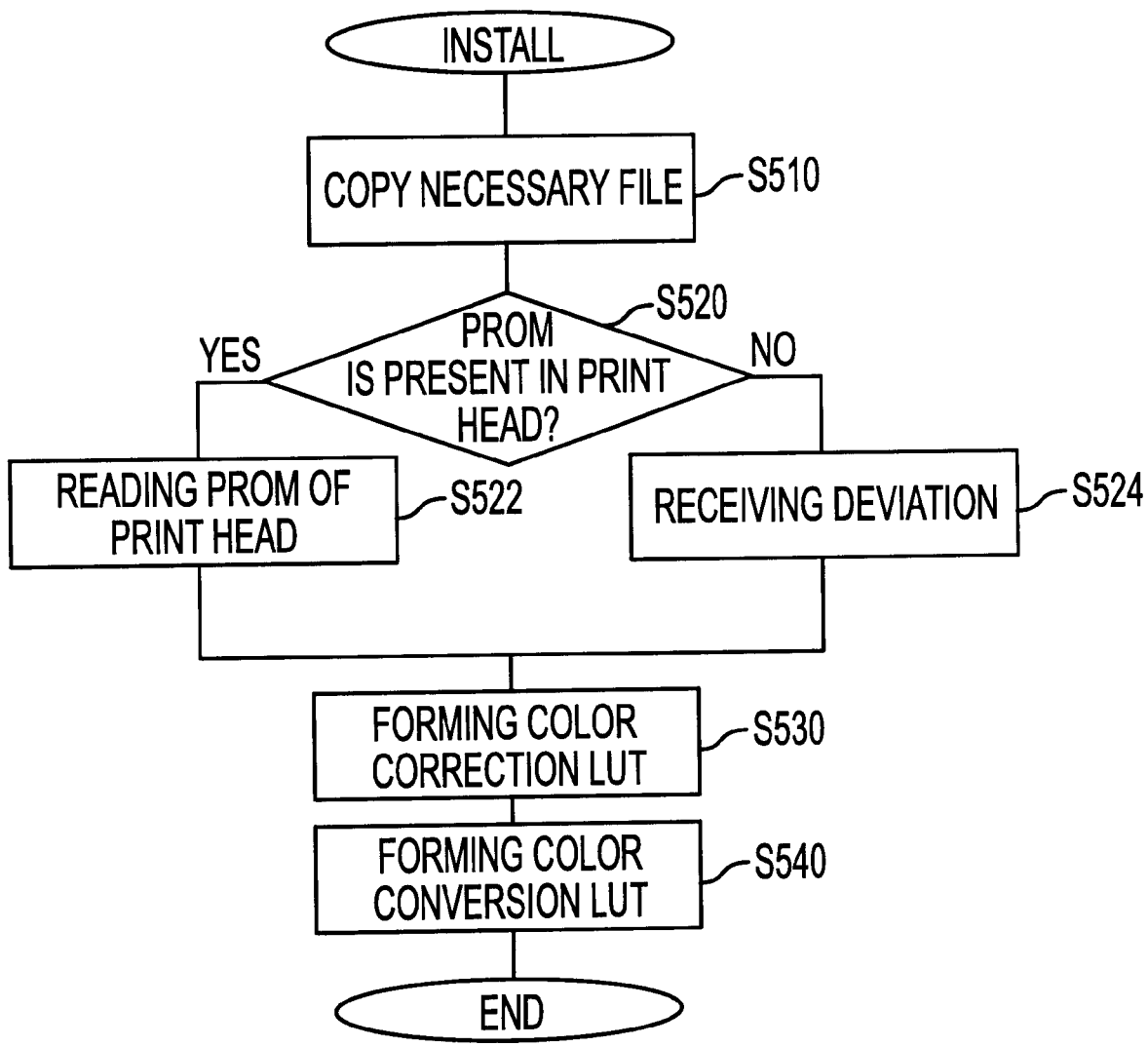
FIG. 38 is a flowchart of a install program.

Referring to the flowchart of the install program shown in FIG. 38, this developing section corresponds to step S510, and the deviation of the print head 31*a* in the printer 31 as described above is received at the subsequent steps S520, S522 and S524.

The explanation was made such that the PROM area was provided in the print head 31*a* in the aforesaid printer 31 and the deviation of used color ink amount was written in this PROM area. The install program in the present embodiment judges whether the print head 31*a* is provided with the PROM area or not and executes two processing steps S522 and S524 respectively according to its judging result.

It is necessary as a precondition that the deviation is written in the PROM area in the print head 31*a*. The writing procedure is the same as described above.

Therefore, it is judged whether the PROM area is present in the print head 31*a* at step S520. If it is present, the deviation is read in from the PROM area in the print head 31*a* at step S522. When the deviation is obtained in this way, a color correction look-up table is formed at step S530 of the install program. At step S540, a color conversion look-up table used for the color conversion means is rewritten. Accordingly, by referring to the color conversion look-up table based upon the RGB data, the correction into C'M'Y'K' data performed by foreseeing the deviation of output characteristics of the printer 31 is executed simultaneous with the conversion of the color space into CMYK.

Specifically, when the printer driver performs the color conversion thereafter, the color correction is performed by referring to the rewritten color conversion look-up table. Further, the color conversion look-up table having such information is formed in the process of install, whereby it can be said that the color correction look-up table and color conversion look-up table compose the color correction data as well as that each procedure of step S520 to S540 constructs the color correction data producing means. It is to be noted that the install program executes this color correction data producing means. The install program constructs setting means.

As described above, the print head 31*a* does not have to be provided with the PROM area for storing the deviation. Therefore, in case where the PROM area is judged to be absent in the print head 31*a* at step S520, the procedure for receiving the deviation is executed at step S524. Specifically, the procedures shown in S21 to S24 shown in FIG. 17 are executed, whereby the computer 21 receives the deviation by the printing of patch and the selection by the user.

When the user executes the selection of tone curve corresponding to step S24, a color correction look-up table is formed at step S530 corresponding to the selection, while a color conversion look-up table is rewritten at step S540 based upon the color correction look-up table formed at step S530.

Although the conversion characteristics between input and output is required to be given after the data of deviation is read in from the print head 31a at step S522, the conversion characteristics herein may be selected as the tone curve.

In this case, a subroutine procedure for receiving the deviation is activated by the install program, resulting in that the color correction look-up table and color conversion look-up table are formed. Therefore, each procedure of steps S520, S524, S530 and S540 constructs the color correction data producing means.

On the other hand, the install program is only one example for constructing the color correction data producing means. Briefly, the color correction data may be formed after the installation. Accordingly, it is not always necessary to form the color correction data by going through the above-mentioned procedures upon installation.

Figure 39:
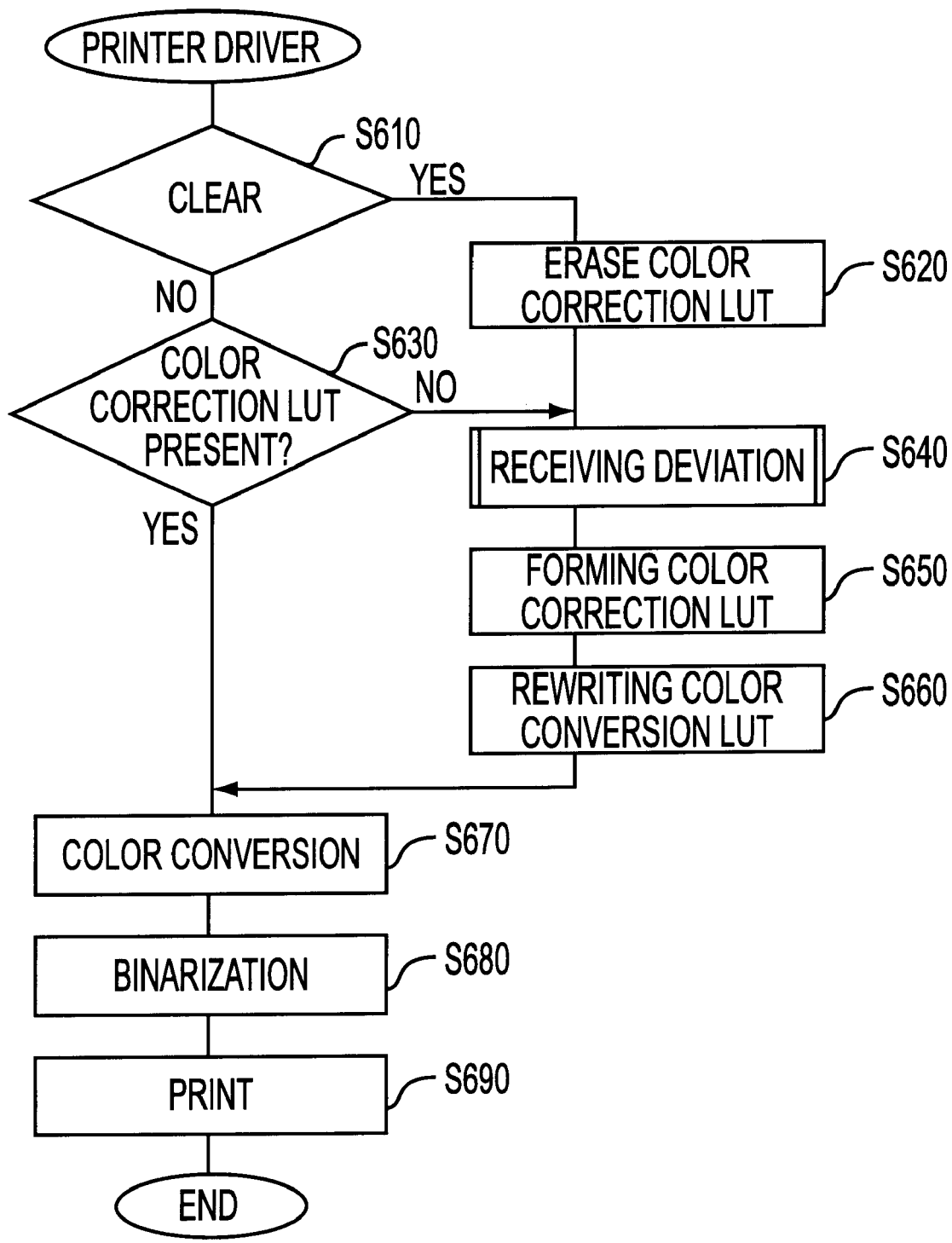
FIG. 39 is a flowchart of a printer driver.

FIG. 39 shows a schematic flowchart of the printer driver activated in the operating system upon printing operation from the application. A rasterized procedure for bringing down the image data corresponding to the scanning range of the print head 31a is omitted in the figure.

The printer driver is ordinarily activated upon the printing operation. However, the printer driver may intentionally be activated for producing the color correction data. Specifically, the color correction data is once cleared to newly be formed. At step S610, it is judged whether the printer driver is activated for clear. If so, the color correction look-up table is erased.

On the other hand, if the printer driver is activated for the printing operation, it is judged whether the color correction look-up table is present or not at step S630 through the judgement at step S610. If the color correction look-up table has been formed in the install program, it means that the color correction data has been produced before the printing operation. However, the case where the install program does not form the color correction look-up table means that the color correction data is not produced upon the printing operation, so that the aforesaid subroutine for receiving the deviation is executed at step S640, a color correction look-up table is formed at step S650 and a color conversion look-up table is formed at step S660. The procedures at steps S650 and 660 may be the same as those as steps S530 and S540.

The presence or absence of the color correction data can be judged by the presence or absence of the color correction look-up table in this way, with the result that the color correction data can surely be produced before the printing operation. Accordingly, the procedures at steps S630 to S660 construct the color correction data producing means.

Even when it is judged to be clear at step S610, the color correction data is produced by executing the procedures of steps S640 to S660 after the color correction look-up table is formed at step S620, resulting in that the procedures of steps S610 and S620 construct clear means.

The procedure of the color conversion is executed at step S670. The color image data is converted from RGB to CMYK by using the color conversion look-up table in this color conversion procedure. In this case, the color conversion look-up table is rewritten to include the color correction look-up table as described above. Accordingly, the correction foreseeing the deviation of output characteristics of the printer 31 is performed simultaneous with the conversion of the color space into CMYK by referring to the color conversion look-up table based upon RGB data.

Specifically, it can be said that the procedure of step S670 constructs the color correction means. If the color correction look-up table is referred to in case where the color conversion look-up table is formed separately from the color correction look-up table, its referring procedure constructs the color correction means.

The printer driver executes binarization at step S680 so as to correspond to tone ability of the print head 31a, and then sends the binarized color image data to the printer 30 to cause it to print at step S690.

Subsequently, the operation of the present embodiment having the aforesaid construction will be explained.

In the install program, the necessary file such as printer driver is copied on the hard disc 22 at step S510. Thereafter, if the PROM area is present in the print head 31a, the computer 21 communicates with the printer 31 at step S522 to read in the data stored in the PROM area in the print head 31a via the printer controller 31e and the print head controller 31b. This data is the one showing actually measured density as described above. If this data is above or below the reference value, a color correction look-up table is formed at step S530, and value of a color conversion look-up table is rewritten by using the color correction look-up table at step S540, to thereby terminate this install program. Therefore, the color correction data is formed upon the installation, whereby the color correction data is produced before image output of the printer 31 serving as the image output device, i.e., before the printing operation.

On the other hand, by rewriting the color conversion look-up table in this way, the printer driver refers to the color conversion look-up table based upon this color image data at step S670 shown in FIG. 39 when activated upon executing the printing operation from the application. The CMYK data referred to in the color conversion look-up table has already been rewritten by foreseeing the deviation of output characteristics of the printer 31, whereby the read CMYK data is the data in which the color correction and color conversion are simultaneously terminated, which means that the color correction is executed.

Accordingly, when binarization is made at the subsequent step S680 to cause the obtained data to be printed at step S690, color deviation which is expected to occur due to the deviation of the print head unit 31a1 of the printer 31 does not occur.

On the other hand, in case that the PROM area is not present in the print head 31a, a subroutine for receiving the deviation is executed at step S524 of the install program. By this, it is found what element color should be corrected and to what extent such correction should be made by the color correction program for eliminating the deviation in output characteristics of the printer 31. Accordingly, a color correction look-up table is formed based upon this information as in the same manner as described above (step S530), and then, a color conversion look-up table is rewritten (step S540).

If the color deviation is felt due to the age softening or if the printing is intended on a color paper, the subroutine for receiving the deviation is executed through steps S610 and S620 by executing the printer driver via the clear procedure.

If the color conversion look-up table is rewritten in this way, color correction and color conversion are simultaneously performed by referring to the color conversion look-up table which is rewritten at step S670 of the printer driver when the printer driver is activated upon executing the printing operation from the application, as in the same manner of the former case. When binarization is made at the subsequent step S680 to cause the obtained data to be printed at step S690, color deviation which is expected to occur due to the deviation of the print head unit 31a1 of the printer 31 does not occur.

The case where the install program does not rewrite the color conversion look-up table as described above means that the color correction look-up table is not formed. In this case, it is judged whether the color correction look-up table is present or not at step S630 before the color conversion when the printer driver is initially activated. If it is not present, the color correction data is formed at steps S640 to S660. Therefore, the color correction data is surely formed before the color conversion at step S670.

As described above, the deviation in output characteristics can be obtained by writing the deviation in output characteristics in the printer 31 in the PROM area which is read, or by manually inputting the deviation via a predetermined deviation receiving procedure. Further, the color correction look-up table is formed to eliminate this deviation for rewriting the color conversion look-up table, whereby the color correction foreseeing the deviation is performed by referring the color conversion look-up table that has already been rewritten, when the printing operation is performed based upon the color image data. As a result, the deviation due to the hardware in the printer 31 does not occur in color on the printed matter, thereby capable of faithfully reproducing color.

Although the assumption has been established so far such that the data recorded in the PROM area of the print head 31a is used only for the color correction, it is possible to utilize such data from another viewpoint also with the color correction as the assumption. An effective embodiment will be explained hereinafter from this viewpoint.

Figure 40:
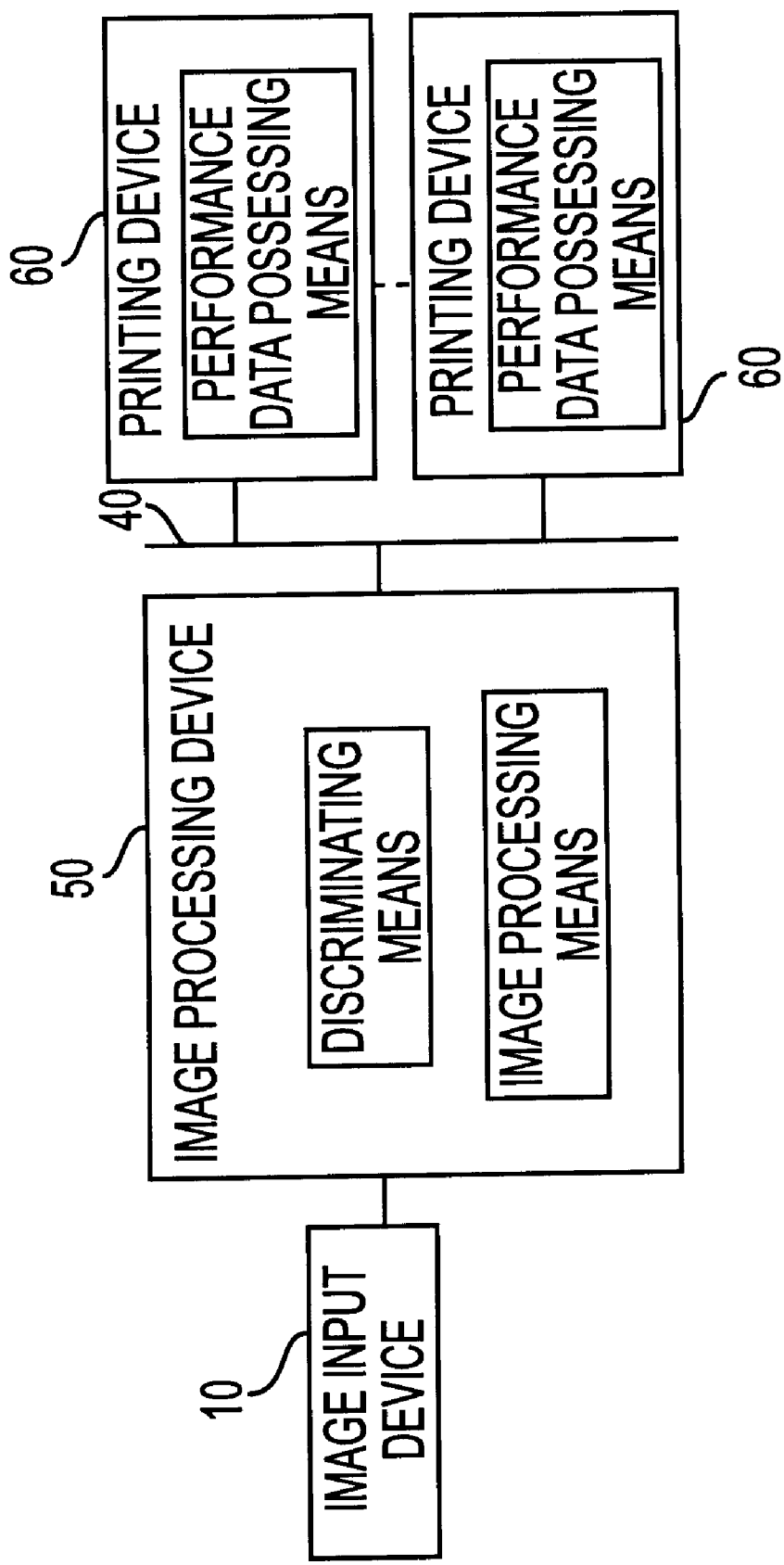
FIG. 40 is a block diagram of an image printing system according to one embodiment of the present invention.
Figure 41:
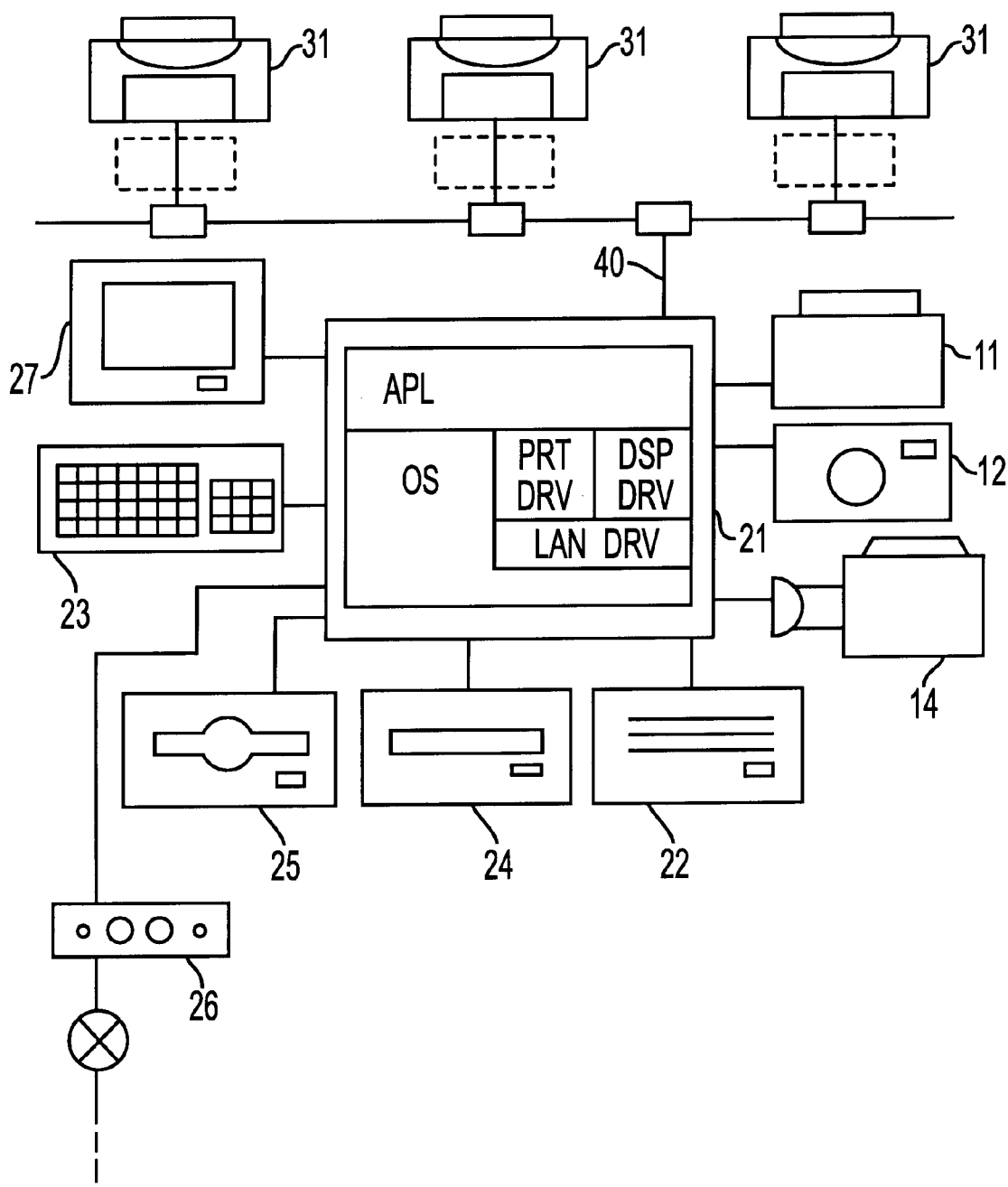
FIG. 41 is a block diagram specifically showing a hardware/software construction in the image printing apparatus.

FIG. 40 is a block diagram showing an image printing system according to the present embodiment, while FIG. 41 is a block diagram showing an example of a specific hardware construction.

In the figure, an image input device 10 inputs color image data of a color image to an image processing device 50 which performs image processing with respect to the color image data. Then, the image processing device 50 outputs as print data to any one of a plurality of printing devices 60 connected via a communication line 40. Each printing device possesses performance data related to inherent characteristics of itself. The image processing device 50 receives this performance data via the communication line 40 to discriminate the printing device 60 in accordance with this performance data as well as to execute image processing in accordance with this performance data. Specifically, the printing device 60 is provided with performance possessing means for possessing the performance data and for outputting to the image processing device 50 via the communication line 40, while the image processing device 50 is provided with discriminating means for discriminating the printing device 60 by receiving the performance data and image processing means for performing image processing in accordance with the performance data.

The above-mentioned computer system corresponds to the specific example of the image processing device 50. A LAN corresponds to the specific example of the communication line 40 and the printer 31 shown by a broken line connected to the communication line 40 via the computer system corresponds to the specific example of the connected plurality of printing devices 60.

The printer 31 is the same as the one shown in FIG. 3, being provided with the PROM area for possessing the performance data Although the performance data is recorded in the PROM area by using electrical signal in the present embodiment, the PROM area is not always utilized for recording in the print head unit 31a1.

Figure 42:
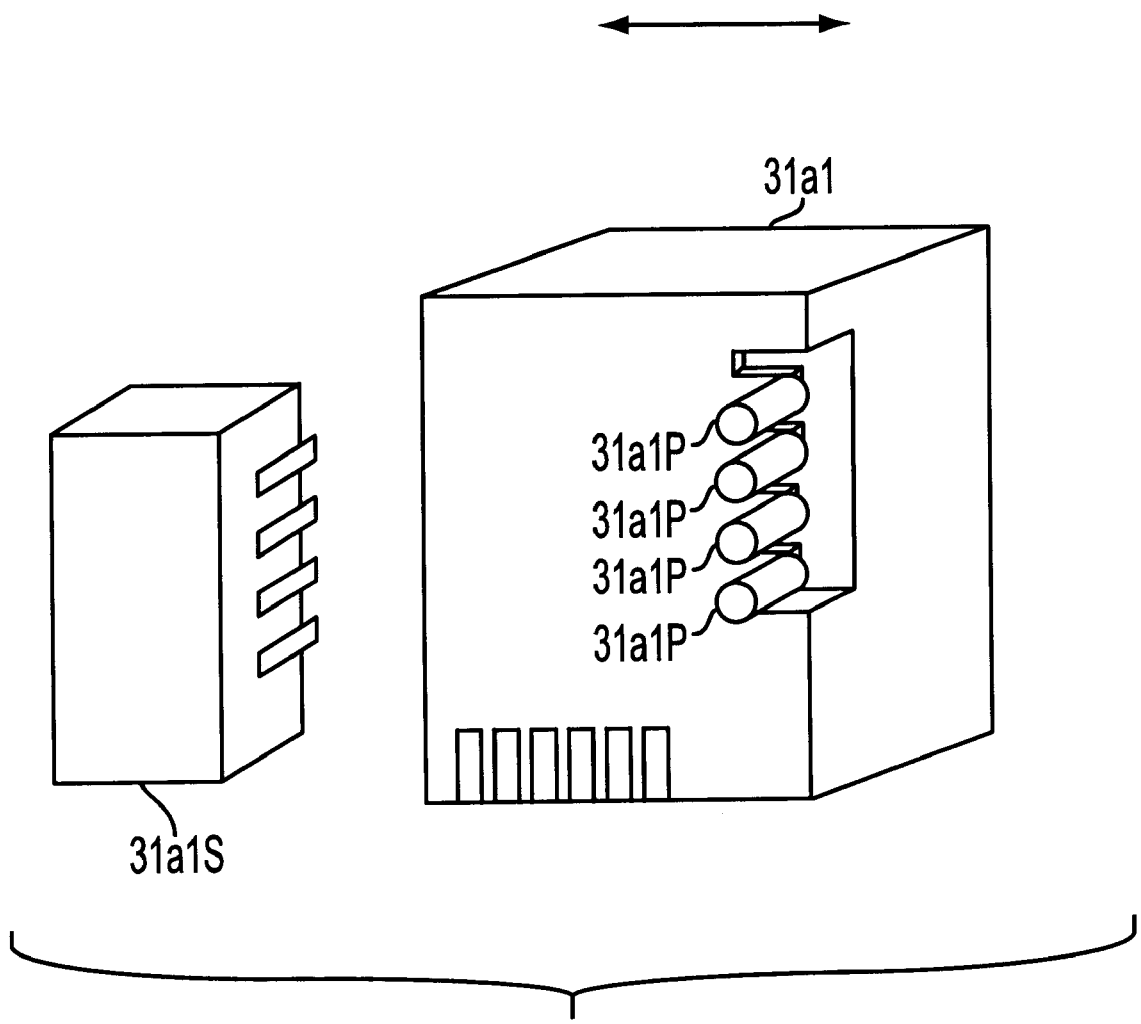
FIG. 42 is a perspective view showing a modified example of a print head.
Figure 43:
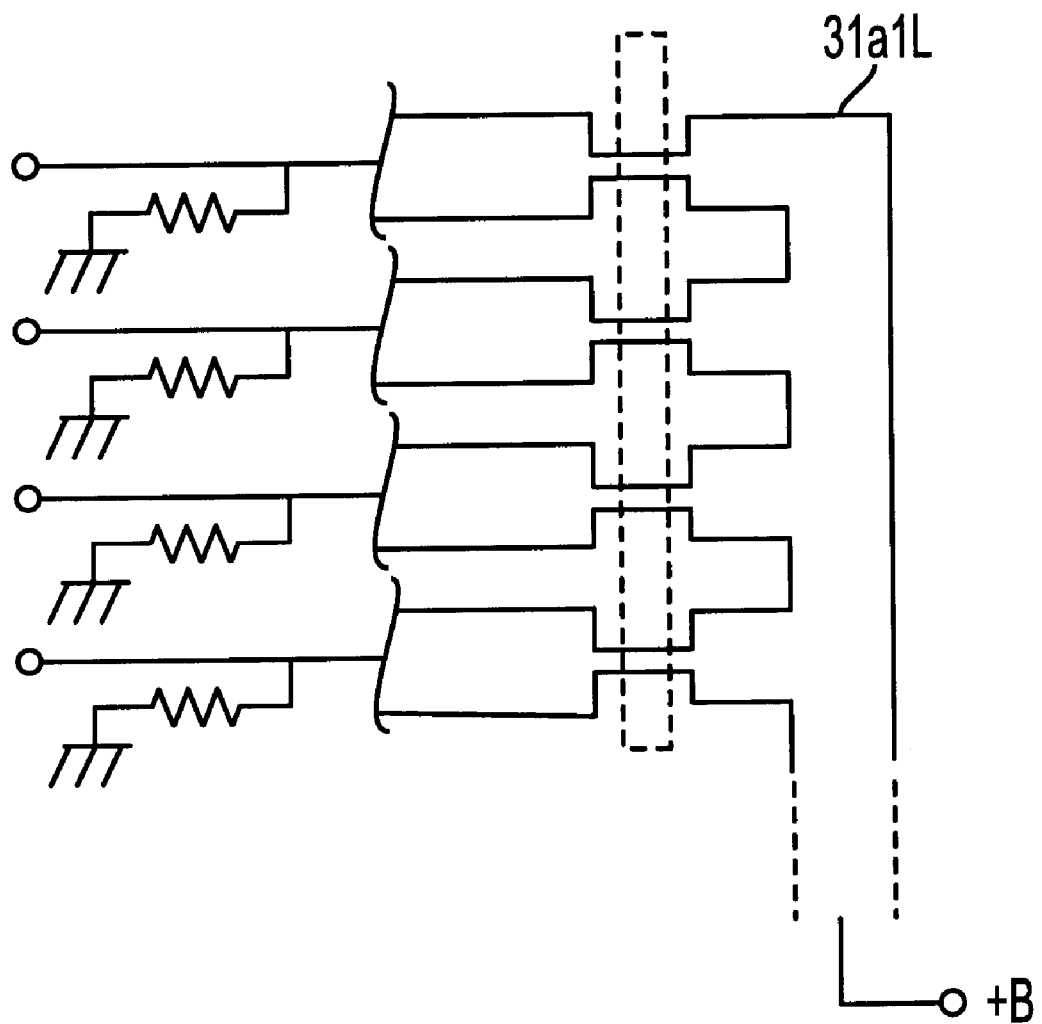
FIG. 43 is a view showing another modified example of a print head.

For example, pins 31aP which can easily be broken are formed at the back side of the print head unit 31a1 as shown in FIG. 42 so as to code the performance data with 4 bits to be capable of being recorded. In this case, a movable sensor 31aS supported at the position corresponding to each pin 31a1P in the printer 31 decodes the 4 bits to convert into electrical signal. Further, FIG. 43 shows an example wherein a print pattern 31a1L can be cut by using the pins 31a1P shown in FIG. 42. Specifically, the print pattern 31a1P is arranged such that a portion thereof passes through the bottom portion of the above-mentioned pin 31a1P, whereby the print pattern 31a1L is cut by breaking the pin 31a1P to be capable of being coded. Therefore, it can be judged whether it is the print pattern 31a1L corresponding to the broken pin 31a1P by judging the continuity at the edge portion of the print pattern 31a1L, thereby capable of being decoded. Namely, it is the example wherein the recording is mechanically performed but the reading can be electrically performed.

It goes without saying that the recording of the performance data and reading thereof are possible by a method other than these examples. A dip switch may be mounted in the same meaning. In this case, coding of a plurality of bits is possible by a combination of on and off of the dip switch, thereby capable of setting the performance data. Then, the performance data is written in the PROM area of the print head 31a as described above.

FIG. 44 shows a corresponding relationship between a density measured by a densitometer and color ink amount, and also shows a corresponding relationship in which the measured density and color ink amount are coded with 4 bits while they are classified. As apparent from the figure, the deviation which is to be occurred in the ejecting amount can be sorted into sixteen stages within a range from 24 ng to 56 ng at an interval of 2 ng with the reference value of 40 ng as a center. This is classified to be recorded in the PROM as the performance data. The deviation of sixteen stages can be expressed by 4-digits in a binary number system, thereby being capable of being recorded as the performance data of 4 bits as shown in FIGS. 42 and 43.

Figure 45:
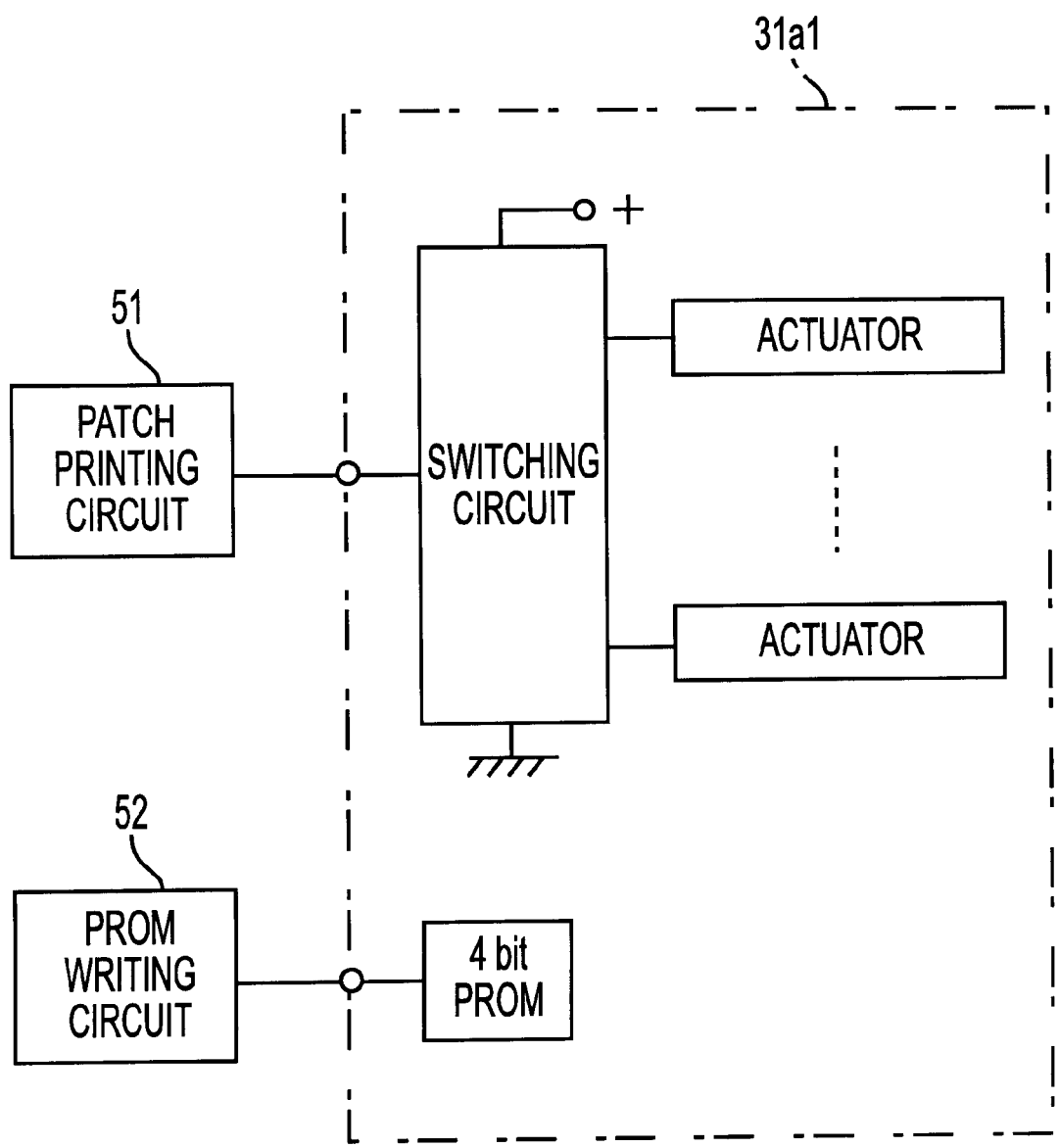
FIG. 45 is a circuit diagram upon writing a deviation to a print head by setting at a factory.
Figure 46:
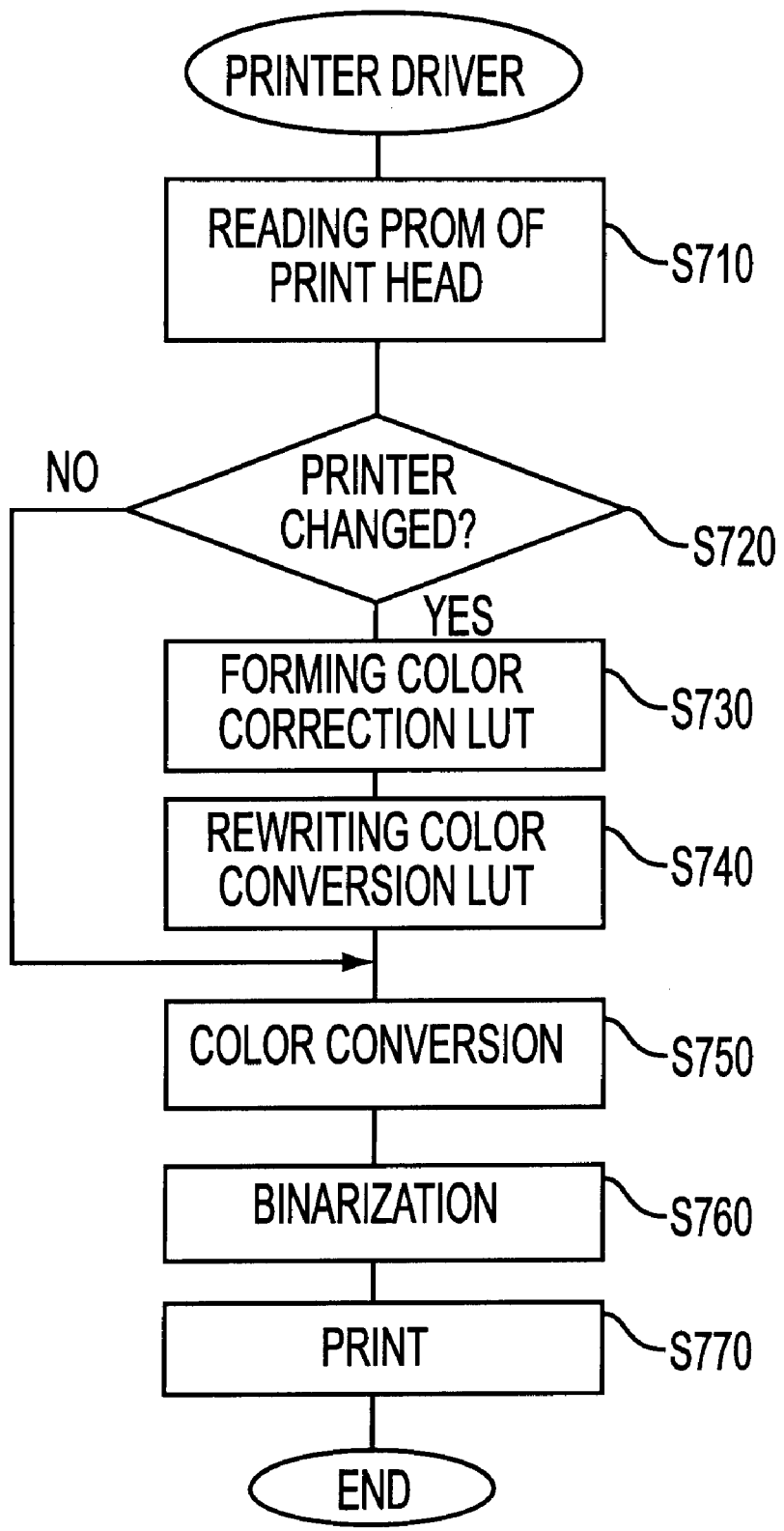
FIG. 46 is a flowchart of a printer driver.

FIG. 45 is a block diagram showing an electrical signal system upon printing a patch at factory setting, wherein a patch printing circuit 51 drives each piezoelement corresponding to an actuator via a switching circuit in the print head unit 31a1 to print the patch and a PROM writing circuit 52 writes the data of the density measured by a densitometer. Accordingly, it is possible to read the ejecting amount of every print head unit 31a1 via the print head controller 31b when the print head unit is installed in the printer 31. Further, recording means is already provided at a stage of installing the print head unit 31a1, whereby the measured result can be recorded at this stage for possessing the performance data with minimum assembly.

In particular, data may be recorded every cartridge in the device in which the print head and color ink tank are integrally formed.

The influence of the performance data is different from the content of image processing. In the present embodiment, the difference among the print heads is utilized as the performance data for performing image processing in order to eliminate the difference among the print heads 31a as described later. However, it is not limited to the difference among the print heads for performing image processing to eliminate the difference among another devices.

The performance data recorded in the PROM of the print head unit 31a1 is read by the computer 21 via a LAN driver (LNADRV) incorporated into the operating system (OS). Specifically, the LAN driver is capable of communicating with the printer 31 via the communication line 40 to thereby be capable of not only outputting the print data but also reading the performance data which is a color ink ejecting amount as described above. Further, a printer driver (PRTDRV) described later requires to read the performance data via this LAN driver. This printer driver constructs discriminating means and the printer driver itself constructs image processing means including an ordinary image processing. The connection of the printer 31 with the computer 21 without intervening the communication line 40 is performed by the CPU of the computer 21 executing bidirectional communication with the printer 31 as the peripheral apparatus. Such a bidirectional communication is performed also by using a basic program incorporated in the operating system.

Subsequently, an operation of the present embodiment having the aforesaid construction will be explained along the flow of the printer driver.

When the printing is performed from the application, the printer driver incorporated in the operating system is activated to read the performance data from the PROM of the print head at step S710. Briefly, the printer driver communicates with the printer 31 which is designated at present on the communication line 40 via the LAN driver for reading the performance data, which is the ink ejecting amount, written in the PROM area of the print head 31a via the PROM interface 31b2 of the print head controller 31b.

Subsequently, it is judged whether the printer is changed or not based upon the read data at step S720. This discrimination is performed by comparing the data with the performance data which is written in a predetermined area such as the hard disc 22 and read immediately before the performance data read at step S710. When the printer driver is initially activated, the data is not recorded on the hard disc 22 since there is no previous reading experience, whereby the printer is judged to be changed in the case of comparison.

If the printer 31 is changed as a result of the discrimination in this way, a color correction look-up table (LUT) is formed at step S730, while a color conversion look-up table used at the time of color conversion is rewritten at step S740 so as to be capable of simultaneously executing the color correction and color conversion.

Specifically, the rewritten color conversion look-up table is referred to upon performing the color conversion at the following step S750, with the result that the color correction and color conversion are simultaneously finished. Accordingly, it can be said that each procedure at steps S730 to S750 construct color correction means.

Thereafter, when binarization is made at the subsequent step S760 to cause the obtained data to be printed at step S770, color deviation which is expected to occur due to the deviation of the print head unit 31a1 of the printer 31 does not occur.

Figure 47:
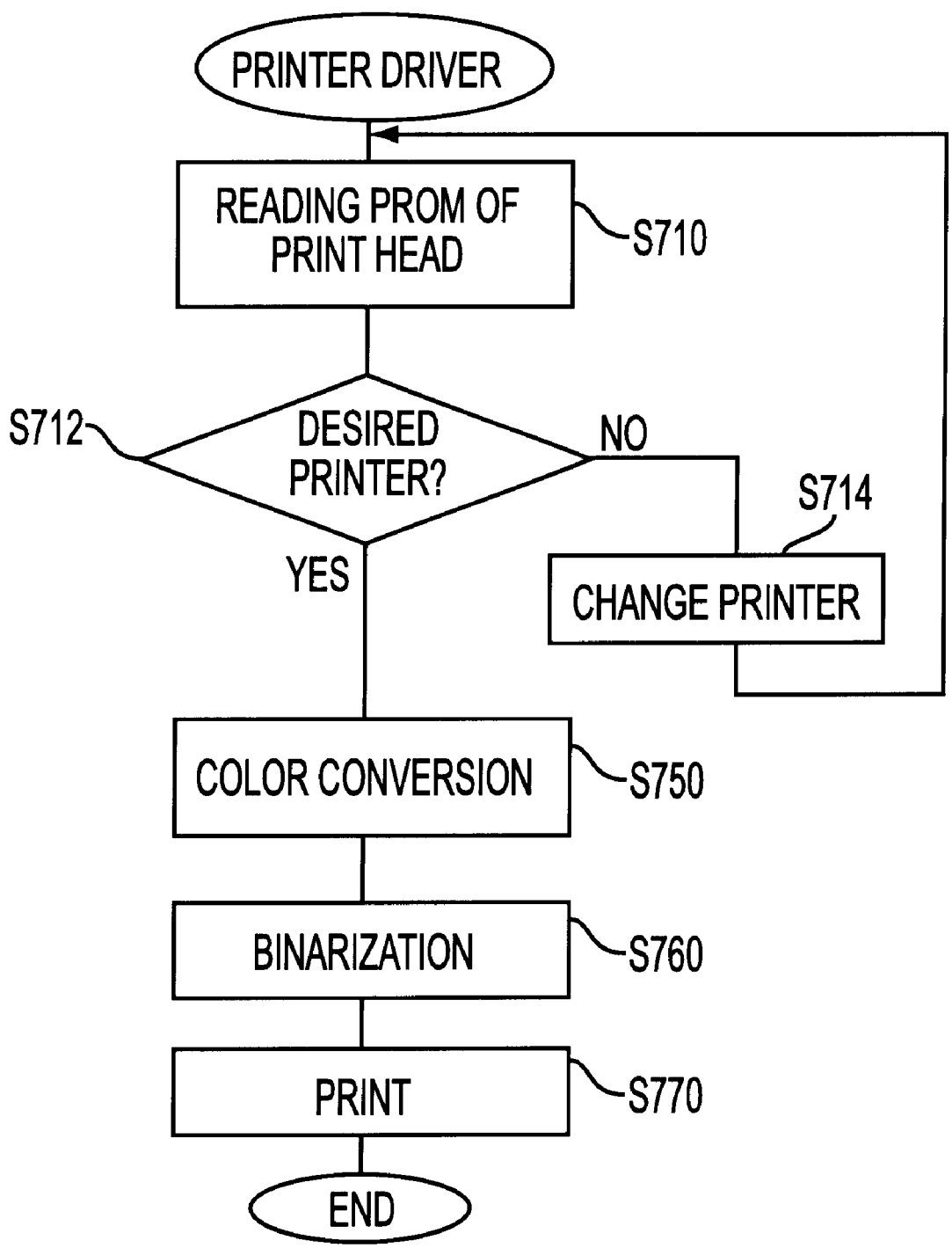
FIG. 47 is a flowchart of another printer driver.

Although it is judged whether the connected printer 31 is changed or not in this example, it is possible as another usage to use the printer driver for searching a desired printer. FIG. 47 shows a flowchart of the printer driver in this case.

As shown in FIG. 47, the PROM of the print head unit 31a1 which is designated at present is read at step S710 as the same manner as described above, and then it is judged at step S712 whether the read data of the PROM content is data of the desired printer or not. If it is not the desired printer in this case, the present designation is released to change the printer 31 at step S714. When the desired printer 31 is obtained by repeatedly performing this operation, the data is subject to a color conversion at step S750, binarized at step S760 and printed at step S770.

In case where the printer 31 is connected to the computer 21 and there is a difference among three print head units 31a1 which constitute the print head 31a of this printer 31 in this way, the computer 21 performs image processing so as to eliminate this difference for outputting. In this case, the computer 21 reads from the printer 31 the performance data of the difference recorded in the PROM area of the print head 31a for judging whether the printer 31 is changed or not by this data, whereby the printer 31 can be discriminated by the data sufficient to be controlled only in the manufacturing process. Therefore, the management is facilitated and further, it is possible to give no influence of the difference among each hardware while permitting this difference.

We claim:

1. A color correction system, comprising:
   an image output device which outputs the color image by performing an image output of every element color based upon color image data in which a color image is separated into every predetermined element color at the same time the strength and weakness thereof is shown;
   means for determining deviation data corresponding to an ink ejection amount information for said image output device, said deviation data comprising output characteristics of every element color in the image output device; and
   a color correction device for said image output device, comprising:
   deviation receiving means for receiving said deviation data; and
   color correction means for correcting said color image data by performing a color conversion so as to eliminate the deviation of output characteristics received by the deviation receiving means.

2. The color correction device claimed in claim 1, wherein said deviation receiving means is provided with image capture means for inputting the image output by said image output device.

3. The color correction device claimed in claim 1, wherein said color correction means corrects by utilizing a tone curve which converts characteristics of strength and weakness between input and output so as to eliminate the deviation in output characteristics.

4. The color correction device claimed in claim 1, wherein said color correction means performs a color conversion to said color image data based upon predetermined color correction data so as to eliminate the deviation in output characteristics of every element color in said image output device.

5. The color correction device claimed in claim 1, wherein said color correction device is provided with color correction data producing means for producing said color correction data before a first image output by said image output device.

6. The color correction device claimed in claim 5, wherein said color correction data producing means is executed when the color correction data is judged to be absent by said color correction means.

7. The color correction device claimed in claim 5, wherein said color correction device is provided with setting means for setting to a system to be used, said setting means executing said color correction data producing means upon causing a first image output.

8. The color correction device claimed in claim 5, wherein said color correction device is provided with clear means for clearing the existing color correction data, said clear means executing said color correction data producing means when said color correction data is cleared.

9. The color correction device claimed in claim 1, wherein said image output device outputs a color image by adhering a recording material provided every element color onto a medium.

10. The color correction device claimed in claim 1, wherein said image output device is provided with recording material of a dark color and light color, and said color correction means changes a mixing ratio of the dark color and light color in order to correct the deviation.

11. The color correction device claimed in claim 10, wherein said printing device ejects color ink as the recording material for outputting the color image.

12. A color correction method, comprising:

controlling an image output device to output a color image by performing an image output of every element color based upon color image data in which a color image is separated into every predetermined element color at the same time the strength and weakness thereof is shown;

determining deviation data corresponding to an ink ejection amount information for said image output device, said deviation data comprising output characteristics of every element color in the image output device;

receiving said deviation data from said image output device; and correcting the color image data by performing a color conversion so as to eliminate the received deviation of output characteristics.

13. A computer readable medium having recorded thereon a color correction program for performing a color correction, by a computer for an image output device, the color correction comprising:

determining deviation data corresponding to an ink ejection amount information for said image output device, said deviation data comprising output characteristics of every element color in the image output device;

receiving deviation data from said image output device;

correcting the color image data by performing a color conversion so as to eliminate the received deviation of output characteristics; and outputting a color image by performing an image output every element color based upon the corrected color image data in which a color image is separated into every predetermined element color at the same time the strength and weakness thereof is shown.

* * * * *